(12) United States Patent
Ihara et al.

(10) Patent No.: US 10,897,060 B2
(45) Date of Patent: Jan. 19, 2021

(54) ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventors: Masayuki Ihara, Fukushima (JP); Tadahiko Kubota, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 65 days.

(21) Appl. No.: 16/217,522

(22) Filed: Dec. 12, 2018

(65) Prior Publication Data
US 2019/0115623 A1    Apr. 18, 2019

Related U.S. Application Data

(62) Division of application No. 15/469,880, filed on Mar. 27, 2017, now Pat. No. 10,170,793, which is a
(Continued)

(30) Foreign Application Priority Data

Jun. 11, 2012    (JP) ................. 2012-131649

(51) Int. Cl.
*H01M 10/0565*    (2010.01)
*H01M 10/6235*    (2014.01)
(Continued)

(52) U.S. Cl.
CPC ..... *H01M 10/0565* (2013.01); *H01M 10/052* (2013.01); *H01M 10/0567* (2013.01);
(Continued)

(58) Field of Classification Search
None
See application file for complete search history.

(56) References Cited

U.S. PATENT DOCUMENTS

| 6,063,526 A | 5/2000 | Gan et al. |
| 2005/0123835 A1* | 6/2005 | Sun ................... H01M 10/0568 429/326 |

(Continued)

FOREIGN PATENT DOCUMENTS

| JP | 07-006786 A | 1/1995 |
| JP | 2000-077096 A | 3/2000 |

(Continued)

OTHER PUBLICATIONS

Notice of Allowance and Fees Due for U.S. Appl. No. 13/908,696, dated Nov. 18, 2016, 09 pages.
(Continued)

*Primary Examiner* — Scott J. Chmielecki
(74) *Attorney, Agent, or Firm* — Chip Law Group

(57) ABSTRACT

A secondary battery includes: a cathode; an anode; and an electrolytic solution including a cyano compound, the cyano compound including a compound represented by R1-O—C(=O)—O—R2 (R1, R2, or both include a cyano-group-containing group), a compound represented by R3-C(=O)—O—R4 (R4 includes the cyano-group-containing group), or both.

16 Claims, 6 Drawing Sheets

Related U.S. Application Data division of application No. 13/908,696, filed on Jun. 3, 2013, now Pat. No. 9,608,289.

(51) Int. Cl.
- *H01M 10/625* (2014.01)
- *H01M 10/052* (2010.01)
- *H01M 10/0567* (2010.01)

(52) U.S. Cl.
CPC ..... *H01M 10/625* (2015.04); *H01M 10/6235* (2015.04); *H01M 2300/0085* (2013.01); *Y02E 60/10* (2013.01); *Y02T 10/70* (2013.01)

(56) References Cited

U.S. PATENT DOCUMENTS

| | | | | |
|---|---|---|---|---|
| 2009/0309062 | A1* | 12/2009 | Kawakami | H01M 4/525 252/182.1 |
| 2010/0178569 | A1* | 7/2010 | Ihara | H01M 4/525 429/325 |
| 2010/0178596 | A1 | 7/2010 | Constancias | |
| 2010/0181828 | A1* | 7/2010 | Handa | H02J 7/1423 307/9.1 |
| 2011/0080140 | A1* | 4/2011 | Hogari | H01M 10/486 320/134 |
| 2011/0174556 | A1* | 7/2011 | Hermann | B60L 50/66 180/65.1 |

FOREIGN PATENT DOCUMENTS

| | | | |
|---|---|---|---|
| JP | 2010-225522 | A | 10/2010 |
| JP | 2011-071083 | A | 4/2011 |
| JP | 2011-154783 | A | 6/2011 |
| JP | 2011-238373 | A | 11/2011 |
| JP | 2011238373 | A * | 11/2011 |

OTHER PUBLICATIONS

Non-Final Rejection for U.S. Appl. No. 13/908,696, dated Dec. 15, 2015, 14 pages.

Notice of Allowance and Fees Due for U.S. Appl. No. 15/469,880, dated Aug. 15, 2018, 08 pages.

Non-Final Rejection for U.S. Appl. No. 15/469,880, dated Apr. 6, 2018, 12 pages.

* cited by examiner

ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

The present disclosure is a divisional of U.S. patent application Ser. No. 15/469,880 filed Mar. 27, 2017, which is a divisional of U.S. patent application Ser. No. 13/908,696 filed Jun. 3, 2013, now U.S. Pat. No. 9,608,289, which claims priority from Japanese Priority Patent Application JP 2012-131649 filed in the Japan Patent Office on Jun. 11, 2012. Each of the above referenced applications is hereby incorporated by reference in its entirety.

BACKGROUND

The present technology relates to an electrolytic solution, to a secondary battery that uses the electrolytic solution, and to a battery pack, an electric vehicle, an electric power storage system, an electric power tool, and an electronic apparatus that use the secondary battery.

In recent years, various electronic apparatuses such as mobile phones and personal digital assistants (PDAs) have been widely used, and it has been demanded to further reduce the size and the weight of the electronic apparatuses and to achieve their long life. Accordingly, a battery, in particular, a small and light-weight secondary battery capable of providing high energy density has been developed as an electric power source. In these days, it has been considered to apply such a secondary battery to various applications other than the above-described electronic apparatuses. Typical example of the other applications include battery packs attachably and detachably mounted on electronic apparatuses or the like, electric vehicles such as electric automobiles, electric power storage systems such as home electric power servers, and electric power tools such as electric drills.

Secondary batteries have been proposed that utilizes various charge and discharge principles in order to obtain battery capacity. In particular, secondary batteries that utilize insertion and extraction of electrode reactants and secondary batteries that utilize precipitation and dissolution of electrode reactants have attracted attention, since such secondary batteries achieve higher energy density than batteries such as lead batteries and nickel cadmium batteries.

A secondary battery includes a cathode, an anode, and an electrolytic solution. The electrolytic solution includes a solvent and an electrolyte salt. The electrolytic solution that functions as an intermediate in charge and discharge reactions largely influences performance of the secondary battery. Therefore, in order to improve battery characteristics, it is considered to add various additives to the electrolytic solution.

Specifically, when an oxide-based cathode active material is used, a cyanoacetate ester such as methyl cyanoacetate is used in order to suppress decomposition of the electrolytic solution even when an over voltage of a cathode is increased upon electric charge (for example, see Japanese Unexamined Patent Application Publication No. 2011-071083). In order to improve cycle characteristics, for example, succinonitrile, 1,6-dicyano hexane, or the like is used (for example, see Japanese Unexamined Patent Application Publication No. 2010-225522). In order to improve ion conductivity, cyano ester or chain cyano ester carbonate is used (for example see US Patent Application Publication No. 2005/0123835). The cyano ester is CN—C(CH$_3$)$_2$—O—C(=O)—CH$_3$ or the like, and the chain cyano ester carbonate is CN—C(CH$_3$)$_2$—O—C—(=O)—O—CH$_3$ or the like. In order to retain stable dissolution state of an electrolytic solution, a chain saturated hydrocarbon dinitrile compound or the like is used in which nitrile groups are bonded to both terminals of a chain saturated hydrocarbon compound (for example, see Japanese Unexamined Patent Application Publication No. 2011-154783).

SUMMARY

Recently, for example, electronic apparatuses and the like to which a secondary battery is applied have obtained higher performance and more functions and have been frequently used. Accordingly, it is desired to further improve battery characteristics of the secondary battery.

It is desirable to provide an electrolytic solution, a secondary battery, a battery pack, an electric vehicle, an electric power storage system, an electric power tool, and an electronic apparatus that are capable of obtaining superior battery characteristics.

According to an embodiment of the present technology, there is provided an electrolytic solution including a cyano compound including a compound represented by a following Formula (1), a compound represented by a following Formula (2), or both,

(1)

where R1 and R2 are each one of a saturated hydrocarbon group, an unsaturated hydrocarbon group, an oxygen-containing saturated hydrocarbon group, a cyano-group-containing group, halogenated groups of the foregoing groups, and groups each obtained by bonding two or more of the foregoing groups to one another, and the R1, the R2, or both include the cyano-group-containing group; a cyano group in the cyano-group-containing group is bonded to an oxygen atom (O) at a terminal of a —O—C(=O)—O— bond with one or more carbon atoms (C) in between; (A) when one of the R1 and the R2 does not include the cyano-group-containing group but includes an unsaturated carbon bond and the other of the R1 and the R2 includes the cyano-group-containing group, number of the cyano group in the other of the R1 and the R2 is one or larger; (B) when one of the R1 and the R2 include neither the cyano-group-containing group nor the unsaturated carbon bond and the other of the R1 and the R2 includes the cyano-group-containing group and the unsaturated carbon bond, the number of the cyano group in the other of the R1 and the R2 is one or larger; and (C) when one of the R1 and the R2 include neither the cyano-group-containing group nor the unsaturated carbon bond and the other of the R1 and the R2 includes the cyano-group-containing group but does not include the unsaturated carbon bond, the number of the cyano group in the other of the R1 and the R2 is two or larger,

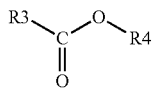

(2)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another; R4 is one of a cyano-group-containing group, halogenated groups thereof, and groups each obtained by bonding two or more of the foregoing groups to one another; a cyano group in the cyano-group-containing group is bonded to an oxygen atom at a terminal of a —C(=O)—O— bond with one or more carbon atoms in between; (D) when the R3 includes an unsaturated carbon bond, number of the cyano group in the R4 is one or larger; (E) when the R3 does not include the unsaturated carbon bond and the R4 includes the unsaturated carbon bond, the number of the cyano group in the R4 is one or larger; and (F) when the R3 does not include the unsaturated carbon bond and the R4 does not include the unsaturated carbon bond, the number of the cyano group in the R4 is two or larger.

According to an embodiment of the present technology, there is provided a secondary battery including: a cathode; an anode; and an electrolytic solution including a cyano compound, the cyano compound including a compound represented by a following Formula (1), a compound represented by a following Formula (2), or both,

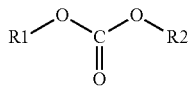

(1)

where R1 and R2 are each one of a saturated hydrocarbon group, an unsaturated hydrocarbon group, an oxygen-containing saturated hydrocarbon group, a cyano-group-containing group, halogenated groups of the foregoing groups, and groups each obtained by bonding two or more of the foregoing groups to one another, and the R1, the R2, or both include the cyano-group-containing group; a cyano group in the cyano-group-containing group is bonded to an oxygen atom (O) at a terminal of a —O—C(=O)—O— bond with one or more carbon atoms (C) in between; (A) when one of the R1 and the R2 does not include the cyano-group-containing group but includes an unsaturated carbon bond and the other of the R1 and the R2 includes the cyano-group-containing group, number of the cyano group in the other of the R1 and the R2 is one or larger; (B) when one of the R1 and the R2 include neither the cyano-group-containing group nor the unsaturated carbon bond and the other of the R1 and the R2 includes the cyano-group-containing group and the unsaturated carbon bond, the number of the cyano group in the other of the R1 and the R2 is one or larger; and (C) when one of the R1 and the R2 include neither the cyano-group-containing group nor the unsaturated carbon bond and the other of the R1 and the R2 includes the cyano-group-containing group but does not include the unsaturated carbon bond, the number of the cyano group in the other of the R1 and the R2 is two or larger,

(2)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another; R4 is one of a cyano-group-containing group, halogenated groups thereof, and groups each obtained by bonding two or more of the foregoing groups to one another; a cyano group in the cyano-group-containing group is bonded to an oxygen atom at a terminal of a —C(=O)—O— bond with one or more carbon atoms in between; (D) when the R3 includes an unsaturated carbon bond, number of the cyano group in the R4 is one or larger; (E) when the R3 does not include the unsaturated carbon bond and the R4 includes the unsaturated carbon bond, the number of the cyano group in the R4 is one or larger; and (F) when the R3 does not include the unsaturated carbon bond and the R4 does not include the unsaturated carbon bond, the number of the cyano group in the R4 is two or larger.

According to an embodiment of the present technology, there is provided a battery pack including: a secondary battery; a control section controlling a used state of the secondary battery; and a switch section switching the used state of the secondary battery according to an instruction of the control section. The secondary battery includes a cathode, an anode, and an electrolytic solution including a cyano compound, the cyano compound including a compound represented by a following Formula (1), a compound represented by a following Formula (2), or both,

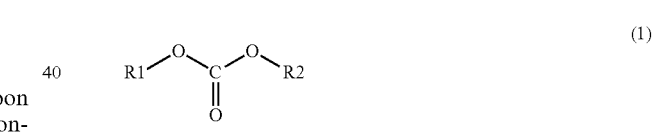

(1)

where R1 and R2 are each one of a saturated hydrocarbon group, an unsaturated hydrocarbon group, an oxygen-containing saturated hydrocarbon group, a cyano-group-containing group, halogenated groups of the foregoing groups, and groups each obtained by bonding two or more of the foregoing groups to one another, and the R1, the R2, or both include the cyano-group-containing group; a cyano group in the cyano-group-containing group is bonded to an oxygen atom (O) at a terminal of a —O—C(=O)—O— bond with one or more carbon atoms (C) in between; (A) when one of the R1 and the R2 does not include the cyano-group-containing group but includes an unsaturated carbon bond and the other of the R1 and the R2 includes the cyano-group-containing group, number of the cyano group in the other of the R1 and the R2 is one or larger; (B) when one of the R1 and the R2 include neither the cyano-group-containing group nor the unsaturated carbon bond and the other of the R1 and the R2 includes the cyano-group-containing group and the unsaturated carbon bond, the number of the cyano group in the other of the R1 and the R2 is one or larger; and (C) when one of the R1 and the R2 include neither the cyano-group-containing group nor the unsaturated carbon bond and the other of the R1 and the R2 includes the cyano-group-containing group but does not include the unsaturated carbon bond, the number of the cyano group in the other of the R1 and the R2 is two or larger,

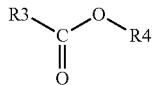
(2)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another; R4 is one of a cyano-group-containing group, halogenated groups thereof, and groups each obtained by bonding two or more of the foregoing groups to one another; a cyano group in the cyano-group-containing group is bonded to an oxygen atom at a terminal of a —C(=O)—O— bond with one or more carbon atoms in between; (D) when the R3 includes an unsaturated carbon bond, number of the cyano group in the R4 is one or larger; (E) when the R3 does not include the unsaturated carbon bond and the R4 includes the unsaturated carbon bond, the number of the cyano group in the R4 is one or larger; and (F) when the R3 does not include the unsaturated carbon bond and the R4 does not include the unsaturated carbon bond, the number of the cyano group in the R4 is two or larger.

According to an embodiment of the present technology, there is provided an electric vehicle including: a secondary battery; a conversion section converting electric power supplied from the secondary battery into drive power; a drive section operating according to the drive power; and a control section controlling a used state of the secondary battery. The secondary battery includes a cathode, an anode, and an electrolytic solution including a cyano compound, the cyano compound including a compound represented by a following Formula (1), a compound represented by a following Formula (2), or both,

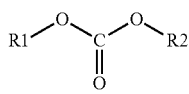
(1)

where R1 and R2 are each one of a saturated hydrocarbon group, an unsaturated hydrocarbon group, an oxygen-containing saturated hydrocarbon group, a cyano-group-containing group, halogenated groups of the foregoing groups, and groups each obtained by bonding two or more of the foregoing groups to one another, and the R1, the R2, or both include the cyano-group-containing group; a cyano group in the cyano-group-containing group is bonded to an oxygen atom (O) at a terminal of a —O—C(=O)—O— bond with one or more carbon atoms (C) in between; (A) when one of the R1 and the R2 does not include the cyano-group-containing group but includes an unsaturated carbon bond and the other of the R1 and the R2 includes the cyano-group-containing group, number of the cyano group in the other of the R1 and the R2 is one or larger; (B) when one of the R1 and the R2 include neither the cyano-group-containing group nor the unsaturated carbon bond and the other of the R1 and the R2 includes the cyano-group-containing group and the unsaturated carbon bond, the number of the cyano group in the other of the R1 and the R2 is one or larger; and (C) when one of the R1 and the R2 include neither the cyano-group-containing group nor the unsaturated carbon bond and the other of the R1 and the R2 includes the cyano-group-containing group but does not include the unsaturated carbon bond, the number of the cyano group in the other of the R1 and the R2 is two or larger,

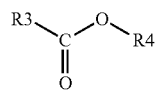
(2)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another; R4 is one of a cyano-group-containing group, halogenated groups thereof, and groups each obtained by bonding two or more of the foregoing groups to one another; a cyano group in the cyano-group-containing group is bonded to an oxygen atom at a terminal of a —C(=O)—O— bond with one or more carbon atoms in between; (D) when the R3 includes an unsaturated carbon bond, number of the cyano group in the R4 is one or larger; (E) when the R3 does not include the unsaturated carbon bond and the R4 includes the unsaturated carbon bond, the number of the cyano group in the R4 is one or larger; and (F) when the R3 does not include the unsaturated carbon bond and the R4 does not include the unsaturated carbon bond, the number of the cyano group in the R4 is two or larger.

According to an embodiment of the present technology, there is provided an electric power storage system including: a secondary battery; one or more electric devices supplied with electric power from the secondary battery; and a control section controlling the supplying of the electric power from the secondary battery to the one or more electric devices. The secondary battery includes a cathode, an anode, and an electrolytic solution including a cyano compound, the cyano compound including a compound represented by a following Formula (1), a compound represented by a following Formula (2), or both,

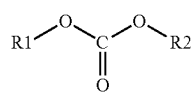
(1)

where R1 and R2 are each one of a saturated hydrocarbon group, an unsaturated hydrocarbon group, an oxygen-containing saturated hydrocarbon group, a cyano-group-containing group, halogenated groups of the foregoing groups, and groups each obtained by bonding two or more of the foregoing groups to one another, and the R1, the R2, or both include the cyano-group-containing group; a cyano group in the cyano-group-containing group is bonded to an oxygen atom (O) at a terminal of a —O—C(=O)—O— bond with one or more carbon atoms (C) in between; (A) when one of the R1 and the R2 does not include the cyano-group-containing group but includes an unsaturated carbon bond and the other of the R1 and the R2 includes the cyano-group-containing group, number of the cyano group in the other of the R1 and the R2 is one or larger; (B) when one of the R1 and the R2 include neither the cyano-group-containing group nor the unsaturated carbon bond and the other of the R1 and the R2 includes the cyano-group-containing group and the unsaturated carbon bond, the number of the cyano group in the other of the R1 and the R2 is one or larger; and (C) when one of the R1 and the R2 include neither the cyano-group-containing group nor the unsaturated carbon bond and the other of the R1 and the R2 includes the cyano-group-containing group but does not include the unsaturated carbon bond, the number of the cyano group in the other of the R1 and the R2 is two or larger,

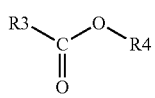

(2)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another; R4 is one of a cyano-group-containing group, halogenated groups thereof, and groups each obtained by bonding two or more of the foregoing groups to one another; a cyano group in the cyano-group-containing group is bonded to an oxygen atom at a terminal of a —C(=O)—O— bond with one or more carbon atoms in between; (D) when the R3 includes an unsaturated carbon bond, number of the cyano group in the R4 is one or larger; (E) when the R3 does not include the unsaturated carbon bond and the R4 includes the unsaturated carbon bond, the number of the cyano group in the R4 is one or larger; and (F) when the R3 does not include the unsaturated carbon bond and the R4 does not include the unsaturated carbon bond, the number of the cyano group in the R4 is two or larger.

According to an embodiment of the present technology, there is provided an electric power tool including: a secondary battery; and a movable section supplied with electric power from the secondary battery. The secondary battery includes a cathode, an anode, and an electrolytic solution including a cyano compound, the cyano compound including a compound represented by a following Formula (1), a compound represented by a following Formula (2), or both,

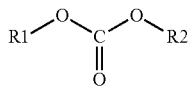

(1)

where R1 and R2 are each one of a saturated hydrocarbon group, an unsaturated hydrocarbon group, an oxygen-containing saturated hydrocarbon group, a cyano-group-containing group, halogenated groups of the foregoing groups, and groups each obtained by bonding two or more of the foregoing groups to one another, and the R1, the R2, or both include the cyano-group-containing group; a cyano group in the cyano-group-containing group is bonded to an oxygen atom (O) at a terminal of a —O—C(=O)—O— bond with one or more carbon atoms (C) in between; (A) when one of the R1 and the R2 does not include the cyano-group-containing group but includes an unsaturated carbon bond and the other of the R1 and the R2 includes the cyano-group-containing group, number of the cyano group in the other of the R1 and the R2 is one or larger; (B) when one of the R1 and the R2 include neither the cyano-group-containing group nor the unsaturated carbon bond and the other of the R1 and the R2 includes the cyano-group-containing group and the unsaturated carbon bond, the number of the cyano group in the other of the R1 and the R2 is one or larger; and (C) when one of the R1 and the R2 include neither the cyano-group-containing group nor the unsaturated carbon bond and the other of the R1 and the R2 includes the cyano-group-containing group but does not include the unsaturated carbon bond, the number of the cyano group in the other of the R1 and the R2 is two or larger,

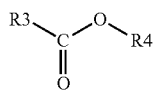

(2)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another; R4 is one of a cyano-group-containing group, halogenated groups thereof, and groups each obtained by bonding two or more of the foregoing groups to one another; a cyano group in the cyano-group-containing group is bonded to an oxygen atom at a terminal of a —C(=O)—O— bond with one or more carbon atoms in between; (D) when the R3 includes an unsaturated carbon bond, number of the cyano group in the R4 is one or larger; (E) when the R3 does not include the unsaturated carbon bond and the R4 includes the unsaturated carbon bond, the number of the cyano group in the R4 is one or larger; and (F) when the R3 does not include the unsaturated carbon bond and the R4 does not include the unsaturated carbon bond, the number of the cyano group in the R4 is two or larger.

According to an embodiment of the present technology, there is provided an electronic apparatus including a secondary battery as an electric power supply source. The secondary battery includes a cathode, an anode, and an electrolytic solution including a cyano compound, the cyano compound including a compound represented by a following Formula (1), a compound represented by a following Formula (2), or both,

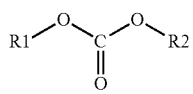

(1)

where R1 and R2 are each one of a saturated hydrocarbon group, an unsaturated hydrocarbon group, an oxygen-containing saturated hydrocarbon group, a cyano-group-containing group, halogenated groups of the foregoing groups, and groups each obtained by bonding two or more of the foregoing groups to one another, and the R1, the R2, or both include the cyano-group-containing group; a cyano group in the cyano-group-containing group is bonded to an oxygen atom (O) at a terminal of a —O—C(=O)—O— bond with one or more carbon atoms (C) in between; (A) when one of the R1 and the R2 does not include the cyano-group-containing group but includes an unsaturated carbon bond and the other of the R1 and the R2 includes the cyano-group-containing group, number of the cyano group in the other of the R1 and the R2 is one or larger; (B) when one of the R1 and the R2 include neither the cyano-group-containing group nor the unsaturated carbon bond and the other of the R1 and the R2 includes the cyano-group-containing group and the unsaturated carbon bond, the number of the cyano group in the other of the R1 and the R2 is one or larger; and (C) when one of the R1 and the R2 include neither the cyano-group-containing group nor the unsaturated carbon bond and the other of the R1 and the R2 includes the cyano-group-containing group but does not include the unsaturated carbon bond, the number of the cyano group in the other of the R1 and the R2 is two or larger,

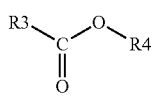

(2)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another; R4 is one of a cyano-group-containing group, halogenated groups thereof, and groups each obtained by bonding two or more of the foregoing groups to one another; a cyano group in the cyano-group-containing group is bonded to an oxygen atom at a terminal of a —C(=O)—O— bond with one or more carbon atoms in between; (D) when the R3 includes an unsaturated carbon bond, number of the cyano group in the R4 is one or larger; (E) when the R3 does not include the unsaturated carbon bond and the R4 includes the unsaturated carbon bond, the number of the cyano group in the R4 is one or larger; and (F) when the R3 does not include the unsaturated carbon bond and the R4 does not include the unsaturated carbon bond, the number of the cyano group in the R4 is two or larger.

As used herein, the term "cyano-group-containing group" collectively refers to groups that each include one or more cyano groups in part thereof. The cyano group in the "cyano-group-containing group" is indirectly bonded to the oxygen atom at the terminal of the —O—C(=O)—O— bond or of the —C(=O)—O— bond with one or more carbon atoms in between, as described above. Accordingly, the cyano group (—CN) is not encompassed by "cyano-group-containing group" described herein since the cyano group itself is directly bonded to the oxygen atom at the terminal Further, the term "halogenated group" refers to a group obtained by substituting each of part or all of hydrogen groups in a group such as a saturated hydrocarbon group by a halogen group.

According to the electrolytic solution and the secondary battery according to the embodiments of the present technology, the electrolytic solution includes the above-described cyano compound. Therefore, superior battery characteristics are obtained. Further, similar effects are obtained in the battery pack, in the electric vehicle, in the electric power storage system, in the electric power tool, and in the electronic apparatus according to the embodiments of the present technology.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Preferred embodiments of the present technology will be hereinafter described in detail with reference to the drawings. Description will be given in the following order.
1. First Embodiment/Electrolytic Solution and Secondary Battery (cyano compound: the number of cyano group is limited)
1-1. Lithium Ion Secondary Battery (Cylindrical Type)
1-2. Lithium Ion Secondary Battery (Laminated Film Type)
1-3. Lithium Metal Secondary Battery (Cylindrical Type and Laminated Film Type)
2. Second Embodiment/Secondary Battery (cyano compound: the number of cyano group is not limited+metal-based material)
2-1. Lithium Ion Secondary Battery (Cylindrical Type)
2-2. Lithium Ion Secondary Battery (Laminated Film Type)
3. Third Embodiment/Electrolytic Solution and Secondary Battery (cyano compound: the number of cyano group is not limited+non-cyano compound)
3-1. Lithium Ion Secondary Battery (Cylindrical Type)
3-2. Lithium Ion Secondary Battery (Laminated Film Type)
3-3. Lithium Metal Secondary Battery (Cylindrical Type and Laminated Film Type)
4. Applications of Secondary Battery
4-1. Battery Pack
4-2. Electric Vehicle
4-3. Electric Power Storage System
4-4. Electric Power Tool

1. First Embodiment/Electrolytic Solution and Secondary Battery (Cyano Compound: The Number of Cyano Group is Limited)

First, description will be given of an electrolytic solution and a secondary battery of a first embodiment of the present technology.

[1-1. Lithium Ion Secondary Battery (Cylindrical Type)]

Figure 1:
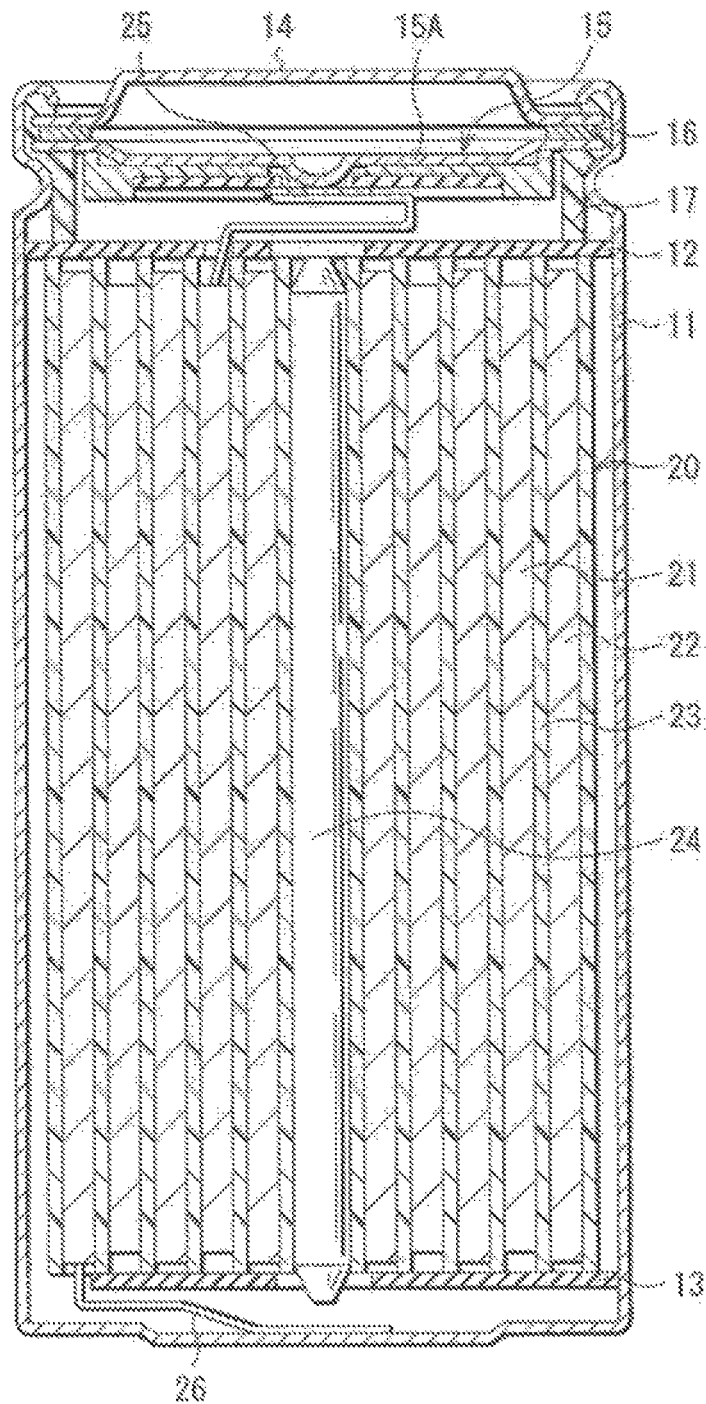
FIG. 1 is a cross-sectional view illustrating a configuration of a secondary battery (cylindrical type) provided with an electrolytic solution of a first embodiment of the present technology.
Figure 2:
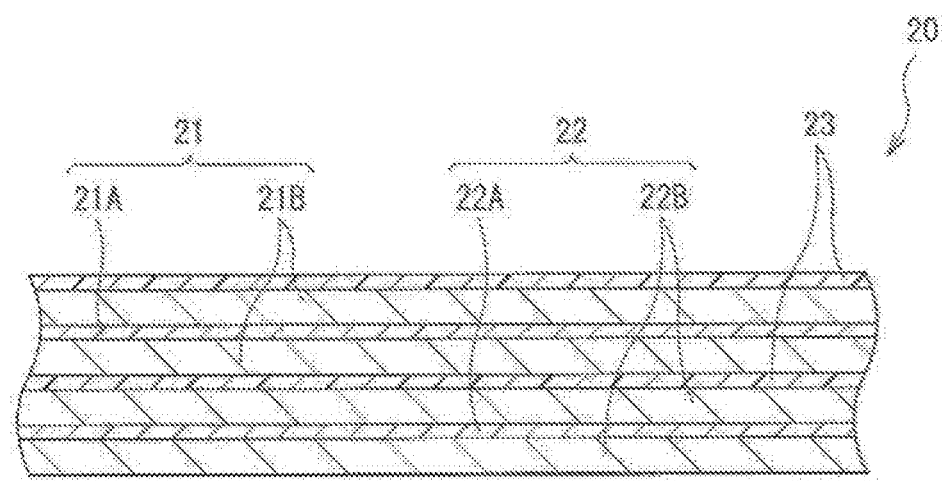
FIG. 2 is a cross-sectional view illustrating an enlarged part of a spirally wound electrode body illustrated in FIG. 1.

FIG. 1 and FIG. 2 each illustrate a cross-sectional configuration of a secondary battery that uses the electrolytic solution of the present embodiment. It is to be noted that FIG. 2 illustrates an enlarged part of a spirally wound electrode body 20 shown in FIG. 1.

[General Configuration of Secondary Battery]

The secondary battery described herein is a lithium secondary battery (lithium ion secondary battery) in which a capacity of an anode 22 is obtained by insertion and extraction of Li that is an electrode reactant, and is of a so-called cylindrical type.

In the present secondary battery, for example, the spirally wound electrode body 20 and a pair of insulating plates 12 and 13 may be contained in a battery can 11 that has a shape of a substantially hollow cylinder. The spirally wound electrode body 20 may be formed of, for example, a cathode 21 and the anode 22 that are laminated with a separator 23 in between and then are spirally wound.

The battery can 11 has a hollow structure in which one end of the battery can 11 is closed and the other end thereof is open. The battery can 11 may be formed of, for example, iron, aluminum, an alloy thereof, and/or the like. The surface of the battery can 11 may be plated with, for example, nickel and/or the like. The pair of insulating plates 12 and 13 are arranged so as to sandwich the spirally wound electrode body 20 in between, and extend perpendicularly with respect to a spirally wound periphery surface of the spirally wound electrode body 20.

At the open end of the battery can 11, a battery cover 14, a safety valve mechanism 15, and a positive temperature coefficient device (PTC device) 16 are attached by being swaged with a gasket 17, and thereby the battery can 11 is hermetically sealed. The battery cover 14 may be formed of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, when an internal pressure becomes a certain level or higher, for example, due to reasons such as internal short circuit and external heating, a disk plate 15A inverts to cut electric connection between the battery cover 14 and the spirally wound electrode body 20. The PTC device 16 prevents abnormal heating resulting from a large current. The PTC device 16 is so configured that the resistance thereof is increased as the temperature rises. The gasket 17 may be formed of, for example, an insulating material. The surface of the gasket 17 may be coated with asphalt, for example.

A center pin 24 may be inserted in the center of the spirally wound electrode body 20. It is to be noted that the center pin 24 may not be inserted therein. The cathode 21 may be connected to, for example, a cathode lead 25 formed of an electrically-conductive material such as aluminum, and the anode 22 may be connected to, for example, an anode lead 26 formed of an electrically-conductive material such as nickel. The cathode lead 25 may be, for example, welded to the safety valve mechanism 15 and may be electrically connected to the battery cover 14. The anode lead 26 may be, for example, electrically connected to the battery can 11 by being welded to the battery can 11.

[Cathode]

The cathode 21 includes a cathode active material layer 21B on one or both sides of a cathode current collector 21A. The cathode current collector 21A may be formed of, for example, an electrically-conductive material such as aluminum, nickel, and stainless steel.

The cathode active material layer 21B includes, as a cathode active material, one or more of cathode materials that are capable of inserting and extracting lithium ions. The cathode active material layer 21B may include other materials such as a cathode binder and a cathode conductive agent where appropriate.

The cathode material is preferably a lithium-containing compound since high energy density is obtained thereby. The lithium-containing compound may be, for example, a compound such as a lithium transition metal composite oxide and a lithium transition metal phosphate compound. The lithium transition metal composite oxide is an oxide that includes Li and one or more transition metal elements as constituent elements. The lithium transition metal phosphate compound is a phosphate compound that includes Li and one or more transition metal elements as constituent elements. In particular, the transition metal element is preferably one or more of elements such as Co, Ni, Mn, and Fe since a higher voltage is obtained thereby. The chemical formulas of the compounds may be, for example, represented by one of $Li_xM1O2$ and $Li_yM2PO4$. In the formulas, M1 and M2 each represent one or more transition metal elements. Values of x and y vary depending on the charge and discharge states of the battery. To give an example, the values of x and y may satisfy $0.05 \leq x \leq 1.10$ and $0.05 \leq y \leq 1.10$.

Examples of the lithium transition metal composite oxide may include $LiCoO2$, $LiNiO2$, and lithium-nickel-based composite oxides represented by the following Formula (30). Examples of the lithium transition metal phosphate compound may include $LiFePO4$ and $LiFe_{1-u}Mn_uPO4$ (u<1) since high battery capacity is obtained and superior cycle characteristics are also obtained thereby.

$$LiNi_{1-z}M_zO2 \qquad (30)$$

(M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb, and z satisfies $0.005<z<0.5$.)

Other than the above-described materials, the cathode material may be, for example, oxides, disulfides, calcogenides, and electrically-conductive polymers. Examples of the oxides may include titanium oxide, vanadium oxide, and manganese dioxide. Examples of the disulfides may include titanium disulfide and molybdenum sulfide. Examples of the calcogenides may include niobium selenide. Examples of the electrically-conductive polymer may include sulfur, polyaniline, and polythiophene. It is to be noted that the cathode material is not limited to the materials described above and may be other materials.

The cathode binder may be, for example, one or more of materials such as synthetic rubbers and polymer materials. Examples of the synthetic rubbers may include styrene-butadiene-based rubber, fluorine-based rubber, and ethylene propylene diene. Examples of the polymer materials may include polyvinylidene fluoride and polyimide.

The cathode conductive agent may be, for example, one or more of materials such as carbon materials. Examples of the carbon materials may include graphite, carbon black, acetylene black, and Ketjen black. It is to be noted that the cathode conductive agent may be, for example, metal materials, electrically-conductive polymers, or the like as long as the material has electrical conductivity.

[Anode]

The anode 22 includes an anode active material layer 22B on one or both sides of an anode current collector 22A.

The anode current collector 22A may be formed, for example, of an electrically-conductive material such as copper, nickel, and stainless steel. A surface of the anode current collector 22A is preferably roughened, since adhesive characteristics of the anode active material layer 22B with respect to the anode current collector 22A is improved due to a so-called anchor effect. In this case, it may be enough that the surface of the anode current collector 22A in a region opposed to the anode active material layer 22B is roughened at least. Examples of roughening methods may include a method of forming fine particles by utilizing electrolytic treatment. The electrolytic treatment is a method of providing concavities and convexities on the anode current collector 22A by forming fine particles thereon by using an electrolytic method in an electrolytic bath. A copper foil fabricated by the electrolytic method is generally called "electrolytic copper foil".

The anode active material layer 22B includes, as an anode active material, one or more of anode materials that are capable of inserting and extracting lithium ions. The anode active material layer 22B may include other materials such as an anode binder and an anode conductive agent where appropriate. Details of the anode binder and the anode conductive agent may be, for example, similar to those of the cathode binder and the cathode conductive agent, respectively. It is to be noted that a chargeable capacity of the anode material is preferably larger than a discharge capacity of the cathode 21 so as to prevent unintentional precipitation of lithium metal on the anode 22 during electric charge. Specifically, an electrochemical equivalent of the anode material capable of inserting and extracting lithium ions is preferably larger than an electrochemical equivalent of the cathode 21.

The anode material may be, for example, a carbon material. One reason for this is that, in the carbon material, a change in crystal structure upon insertion and extraction of lithium ions is extremely small, and therefore, high energy density and superior cycle characteristics are obtainable. Another reason is that the carbon material also functions as an anode conductive agent. Examples of the carbon material may include graphitizable carbon, non-graphitizable carbon in which the spacing of (002) plane is 0.37 nm or larger, and graphite in which the spacing of (002) plane is 0.34 nm or smaller. More specifically, examples of the carbon material may include pyrolytic carbons, cokes, glassy carbon fiber, an organic polymer compound fired body, activated carbon, and carbon blacks. Of the foregoing, examples of the cokes may include pitch coke, needle coke, and petroleum coke. The organic polymer compound fired body is a material in which a polymer compound such as phenol resin and furan resin is fired (carbonized) at appropriate temperature. In addition to the above-mentioned materials, the carbon material may be low crystalline carbon or amorphous carbon that is heat-treated at temperature of about 1000° C. or lower. It is to be noted that the shape of the carbon material may be a fibrous shape, a spherical shape, a granular shape, a scale-like shape, etc.

Alternatively, the anode material may be, for example, a material (metal-based material) that includes one or more of metal elements and metalloid elements as constituent elements since high energy density is obtained thereby. The metal-based material may be a simple substance, an alloy, or a compound, may be two or more thereof, or may have one or more phases thereof in part or all of the material. "Alloy" includes a material that includes one or more metal elements and one or more metalloid elements, in addition to a material configured of two or more metal elements. Further, "alloy" may contain a non-metal element. Example of a texture thereof may include a solid solution, a eutectic crystal (eutectic mixture), an intermetallic compound, and a texture in which two or more thereof coexist.

The above-described metal element and metalloid element may be, for example, one or more of metal elements and metalloid elements that are capable of forming an alloy with Li. Specific examples thereof may include Mg, B, Al, Ga, In, Si, Ge, Sn, Pb, Bi, Cd, Ag, Zn, Hf, Zr, Y, Pd, and Pt. In particular, Si, Sn, or both are preferably used since Si and Sn have high ability of inserting and extracting lithium ions, and therefore, high energy density is obtained.

A material that includes Si, Sn, or both may be a simple substance, an alloy, or a compound of Si or Sn; two or more thereof; or a material that has one or more phases thereof in part or all of the material. It is to be noted that, as used herein the term "simple substance" merely refers to a simple substance in a general meaning (a small amount of impurity may be contained therein), and does not necessarily refer to a simple substance of purity 100%.

The alloy of Si may include, for example, one or more of elements such as Sn, Ni, Cu, Fe, Co, Mn, Zn, In, Ag, Ti, Ge, Bi, Sb, and Cr as constituent elements other than Si. The compounds of Si may include, for example, one or more elements such as C and O as constituent elements other than Si. It is to be noted that the compound of Si may include, for example, one or more of the elements described for the alloys of Si as constituent elements other than Si.

Specific examples of the alloys and the compounds of Si include SiB4, SiB6, Mg2Si, Ni2Si, TiSi2, MoSi2, CoSi2, NiSi2, CaSi2, CrSi2, Cu5Si, FeSi2, MnSi2, NbSi2, TaSi2, VSi2, WSi2, ZnSi2, SiC, Si3N4, Si2N2O, SiOv (0<v≤2), and LiSiO. It is to be noted that v in SiOv may satisfy 0.2<v<1.4.

The alloy of Sn may include, for example, one or more of elements such as Si, Ni, Cu, Fe, Co, Mn, Zn, In, Ag, Ti, Ge, Bi, Sb, and Cr as constituent elements other than Sn. The compound of Sn may include one or more of elements such as C and O as constituent elements other than Sn. It is to be noted that the compound of Sn may include, for example, one or more of the elements described for the alloys of Sn as constituent elements other than Sn. Specific examples of the alloys and the compounds of Sn include SnOw (0<w≤2), SnSiO3, LiSnO, and Mg2Sn.

Further, as a material that includes Sn as a constituent element, for example, a material that includes Sn as a first constituent element and includes second and third constituent elements in addition thereto is preferable. The second constituent element may be, for example, one or more of elements such as Co, Fe, Mg, Ti, V, Cr, Mn, Ni, Cu, Zn, Ga, Zr, Nb, Mo, Ag, In, Ce, Hf, Ta, W, Bi, and Si. The third constituent element may be, for example, one or more of elements such as B, C, Al, and P. One reason for this is that, by including the second and third constituent elements, for example, high battery capacity, superior cycle characteristics, and the like are obtained.

In particular, a material (SnCoC-containing material) that includes Sn, Co, and C as constituent elements is preferable. In the SnCoC-containing material, for example, the C content may be from 9.9 mass % to 29.7 mass % both inclusive, and the ratio of Sn and Co contents (Co/(Sn+Co)) may be from 20 mass % to 70 mass % both inclusive, since high energy density is obtained thereby.

The SnCoC-containing material includes a phase that includes Sn, Co, and C. The phase is preferably low crystalline or amorphous. The phase is a reactive phase capable of reacting with Li, and therefore, further superior characteristics are obtained due to the presence of the reactive phase. A half bandwidth of a diffraction peak of the phase obtained by X-ray diffraction is preferably 10° or larger at a diffraction angle of 2θ in the case where a CuKα ray is used as a specific X ray and the sweep rate is 1°/min. This allows lithium ions to be inserted and extracted more smoothly, and reduces reactivity with the electrolytic solution. It is to be noted that the SnCoC-containing material may include a phase that includes the simple substance of each constituent element or part of the constituent elements in addition to a low-crystalline phase or an amorphous phase.

Whether or not the diffraction peak obtained by X-ray diffraction corresponds to a reactive phase capable of reacting with Li is easily determined by comparing X-ray diffraction charts before and after electrochemical reaction with Li. For example, when the position of the diffraction peak before the electrochemical reaction with Li is different from that after the electrochemical reaction, the diffraction peak corresponds to a reactive phase capable of reacting with Li. In this case, for example, the diffraction peak of a low-crystalline reactive phase or an amorphous reactive phase may be detected within a range of 2θ=20° to 50°. Such a reactive phase may include, for example, the above-described constituent elements, and is considered to be changed to be low crystalline or amorphous mainly due to the presence of C.

In the SnCoC-containing material, part or all of C which is a constituent element is preferably bonded to a metal element or a metalloid element which is another constituent element. Thus, aggregation and crystallization of, for example, materials such as Sn is suppressed. The bonding state of elements may be determined, for example, by X-ray photoelectron spectroscopy (XPS). In a commercially-available apparatus, for example, an Al-Kα ray, an Mg-Kα ray, etc. may be used as a soft X ray. In the case where part or all of C is bonded to an element such as a metal element and a metalloid element, the peak of a composite wave of the is orbit (C1s) of C is observed in a region lower than 284.5 eV. It is to be noted that energy calibration is performed so as to allow the peak of the 4f orbit (Au4f) of an Au atom to be obtained at 84.0 eV. In this case, typically, since surface contamination carbon is present on a material surface, the peak of C1s of the surface contamination carbon is defined at 284.8 eV, and is used as an energy reference. In XPS measurement, the waveform of the peak of C1s is obtained in a form that includes the peak of the surface contamination carbon and the peak of carbon in the SnCoC-containing material. Therefore, the peak of the surface contamination carbon and the peak of carbon in the SnCoC-containing material are separated, for example, by analysis with the use of commercially-available software. In the analysis of the waveform, the position of a main peak that is in a region closer to the lowest binding energy is used as the energy reference (284.8 eV).

It is to be noted that SnCoC-containing material is not limited to a material (SnCoC) that includes only Sn, Co, and C as constituent elements. The SnCoC-containing material may further include, for example, one or more of elements such as Si, Fe, Ni, Cr, In, Nb, Ge, Ti, Mo, Al, P, Ga, and Bi as constituent elements in addition to Sn, Co, and C.

In addition to the SnCoC-containing material, a material (SnCoFeC-containing material) that includes Sn, Co, Fe, and C as constituent elements is also preferable. The composition of the SnCoFeC-containing material may be any composition. To give an example, in the composition in which the Fe content is set smaller, the C content may be from 9.9 mass % to 29.7 mass % both inclusive, the Fe content may be from 0.3 mass % to 5.9 mass % both inclusive, and the ratio of contents of Sn and Co (Co/(Sn+Co)) may be from 30 mass % to 70 mass % both inclusive. Further, for example, in the composition in which the Fe content is set larger, the C content may be from 11.9 mass % to 29.7 mass % both inclusive, the ratio of contents of Sn, Co, and Fe ((Co+Fe)/(Sn+Co+Fe)) may be from 26.4 mass % to 48.5 mass % both inclusive, and the ratio of contents of Co and Fe (Co/(Co+Fe)) may be from 9.9 mass % to 79.5 mass % both inclusive. One reason for these is that, in such a composition range, high energy density is obtained. The physical properties (such as half bandwidth) of the SnCoFeC-containing material are similar to those of the above-described SnCoC-containing material.

In addition to the above-mentioned materials, the anode material may be, for example, a material such as a metal oxide and a polymer compound. Examples of the metal oxide may include iron oxide, ruthenium oxide, and molybdenum oxide. Examples of the polymer compound may include polyacetylene, polyaniline, and polypyrrole.

The anode active material layer 22B may be formed, for example, by a coating method, a vapor-phase method, a liquid-phase method, a spraying method, a firing method (sintering method), or a combination of two or more of these methods. The coating method may be, for example, a method in which, after a particulate (powder) anode active material is mixed with materials such as the anode binder, the mixture is dispersed in a solvent such as an organic solvent, and the anode current collector 22A is coated with the resultant. Examples of the vapor-phase method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase method may include an electrolytic plating method and an electroless plating method. The spraying method may be, for example, a method in which an anode active material in a fused state or a semi-fused state is sprayed onto the anode current collector 22A. The firing method may be, for example, a method in which, after the anode current collector 22A is coated by a coating method, heat treatment is performed at temperature higher than the melting point of the materials such as the anode binder. As the firing method, for example, an atmosphere firing method, a reactive firing method, a hot press firing method, etc. may be used.

In the present secondary battery, as described above, in order to prevent unintentional precipitation of lithium metal on the anode 22 in the middle of charge, the electrochemical equivalent of the anode material capable of inserting and extracting lithium ions is larger than the electrochemical equivalent of the cathode. Further, when the open circuit voltage (that is, a battery voltage) at the time of completely-charged state is equal to or larger than 4.25 V, the extraction amount of lithium ions per unit mass is larger than that in the case where the open circuit voltage is 4.20 V even if the same cathode active material is used. Therefore, amounts of the cathode active material and the anode active material are adjusted in accordance therewith. Thus, high energy density is obtained.

[Separator]

The separator 23 separates the cathode 21 from the anode 22, and thereby passes lithium ions while preventing current short circuit resulting from contact of the both electrodes. The separator 23 may be, for example, a porous film made of a material such as a synthetic resin and ceramics. The separator 23 may be a laminated film in which two or more porous films are laminated. Examples of the synthetic resin may include polytetrafluoroethylene, polypropylene, and polyethylene.

In particular, the separator 23 may include, for example, a polymer compound layer on one or both surfaces of the above-described porous film (base material layer) since adhesive characteristics of the separator 23 with respect to the cathode 21 and the anode 22 are improved, and therefore, distortion of the spirally wound electrode body 20 is suppressed. Hence, a decomposition reaction of the electrolytic solution is suppressed, and liquid leakage of the electrolytic solution with which the base material layer is impregnated is suppressed. Accordingly, the resistance of the secondary battery is less likely to be increased even if the battery is charged and discharged repeatedly, and battery swollenness is suppressed.

The polymer compound layer may include, for example, a polymer material such as polyvinylidene fluoride since such a polymer material has superior physical strength and is electrochemically stable. However, the polymer material is not limited to polyvinylidene fluoride. In a case where the polymer compound layer is formed, for example, solution in which the polymer material is dissolved may be prepared, and then the base material layer may be coated with the solution and may be dried. It is to be noted that the base material layer may be soaked in the solution and then may be dried.

[Electrolytic Solution]

The separator 23 is impregnated with an electrolytic solution that is an liquid electrolyte. The electrolytic solution includes one or more of cyano compounds. The cyano compound includes a compound represented by the following Formula (1), a compound represented by the following Formula (2), or both. It is to be noted that the electrolytic solution may include other materials such as a solvent and an electrolyte salt.

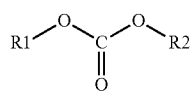

(1)

(R1 and R2 are each one of a saturated hydrocarbon group, an unsaturated hydrocarbon group, an oxygen-containing saturated hydrocarbon group, a cyano-group-containing group, halogenated groups of the foregoing groups, and groups each obtained by bonding two or more of the foregoing groups to one another, and R1, R2, or both include the cyano-group-containing group. A cyano group in the cyano-group-containing group is bonded to an oxygen atom (O) at a terminal of a —O—C(=O)—O— bond with one or more carbon atoms (C) in between. It is to be noted that (A) when one of R1 and R2 does not include the cyano-group-containing group but includes an unsaturated carbon bond and the other of R1 and R2 includes the cyano-group-containing group, the number of the cyano group in the other of R1 and R2 is one or larger. (B) When one of R1 and R2 include neither the cyano-group-containing group nor the unsaturated carbon bond and the other of R1 and R2 includes the cyano-group-containing group and the unsaturated carbon bond, the number of the cyano group in the other of R1 and R2 is one or larger. (C) When one of R1 and R2 include neither the cyano-group-containing group nor the unsaturated carbon bond and the other of R1 and R2 includes the cyano-group-containing group but does not include the unsaturated carbon bond, the number of the cyano group in the other of R1 and R2 is two or larger.)

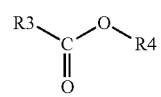

(2)

(R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another. R4 is one of a cyano-group-containing group, a halogenated group thereof, and groups each obtained by bonding two or more of the foregoing groups to one another. A cyano group in the cyano-group-containing group is bonded to an oxygen atom at a terminal of a —C(=O)—O— bond with one or more carbon atoms in between. It is to be noted that (D) when R3 includes an unsaturated carbon bond, the number of the cyano group in R4 is one or larger. (E) When R3 does not include the unsaturated carbon bond and R4 includes the unsaturated carbon bond, the number of the cyano group in R4 is one or larger. (F) When R3 does not include the unsaturated carbon bond and R4 does not include the unsaturated carbon bond, the number of the cyano group in R4 is two or larger.)

As used herein, the term "cyano-group-containing group" collectively refers to groups that each include one or more cyano groups in part thereof as described above. The cyano group (—CN) is not included in "cyano-group-containing group" described herein. Further, the term "halogenated group" refers to a group obtained by substituting each of part or all of hydrogen groups in a group such as a saturated hydrocarbon group by a halogen group.

The cyano compound collectively refers to compounds that each include one or more cyano groups (—CN). More specifically, the compound represented by Formula (1) includes an carbonate-ester type bond (—O—C(=O)—O—) as a skeleton and the compound represented by Formula (2) includes an ester type bond (—C(=O)—O—) as a skeleton. Hereinafter, the former compound and the latter compound will be referred to as "carbonate-ester type cyano compound" and "ester type cyano compound", respectively, and the both compounds will be collectively referred to as "cyano compound" where appropriate.

One reason why the electrolytic solution includes the cyano compound is that chemical stability is improved thereby compared to in a case where the cyano compound is not included, and therefore, a decomposition reaction is suppressed. In more detail, a rigid film is formed mainly on a surface of the anode 22 resulting from the cyano compound upon electric charge and discharge, and this suppresses a decomposition reaction of the electrolytic solution that is caused by the presence of highly-reactive anode 22.

Accordingly, even when a secondary battery is repeatedly charged and discharged and is stored, decrease in discharge capacity is suppressed. Such a tendency is remarkable, in particular, when the secondary battery is charged and discharged or is stored under severe temperature environment such as high temperature environment.

In Formula (1), the types of R1 and R2 are not particularly limited as long as R1 and R2 are each one of the saturated hydrocarbon group, the unsaturated hydrocarbon group, the oxygen-containing saturated hydrocarbon group, the cyano-group-containing group, the halogenated groups of the foregoing groups, and the groups each obtained by bonding two or more of the foregoing groups to one another as described above. It is to be noted that R1 and R2 may be the same type of group or may be different types of group. Further, R1 and R2 may be bonded to each other and the bonded R1 and R2 may form a ring.

However, the following two conditions are necessary. The first condition is that R1, R2, or both include the cyano-group-containing group (that is, the cyano group). Therefore, only R1 may include the cyano group, only R2 may include the cyano group, or both R1 and R2 may each include the cyano group. The second condition is that a cyano group in the cyano-group-containing group is bonded to an oxygen atom at a terminal of a —O—C(=O)—O— bond with one or more carbon atoms in between. In other words, the cyano group is not directly bonded to the oxygen atom and is indirectly bonded to the oxygen atom with a carbon atom in between. One reason for this is that, as will be described later, the above-described advantages are obtained independently of types of R1 and R2 since the carbonate-ester type cyano compound includes the predetermined number of cyano groups and the cyano group is indirectly bonded to the oxygen atom with a carbon atom in between. The number of carbon atom that is interposed between the cyano group and the oxygen atom is not particularly limited but is preferably not excessively large since properties such as solubility and compatibility of the cyano compound are secured thereby. More specifically, the number of carbon atom is preferably 20 or smaller.

Moreover, the number of the above-described cyano group is limited depending on the following cases (cases A to C). Specifically, when each of R1 and R2 include the cyano group, the number (total number) of cyano group is not limited. On the other hand, when only one of R1 and R2 includes the cyano group, the number (total number) of the cyano group differs between the cases A to C.

In the case A where one of R1 and R2 does not include the cyano group but includes an unsaturated carbon bond (one or more carbon-carbon double bonds or carbon-carbon triple bonds), the number of cyano group in the other of R1 and R2 that includes the cyano group is one or larger. One reason for this is that, when one of R1 and R2 includes the unsaturated carbon bond, a film resulting from the cyano compound is easily formed intrinsically, and therefore, it is enough that at least one cyano group that contributes to reactivity of the cyano compound is present. The type of the one of R1 and R2 in this case may be one of, for example, an unsaturated hydrocarbon group, halogenated groups thereof, groups each obtained by bonding two or more of groups including the foregoing groups to one another, etc. The other of R1 and R2 that includes the cyano group may include an unsaturated carbon bond or may not include an unsaturated carbon bond.

In the case B where one of R1 and R2 does not include the cyano group or the unsaturated carbon bond and the other of R1 and R2 that includes the cyano group includes the unsaturated carbon bond, the number of cyano group in the other of R1 and R2 is one or larger. One reason for this is that, when one of R1 and R2 does not include the unsaturated carbon bond but the other of R1 and R2 includes the unsaturated carbon bond, a film resulting from the cyano compound is easily formed intrinsically, and therefore, it is enough that at least one cyano group that contributes to reactivity of the cyano compound is present. The type of the one of R1 and R2 in this case may be one of, for example, a saturated hydrocarbon group, an oxygen-containing hydrocarbon group, halogenated groups of the foregoing groups, and groups each obtained by bonding two or more of groups including the foregoing groups to one another, etc. The type of the other of R1 and R2 that includes the cyano group and the unsaturated carbon bond will be described later.

In the case C where one of R1 and R2 include neither the cyano group nor the unsaturated carbon bond and the other of R1 and R2 that includes the cyano group does not include the unsaturated carbon bond, the number of cyano group in the other of R1 and R2 is two or larger. One reason for this is that, when either of R1 and R2 does not include the unsaturated carbon bond, a film resulting from the cyano compound is less likely to be formed intrinsically, and therefore, two or more cyano groups are necessary that contribute to reactivity of the cyano compound. The type of the one of R1 and R2 in this case may be one of, for example, a saturated hydrocarbon group, an oxygen-containing hydrocarbon group, halogenated groups of the foregoing groups, and groups each obtained by bonding two or more of groups including the foregoing groups to one another, etc. The type of the other of R1 and R2 that includes the cyano group but does not include the unsaturated carbon bond will be described later.

In Formula (2), the type of R3 is not particularly limited as long as R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another as described above. Further, the type of R4 is not particularly limited as long as R4 is one of a cyano-group-containing group, halogenated groups thereof, and groups each obtained by bonding two or more of the foregoing groups to one another as described above. It is to be noted that R3 and R4 may be bonded to each other and the bonded R3 and R4 may form a ring.

However, as in the carbonate-ester type cyano compound, it is made a condition that a cyano group in the cyano-group-containing group is bonded to an oxygen atom at a terminal of a —C(=O)—O— bond with one or more carbon atoms in between. One reason for this is that, as will be described later, the above-described advantages are obtained independently of the type of R3 since the ester type cyano compound includes a predetermined number of cyano groups and the cyano group is indirectly bonded to an oxygen atom with a carbon atom in between.

Moreover, the number of the above-described cyano group is limited depending on the following cases (cases D to F). Specifically, the number (total number) of cyano group in R4 that includes the cyano group differs between the cases D to F.

In the case D where R3 includes an unsaturated carbon bond (one or more carbon-carbon double bonds or carbon-carbon triple bonds), the number of cyano group in R4 is one or larger. One reason for this is that, when R3 includes the unsaturated carbon bond, a film resulting from the cyano compound is easily formed intrinsically, and therefore, it is enough that at least one cyano group is present that contributes to reactivity of the cyano compound. The type of R3 in this case may be one of, for example, an unsaturated hydrocarbon group, halogenated groups thereof, groups each obtained by bonding two or more of groups including the foregoing groups to one another, etc. R4 that includes the cyano group may include the unsaturated carbon bond or may not include the unsaturated carbon bond.

In the case E where R3 does not include the unsaturated carbon bond and R4 includes the unsaturated carbon bond, the number of cyano group in R4 is one or larger. One reason for this is that, when R3 does not include the unsaturated carbon bond but R4 includes the unsaturated carbon bond, a film resulting from the cyano compound is easily formed intrinsically, and therefore, it is enough that at least one cyano group is present that contributes to reactivity of the cyano compound. The type of R3 in this case may be one of, for example, a saturated hydrocarbon group, an oxygen-containing hydrocarbon group, halogenated groups of the foregoing groups, and groups each obtained by bonding two or more of groups including the foregoing groups to one another, etc. The type of R4 that includes the cyano group and the unsaturated carbon bond will be described later.

In the case F where R3 does not include the unsaturated carbon bond and R4 does not include the unsaturated carbon bond either, the number of cyano group in R4 is two or larger. One reason for this is that, when either of R3 and R4 does not include the unsaturated carbon bond, a film resulting from the cyano compound is less likely to be formed intrinsically, and therefore, two or more cyano groups are necessary that contribute to reactivity of the cyano compound. The type of R3 in this case may be one of, for example, a saturated hydrocarbon group, an oxygen-containing hydrocarbon group, halogenated groups of the foregoing groups, and groups each obtained by bonding two or more of groups including the foregoing groups to one another, etc. The type of R4 that includes the cyano group but does not include the unsaturated carbon bond will be described later.

Here, the details of R1 to R3 are as follows. The term "hydrocarbon group" collectively refers to groups that are each configured of carbon (C) and hydrogen (H) and may be a straight-chain group or a branched group that has one or more side chains. Out of the hydrocarbon groups, "unsaturated hydrocarbon group" refers to a hydrocarbon group that has one or more unsaturated carbon bonds (carbon-carbon double bonds or carbon-carbon triple bonds) and "saturated hydrocarbon group" refers to a hydrocarbon group that does not include the above-described unsaturated carbon bond.

"Oxygen-containing hydrocarbon group" collectively refers to groups that are each configured of carbon, hydrogen, and oxygen (O), and may be a straight-chain group or a branched group that has one or more side chains.

The type of a halogen group in "halogenated group" is not particularly limited. However, the type thereof may be, for example, one or more of a fluorine group (—F), a chlorine group (—Cl), a bromine group (—Br), an iodine group (—I), etc., and, in particular, is preferably the fluorine group since a film resulting from the cyano compound is easily formed thereby.

"Group obtained by bonding two or more of the foregoing groups to one another" is a group in which two or more of the above-described monovalent groups such as a saturated hydrocarbon group are bonded to one another so as to be monovalent as a whole.

Specific examples of the saturated hydrocarbon group may include an alkyl group, a cycloalkyl group, and groups each obtained by bonding two or more of groups including the foregoing groups to one another. In particular, the carbon number of the alkyl group is preferably from 1 to 12 both inclusive and the carbon number of the cycloalkyl group is preferably from 3 to 18 both inclusive since superior solubility and superior compatibility are obtained thereby.

Specific examples of the unsaturated hydrocarbon group may include an alkenyl group, an alkynyl group, an aryl group, and groups each obtained by bonding two or more of groups including the foregoing groups to one another. In particular, the carbon numbers of the alkenyl group, of the alkynyl group, and of the aryl group are preferably from 2 to 12 both inclusive, from 2 to 12 both inclusive, and from 6 to 18 both inclusive, respectively, since superior solubility and superior compatibility are obtained thereby.

Specific examples of the oxygen-containing saturated hydrocarbon group may include an alkoxy group and groups each obtained by bonding two or more of groups including the foregoing group to one another. In particular, the carbon number of the alkoxy group is preferably from 1 to 12 both inclusive since superior solubility and superior compatibility are obtained thereby.

Specific examples of the halogenated group may include a group obtained by substituting, by a halogen group, each of part or all of hydrogen groups in the above-described alkyl group, cycloalkyl group, alkenyl group, alkynyl group, aryl group, alkoxy group, or a group obtained by bonding two or more of groups including the foregoing groups to one another.

Specific examples of the group obtained by bonding two or more of groups to one another may include a group (benzyl group) obtained by bonding an alkyl group and an aryl group to each other.

More specifically, examples of the alkyl group may include, a methyl group (—CH3), an ethyl group (—C2H5), and a propyl group (—C3H7). Examples of the alkenyl group may include a vinyl group (—C2H3) and an allyl group (—C3H5). Examples of the alkynyl group may include an ethynyl group (—C2H1). Examples of the aryl group may include a phenyl group and a naphtyl group. Examples of the cycloalkyl group may include a cyclopropyl group, a cyclobutyl group, a cyclopentyl group, a cyclohexyl group, a cycloheptyl group, and a cyclooctyl group. Examples of the alkoxy group may include a methoxy group (—OCH3) and an ethoxy group (—OC2H5). Examples of a halogenated group may include a trifluoromethyl group (—CF3) and a pentafluoroethyl group (—C2F5).

It is to be noted that R1 to R3 may each be a derivative of the above-described series of groups. The derivative is a group obtained by introducing one or more substituent groups into the series of groups and the substituent groups may be any type.

The type of the cyano-group-containing group is not particularly limited as long as the cyano-group-containing group contains one or more cyano groups and the cyano groups are each bonded to an oxygen atom at a terminal of a —O—C(=O)—O— bond or a —C(=O)—O— bond with a carbon atom in between. One reason for this is that, when the above-described conditions are satisfied, the above-described advantages are obtained independently of the chemical structure of the cyano-group-containing group.

Specific examples of the cyano-group-containing group may include a group obtained by substituting each of part or all of hydrogen groups in a saturated hydrocarbon group by a cyano group and a group obtained by substituting each of part or all of hydrogen groups in an unsaturated hydrocarbon group by a cyano group. In particular, the above-described saturated hydrocarbon group is preferably an alkyl group and the above-described unsaturated hydrocarbon group is preferably an aryl group. Further, the carbon number of the alkyl group is preferably from 1 to 12 both inclusive and the carbon number of the aryl group is preferably from 6 to 18 both inclusive since superior solubility and superior compatibility are obtained thereby. It is to be noted that the ciano-group-containing group may be a group other than those described above.

Specific examples of the cyano compound may be the followings. Examples of the carbonate-ester type cyano compound may include compounds represented by the following Formula (1-1) to Formula (1-25). Further, examples of the ester type cyano compound may include compounds represented by the following Formula (2-1) to Formula (2-21). It is to be noted that the cyano compound may be other compound that satisfies the conditions shown in Formula (1) or (2).

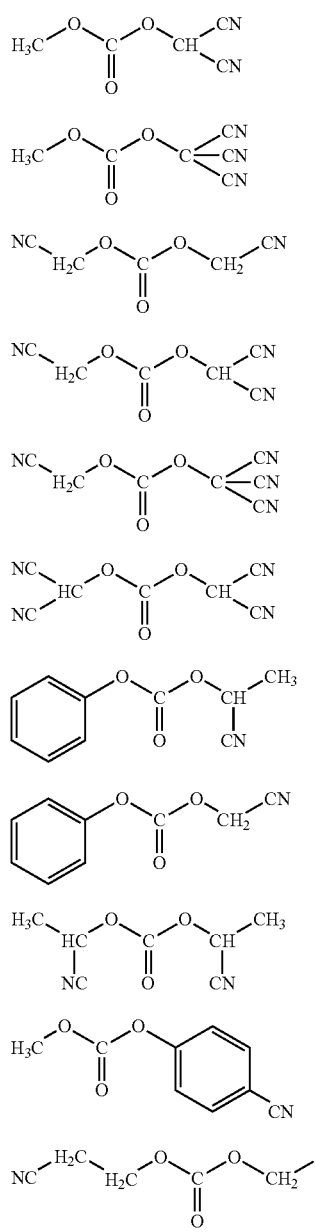

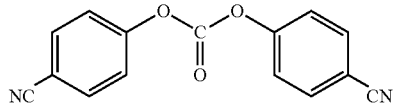
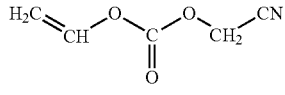
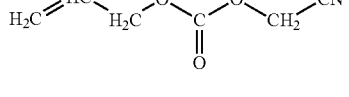
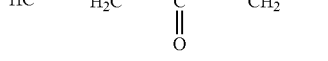
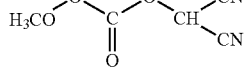
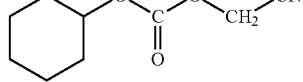
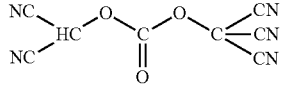
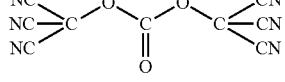
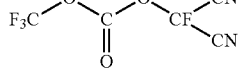
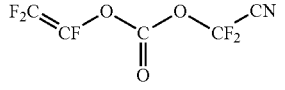
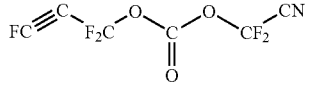
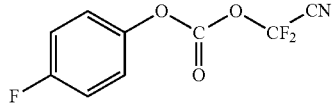
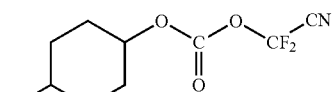
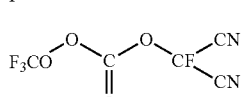
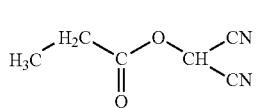

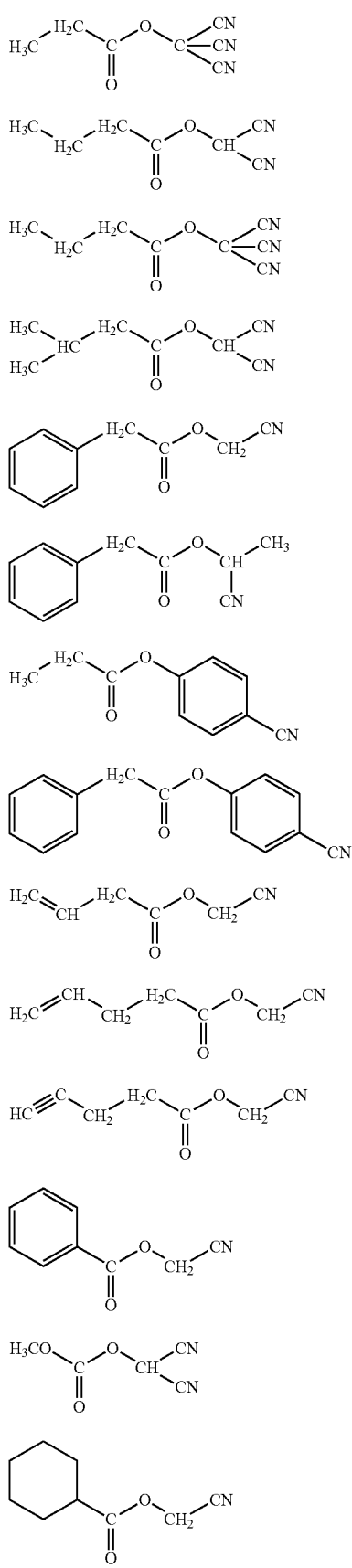

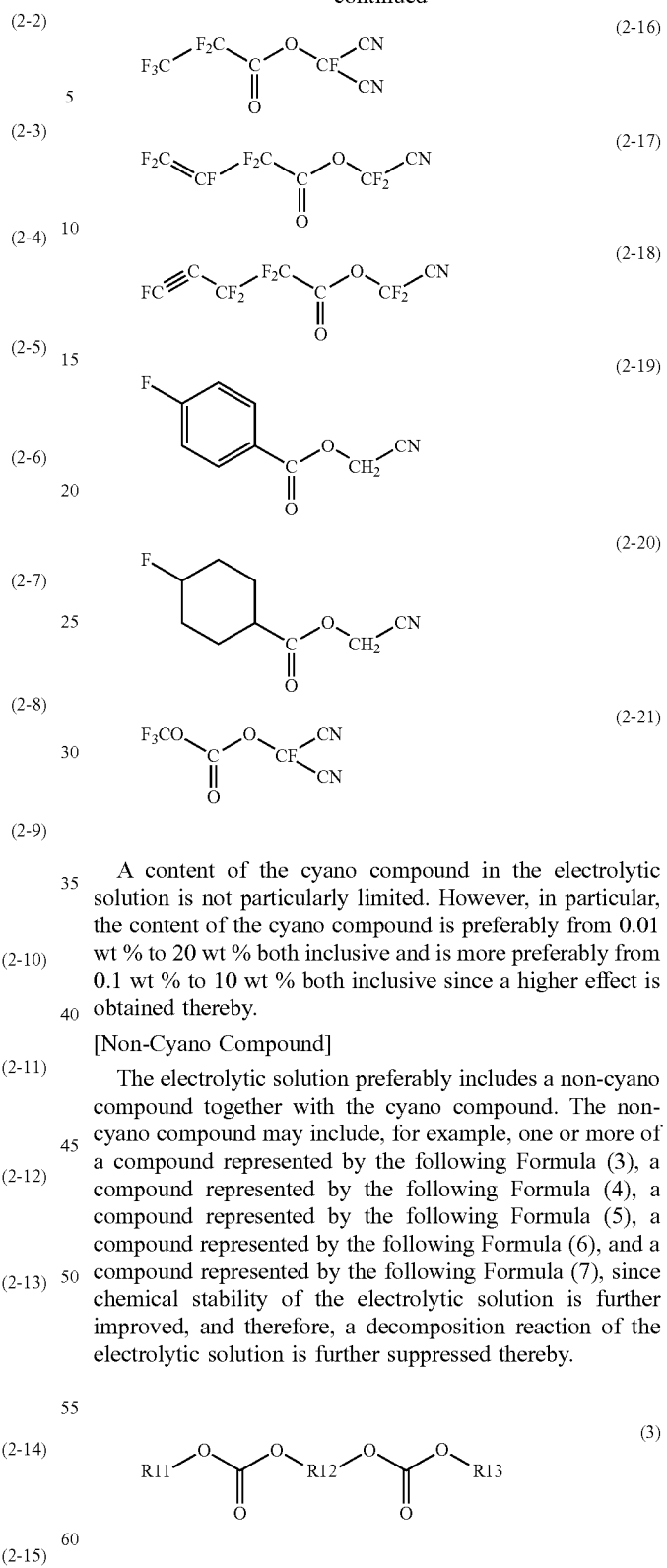

A content of the cyano compound in the electrolytic solution is not particularly limited. However, in particular, the content of the cyano compound is preferably from 0.01 wt % to 20 wt % both inclusive and is more preferably from 0.1 wt % to 10 wt % both inclusive since a higher effect is obtained thereby.

[Non-Cyano Compound]

The electrolytic solution preferably includes a non-cyano compound together with the cyano compound. The non-cyano compound may include, for example, one or more of a compound represented by the following Formula (3), a compound represented by the following Formula (4), a compound represented by the following Formula (5), a compound represented by the following Formula (6), and a compound represented by the following Formula (7), since chemical stability of the electrolytic solution is further improved, and therefore, a decomposition reaction of the electrolytic solution is further suppressed thereby.

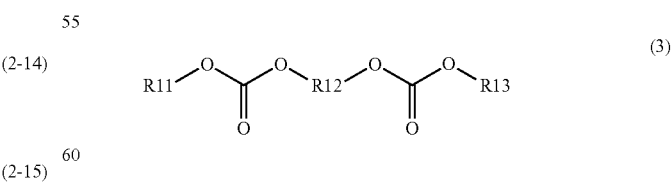

($R11$ and $R13$ are each one of a monovalent hydrocarbon group, a monovalent oxygen-containing hydrocarbon group, halogenated groups of the foregoing groups, and groups each obtained by bonding two or more of the foregoing groups to one another. $R12$ is one of a divalent hydrocarbon group and halogenated groups thereof.)

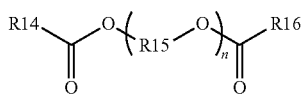

(4)

(R14 and R16 are each one of a monovalent hydrocarbon group, a monovalent oxygen-containing hydrocarbon group, halogenated groups of the foregoing groups, and groups each obtained by bonding two or more of the foregoing groups to one another. R15 is one of a divalent hydrocarbon group and halogenated groups thereof. n is an integer that is 1 or larger.)

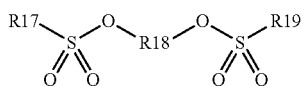

(5)

(R17 and R19 are each one of a monovalent hydrocarbon group, a monovalent oxygen-containing hydrocarbon group, halogenated groups of the foregoing groups, and groups each obtained by bonding two or more of the foregoing groups to one another. R18 is one of a divalent hydrocarbon group and halogenated groups thereof.)

$$LiPF_2O_2 \quad (6)$$

$$Li_2PFO_3 \quad (7)$$

The compound represented by Formula (3) is a dicarbonate ester compound that has carbonate ester groups (—O—C(=O)—O—R11 and —O—C(=O)—O—R13) at both terminals thereof. R11 and R13 may be the same type of group or may be different types of group.

The type of each of R11 and R13 is not particularly limited as long as the type thereof is one of a monovalent hydrocarbon group, a monovalent oxygen-containing hydrocarbon group, halogenated groups of the foregoing groups, and groups each obtained by bonding two or more of the foregoing groups to one another. The terms "Hydrocarbon group", "oxygen-containing hydrocarbon group", "halogenated group" and "group obtained by bonding two or more of the foregoing groups to one another" similarly refer to those described for the cyano compound. One reason for this is that the above-described advantages are obtained independently of the types of R11 and R13 since the dicarbonate ester compound includes the above-described carbonate ester group.

Examples of the monovalent hydrocarbon group may include an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, a cycloalkyl group with carbon number from 3 to 18 both inclusive, and an alkoxy group with carbon number from 1 to 12 both inclusive, and groups each obtained by bonding two or more of the foregoing groups to one another, since the above-described advantages are obtained while securing, for example, solubility, compatibility, and the like of the dicarbonate ester compound. It is to be noted that the details of the above-described alkyl group, etc. are similar to those described for the cyano compound.

The type of R12 is not particularly limited as long as the type thereof is one of a divalent hydrocarbon group and halogenated groups thereof as described above. The term "halogenated group" similarly refers to that described for the cyano compound since the above-described advantages are obtained independently of the type of R12 based on a reason similar to that described above for R11 and R13.

Examples of the divalent hydrocarbon group may include an alkylene group with carbon number from 1 to 12 both inclusive, an alkenylene group with carbon number from 2 to 12 both inclusive, an alkynylene group with carbon number from 2 to 12 both inclusive, an arylene group with carbon number from 6 to 18 both inclusive, a cycloalkylene group with carbon number from 3 to 18 both inclusive, groups each obtained by bonding two or more of the foregoing groups to one another, and groups each obtained by bonding one or more of the foregoing groups and an ether bond (—O—) to one another since the above-described advantages are obtained while securing, for example, solubility, compatibility, and the like of the dicarbonate ester compound.

The term "group obtained by bonding two or more of the foregoing groups to one another" refers to a group in which two or more of the above-described groups such as an alkylene group are bonded to one another so as to be divalent as a whole and may be, for example, a group in which an alkylene group and a arylene group is bonded to each other. The group in which an alkylene group and a arylene group is bonded to each other may be a group in which one arylene group and one alkylene group are bonded to each other or a group (aralkylene group) in which two alkylene groups are bonded to each other with an arylene group in between.

"Group obtained by bonding one or more of the foregoing groups and an ether bond (—O—) to one another" is a group in which one or more of the above-described groups such as an alkylene group and one or more ether bonds are bonded to one another so as to be divalent as a whole. Examples thereof may include a group in which an alkylene group and an ether bond is bonded to each other. The group in which an alkylene group and an ether bond is bonded to each other may be a group in which one alkylene group and one ether bond are bonded to each other, may be a group in which two alkylene groups are bonded to each other with one ether bond in between, or may be a group in which a plurality of alkylene groups are alternately bonded to one another with ether bonds in between.

Specific examples of R12 may include straight-chain alkylene groups represented by the following Formula (3-13) to Formula (3-19), branched alkylene groups represented by Formula (3-20) to Formula (3-28), arylene groups represented by Formula (3-29) to (3-31), and benzylidene groups represented by Formula (3-32) to (3-34).

$$-\!\!+\!\!CH_2\!\!\!+\!\!_2\!\!- \quad (3\text{-}13)$$

$$-\!\!+\!\!CH_2\!\!\!+\!\!_3\!\!- \quad (3\text{-}14)$$

$$-\!\!+\!\!CH_2\!\!\!+\!\!_4\!\!- \quad (3\text{-}15)$$

$$-\!\!+\!\!CH_2\!\!\!+\!\!_5\!\!- \quad (3\text{-}16)$$

$$-\!\!+\!\!CH_2\!\!\!+\!\!_6\!\!- \quad (3\text{-}17)$$

$$-\!\!+\!\!CH_2\!\!\!+\!\!_7\!\!- \quad (3\text{-}18)$$

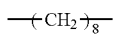 (3-19)

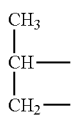 (3-20)

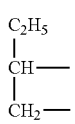 (3-21)

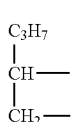 (3-22)

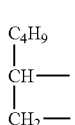 (3-23)

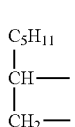 (3-24)

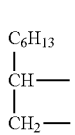 (3-25)

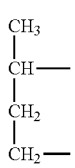 (3-26)

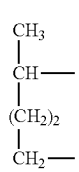 (3-27)

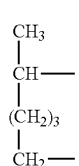 (3-28)

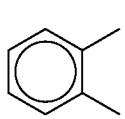 (3-29)

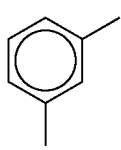 (3-30)

 (3-31)

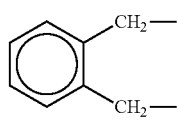 (3-32)

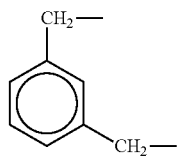 (3-33)

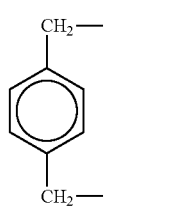 (3-34)

It is to be noted that, as the divalent group in which an alkylene group and an ether bond are bonded to each other is preferably a group in which two or more alkylene groups are alternately combined to one another with ether bonds in between and the both terminals are carbon atoms. The carbon number of such a group is preferably from 4 to 12 both inclusive since superior solubility and superior compatibility are obtained thereby. It is to be noted that the number of ether bond may be any number.

Specific examples of R12 in this case may include divalent groups represented by the following Formula (3-35) to Formula (3-47). Further, when the divalent groups represented by Formula (3-35) to Formula (3-47) are fluorinated, specific examples of R12 may be, for example, groups represented by Formula (3-48) to Formula (3-56), and in particular, groups represented by Formula (3-40) to Formula (3-42) are preferable.

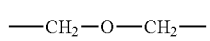 (3-35)

 (3-36)

 (3-37)

 (3-38)

 (3-39)

 (3-40)

 (3-41)

 (3-42)

 (3-43)

-continued

—CH₂—CH₂—(O—CH₂—CH₂)₅— (3-44)

—CH₂—CH₂—CH₂—O—CH₂—CH₂—CH₂— (3-45)

—CH₂—CH₂—CH₂—(O—CH₂—CH₂—CH₂)₂— (3-46)

—CH₂—CH₂—CH₂—(O—CH₂—CH₂—CH₂)₃— (3-47)

—CF₂—O—CF₂ (3-48)

—CF₂—(O—CF₂)₂— (3-49)

—CF₂—(O—CF₂)₃— (3-50)

—CF₂—CF₂—O—CF₂—CF₂— (3-51)

—CF₂—CF₂—(O—CF₂—CF₂)₂— (3-52)

—CF₂—CF₂—(O—CF₂—CF₂)₃— (3-53)

—CH₂—CF₂—O—CF₂—CH₂— (3-54)

—CH₂—CF₂—O—CF₂—CF₂—O—CF₂—CH₂— (3-55)

—CH₂—CF₂—(O—CF₂—CF₂)₂—O—CF₂—CH₂— (3-56)

Molecular weight of the dicarbonate ester compound is not particularly limited, however, in particular, is preferably from 200 to 800 both inclusive, more preferably from 200 to 600 both inclusive, and further more preferably from 200 to 450 both inclusive since superior solubility and superior compatibility are obtained thereby.

Specific examples of the dicarbonate ester compound may include compounds represented by the following Formula (3-1) to Formula (3-12) since sufficient solubility and sufficient compatibility are obtained and chemical stability of the electrolyte solution is sufficiently improved. It is to be noted that the dicarbonate ester compound may be other compounds that satisfy the conditions of the chemical formula shown in Formula (3).

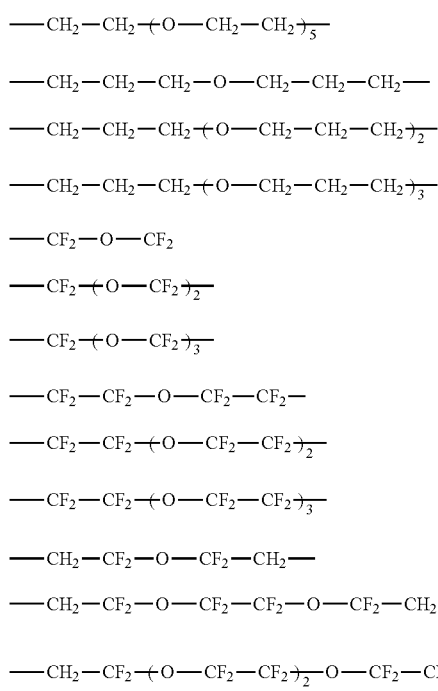

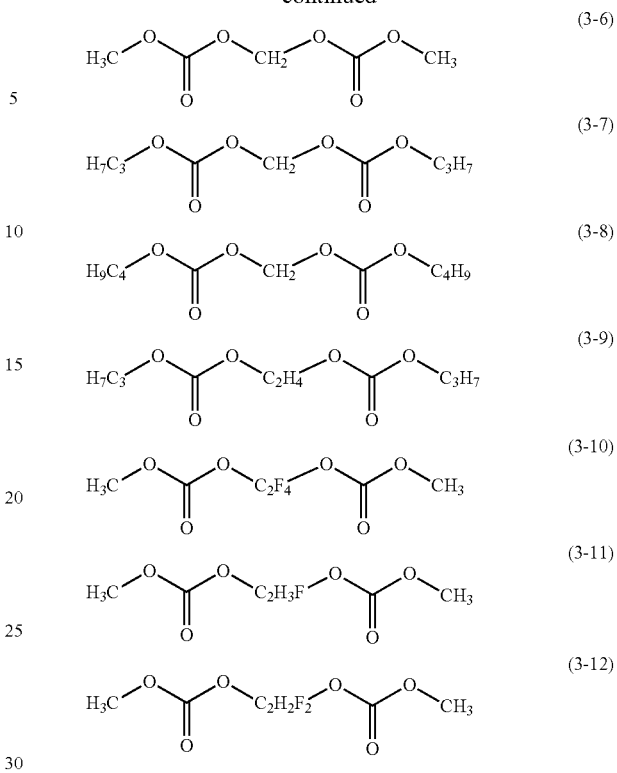

The compound represented by Formula (4) is a dicarboxylic acid compound that has carboxylic acid groups (—O—C(=O)—R14 and —O—C(=O)—R16) at both terminals thereof. The value of n is not particularly limited as long as the value is an integer of 1 or larger. R14 and R16 may the same type of group or may be different types of group. The details of R14 to R16 may be, for example, similar to those of the above-described R11 to R13.

Molecular weight of the dicarboxylic acid compound is not particularly limited. However, in particular, the molecular weight thereof is preferably from 162 to 1000 both inclusive, more preferably from 162 to 500 both inclusive, and further more preferably from 162 to 300 both inclusive since superior solubility and superior compatibility are obtained thereby.

Specific examples of the dicarboxylic acid compound include compounds represented by the following Formula (4-1) to Formula (4-17) since sufficient solubility and sufficient compatibility are obtained thereby and chemical stability of the electrolytic solution is sufficiently improved thereby. It is to be noted that the dicarboxylic acid compound may be other compounds that satisfy the conditions of the chemical formula shown in Formula (4).

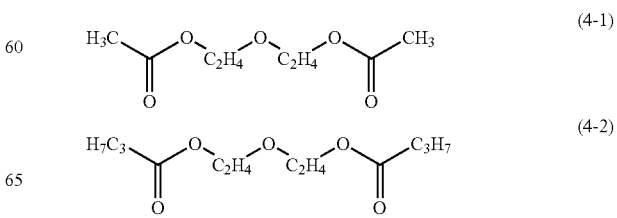

-continued

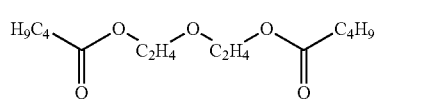
(4-3)

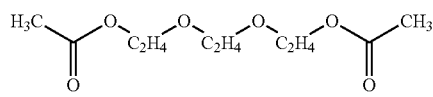
(4-4)

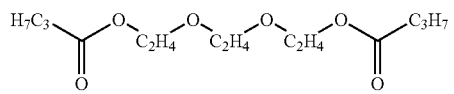
(4-5)

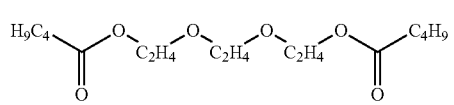
(4-6)

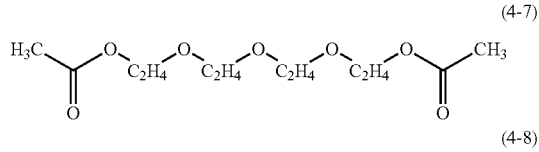
(4-7)

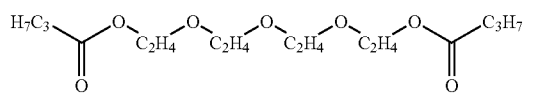
(4-8)

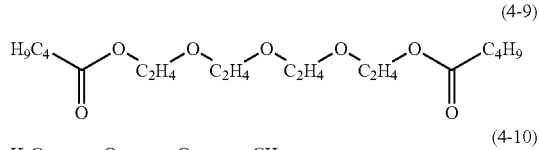
(4-9)

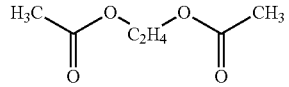
(4-10)

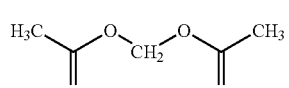
(4-11)

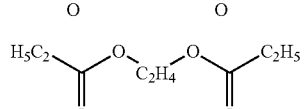
(4-12)

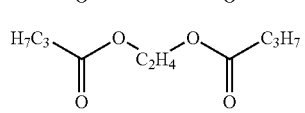
(4-13)

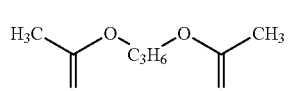
(4-14)

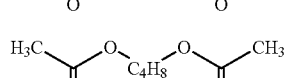
(4-15)

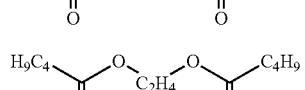
(4-16)

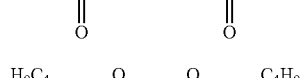
(4-17)

The compound represented by Formula (5) is a disulfonate compound that has sulfonate groups (—O—S(═O) 2-R17 and —O—S(═O)2-R19) at both terminals thereof. R17 and R19 may be the same type of group or may be different types of group. The details of R17 to R19 may be, for example, similar to those of R11 to R13, respectively.

Molecular weight of the disulfonate compound is not particularly limited. However, in particular, the molecular weight thereof is preferably from 200 to 800 both inclusive, more preferably from 200 to 600 both inclusive, and further more preferably from 200 to 450 both inclusive since superior solubility and superior compatibility are obtained thereby.

Specific examples of the disulfonate may include compounds represented by the following Formula (5-1) to Formula (5-9) since sufficient solubility and sufficient compatibility are obtained thereby and chemical stability of the electrolytic solution is sufficiently improved thereby. However, the disulfonate compound may be other compounds that satisfy conditions of the chemical formula shown in Formula (5).

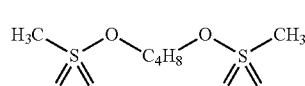
(5-1)

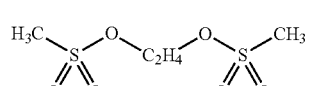
(5-2)

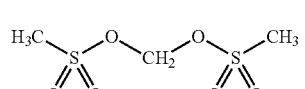
(5-3)

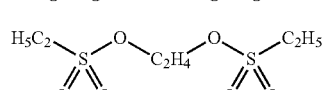
(5-4)

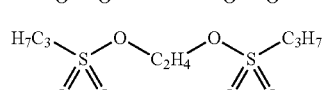
(5-5)

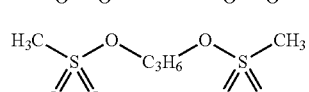
(5-6)

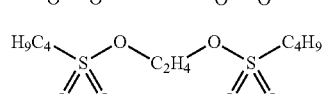
(5-7)

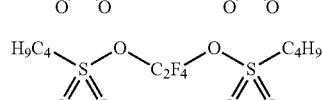
(5-8)

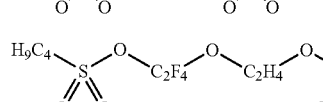
(5-9)

The compound represented by Formula (6) is lithium difluorophosphate and the compound represented by Formula (7) is lithium monofluorophosphate.

A content of the non-cyano compound in the electrolytic solution is not particularly limited. However, in particular, the content of the non-cyano compound is preferably from 0.001 wt % to 2 wt % both inclusive since a higher effect is obtained thereby.

[Solvent]

The solvent includes one or more of non-aqueous solvents (excluding the above-described cyano compounds and non-cyano compounds) such as organic solvents.

Examples of the non-aqueous solvent include cyclic ester carbonate, chain ester carbonate, lactone, chain carboxylic ester, and nitrile, since, for example, superior battery capacity, superior cycle characteristics, superior conservation characteristics, and the like are obtained. Examples of the cyclic ester carbonate include ethylene carbonate, propylene carbonate, and butylene carbonate. Examples of the chain ester carbonate include dimethyl carbonate, diethyl carbonate, ethyl methyl carbonate, and methyl propyl carbonate. Examples of the lactone include γ-butyrolactone and γ-valerolactone. Examples of the carboxylic ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, glutaronitrile, adiponitrile, methoxyacetonitrile, and 3-methoxypropionitrile.

In addition thereto, examples of the non-aqueous solvent include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide, since similar advantages are obtained thereby.

In particular, the solvent is preferably one or more of ethylene carbonate, propylene carbonate, dimethyl carbonate, diethyl carbonate, and ethyl methyl carbonate, since, for example, a superior battery capacity, superior cycle characteristics, superior conservation characteristics, and the like are obtained thereby. In this case, a combination of a high viscosity (high dielectric constant) solvent (for example, specific dielectric constant E≥30) such as ethylene carbonate and propylene carbonate and a low viscosity solvent (for example, viscosity≤1 mPa·s) such as dimethyl carbonate, ethyl methyl carbonate, and diethyl carbonate is more preferable since the dissociation properties of the electrolyte salt and ion mobility are improved thereby.

In particular, the solvent preferably includes one or more of unsaturated cyclic ester carbonates since a stable protective film is thereby formed mainly on the surface of the anode 22 at the time of charge and discharge, and therefore a decomposition reaction of the electrolytic solution is suppressed. The unsaturated cyclic ester carbonate is a cyclic ester carbonate that has one or more unsaturated bonds (carbon-carbon double bonds). More specifically, the unsaturated cyclic ester carbonate is one of vinylene-carbonate-based compounds represented by the following Formula (8), vinyl-ethylene-carbonate-based compounds represented by the following Formula (9), and methylene-ethylene-carbonate-based compounds represented by the following Formula (10). R21 and R22 may the same type of group or may be different types of group. This is similarly applicable to R23 to R26. A content of the unsaturated cyclic ester carbonate in the solvent is not particularly limited. However, the content thereof may be, for example, from 0.01 wt % to 10 wt % both inclusive. It is to be noted that specific examples of the unsaturated cyclic ester carbonate is not limited to the compounds described below.

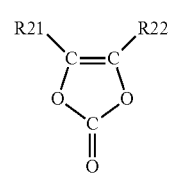

(8)

(R21 and R22 are each one of a hydrogen group and an alkyl group.)

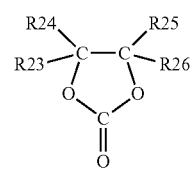

(9)

(R23 to R26 are each one of a hydrogen group, an alkyl group, a vinyl group, and an allyl group. One or more of R23 to R26 are each one of a vinyl group and an allyl group.)

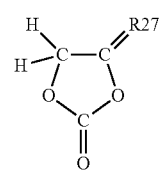

(10)

(R27 is an alkylene group.)

Examples of the vinylene-carbonate based compound may include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. In particular, vinylene carbonate is preferable since vinylene carbonate is easily obtained and provides a high effect.

Examples of vinyl-ethylene-carbonate-based compound may include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, and 4,5-divinyl-1,3-dioxolan-2-one. In particular, vinyl ethylene carbonate is preferable since vinyl ethylene carbonate is easily obtained and provides a high effect. It goes without saying that all of R32 to R35 may be vinyl groups or may be allyl groups. Alternatively, some of R32 to R35 may be vinyl groups and others thereof may be allyl groups.

Examples of methylene-ethylene-carbonate-based compound may include methylene ethylene carbonate (4-methylene-1,3-dioxolane-2-one), 4,4-dimethyl-5-methylene-1,3-dioxolane-2-one, and 4,4-diethyl-5-methylene-1,3-dioxolane-2-one. The methylene-ethylene-carbonate-based compound is not limited to a compound that has one methylene group as shown in Formula (10) and may be a compound that has two methylene groups.

It is to be noted that the unsaturated cyclic ester carbonate may be, for example, catechol carbonate that has a benzene ring or the like.

Further, the solvent preferably includes one or more of halogenated ester carbonates since a stable protective film is formed mainly on the surface of the anode 22 at the time of charge and discharge, and therefore a decomposition reaction of the electrolytic solution is suppressed. The halogenated ester carbonate is a cyclic or chain ester carbonate that includes one or more halogens as constituent elements. More specifically, the cyclic halogenated ester carbonate is represented by the following Formula (11) and the chain halogenated ester carbonate is represented by the following Formula (12). R28 to R31 may be the same type of group or may be different types of group. Alternatively, part of R28 to R31 may be the same group. This is similarly applicable to R32 to R37. A content of the halogenated ester carbonate in the solvent is not particularly limited. However, the content of the halogenated ester carbonate may be, for example, from 0.01 wt % to 50 wt % both inclusive. It is to be noted that specific examples of the halogenated ester carbonate are not limited to compounds described below.

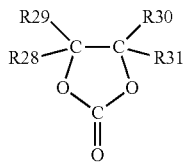

(11)

(R28 to R31 are each one of a hydrogen group, a halogen group, an alkyl group, and a halogenated alkyl group. One or more of R28 to R31 are each one of the halogen group and the halogenated alkyl group.)

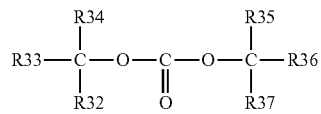

(12)

(R32 to R37 are each one of a hydrogen group, a halogen group, an alkyl group, and a halogenated alkyl group. One or more of R32 to R37 are each one of the halogen group and the halogenated alkyl group.)

The type of the halogen is not particularly limited. However, in particular, the halogen is preferably one of fluorine, chlorine, bromine, and iodine, and is more preferably fluorine since a higher effect is obtained thereby compared to other halogens. It is to be noted that the number of the halogen is preferably two than one, and may be three or more. One reason for this is that the ability to form a protective film is improved and a more rigid and more stable protective film is formed. Therefore, the decomposition reaction of the electrolytic solution is further suppressed.

Examples of the halogenated cyclic ester carbonate may include compounds represented by the following Formula (1-1) to Formula (11-21). The examples of the halogenated cyclic ester carbonate may include geometric isomers thereof. In particular, 4-fluoro-1,3-dioxolan-2-one represented by Formula (11-1) and 4,5-difluoro-1,3-dioxolan-2-one represented by Formula (11-3) are preferable, and the latter compound is more preferable. Also, as 4,5-difluoro-1,3-dioxolan-2-one, a trans isomer thereof is more preferable than a cis isomer thereof since the trans isomer thereof is easily obtained and provides a high effect. On the other hand, examples of the halogenated chain ester carbonate may include fluoromethyl methyl carbonate, bis(fluoromethyl) carbonate, and difluoromethyl methyl carbonate.

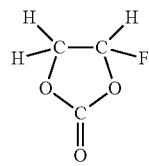

(11-1)

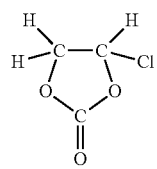

(11-2)

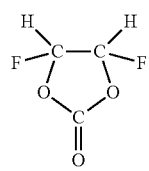

(11-3)

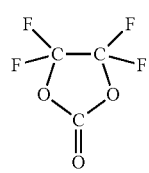

(11-4)

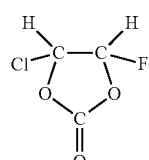

(11-5)

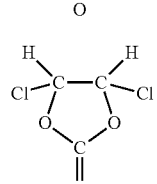

(11-6)

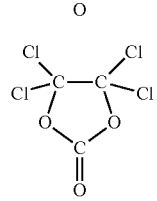

(11-7)

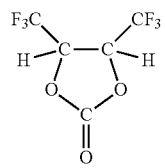

(11-8)

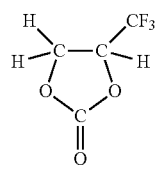

(11-9)

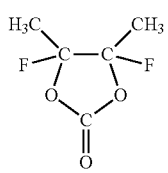
(11-10)

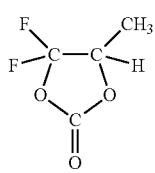
(11-11)

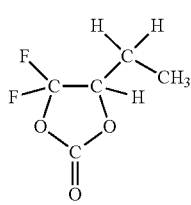
(11-12)

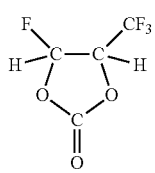
(11-13)

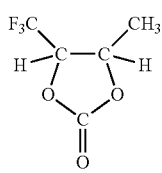
(11-14)

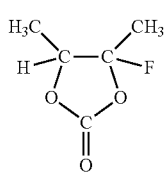
(11-15)

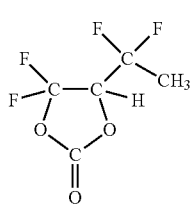
(11-16)

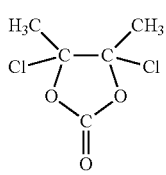
(11-17)

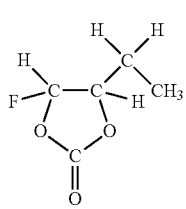
(11-18)

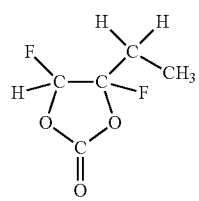
(11-19)

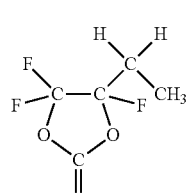
(11-20)

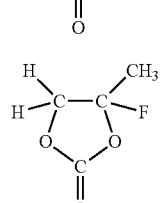
(11-21)

Further, the solvent preferably includes sultone (cyclic ester sulfonate) since chemical stability of the electrolytic solution is further improved. Examples of the sultone may include propane sultone and propene sultone. A content of the sulton in the solvent is not particularly limited. However, the content of the sulton may be, for example, from 0.5 wt % to 5 wt % both inclusive. It is to be noted that specific examples of the sultone are not limited to the compounds described above.

Further, the solvent preferably includes an acid anhydride since chemical stability of the electrolytic solution is further improved thereby. Examples of the acid anhydride include carboxylic anhydride, disulfonic anhydride, and carboxylic acid sulfonic acid anhydride. Examples of the carboxylic anhydride may include succinic anhydride, glutaric anhydride, and maleic anhydride. Examples of the disulfonic anhydride may include ethane disulfonic anhydride and propane disulfonic anhydride. Examples of the carboxylic acid sulfonic acid anhydride may include sulfobenzoic anhydride, sulfopropionic anhydride, and sulfobutyric anhydride. A content of the acid anhydride in the solvent is not particularly limited. However, the content thereof may be, for example, from 0.5 wt % to 5 wt % both inclusive. It is to be noted that specific examples of the acid anhydrides are not limited to the above-described compounds.

[Electrolyte Salt]

The electrolyte salt may include, for example, one or more of salts such as lithium salts. It is to be noted that the electrolyte salt may include, for example, salts other than lithium salts. "Salts other than lithium salts" may refer, for example, to salts such as light metal salts other than lithium salts.

Examples of the lithium salts may include lithium hexafluorophosphate (LiPF6), lithium tetrafluoroborate (LiBF4), lithium perchlorate (LiClO4), lithium hexafluoroarsenate (LiAsF6), lithium tetraphenylborate (LiB(C6H5)4), lithium methanesulfonate (LiCH3SO3), lithium trifluoromethanesulfonate (LiCF3SO3), lithium tetrachloroaluminate (LiAlCl4), dilithium hexafluorosilicate (Li2SiF6), lithium chloride (LiCl), and lithium bromide (LiBr), since, for example, superior battery characteristics, superior cycle characteristics, superior conservation characteristics, and the like are obtained thereby. It is to be noted that specific examples of the lithium salt are not limited to the above-described compounds.

In particular, one or more of LiPF6, LiBF4, LiClO4, and LiAsF6 are preferable, and LiPF6 is more preferable, since the internal pressure is thereby lowered and a higher effect is obtained.

In particular, the electrolyte salt preferably includes one or more of compounds represented by the following Formula (13), compounds represented by the following Formula (14), and compounds represented by the following Formula (15) since a higher effect is thereby obtained. It is to be noted that R41 and R43 may be the same type of group, or may be different types of group. This is similarly applicable to R51 to R53, and to R61 and R62. It is to be noted that specific examples of the compounds represented by Formula (13) to Formula (15) are not limited to compounds described below.

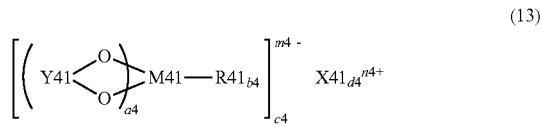
(13)

(X41 is one of Group 1 elements and Group 2 elements in the long-period periodic table and aluminum. M41 is one of transition metals and Group 13 elements, Group 14 elements, and Group 15 elements in the long-period periodic table. R41 is a halogen group. Y41 is one of —C(=O)—R42-C(=O)—, —C(=O)—CR432-, and —C(=O)—C(=O)—. It is to be noted that R42 is one of an alkylene group, a halogenated alkylene group, an arylene group, and a halogenated arylene group. R43 is one of an alkyl group, a halogenated alkyl group, an aryl group, and a halogenated aryl group. It is to be noted that a4 is an integer from 1 to 4, b4 is an integer of one of 0, 2, and 4, and c4, d4, m4, and n4 are each an integer from 1 to 3.)

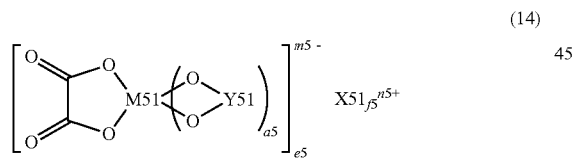
(14)

(X51 is one of Group 1 elements and Group 2 elements in the long-period periodic table. M51 is one of transition metals, and Group 13 elements, Group 14 elements, and Group 15 elements in the long-period periodic table. Y51 is one of —C(=O)—(CR512)b5-C(=O)—, —R532C—(CR522)c5-C(=O)—, —R532C—(CR522)c5-CR532-, —R532C—(CR522)c5-S(=O)2-, —S(=O)2-(CR522)d5-S(=O)2-, and —C(=O)—(CR522)d5-S(=O)2-. It is to be noted that R51s and R53s are each one of a hydrogen group, an alkyl group, a halogen group, and a halogenated alkyl group, and one or more of R51s and one or more of R53s are each one of a halogen group and a halogenated alkyl group. R52s are each one of a hydrogen group, an alkyl group, a halogen group, and a halogenated alkyl group. It is to be noted that a5, e5, and n5 are each an integer of 1 or 2, b5 and d5 are each an integer from 1 to 4, c5 is an integer from 0 to 4, and f5 and m5 are each an integer from 1 to 3.)

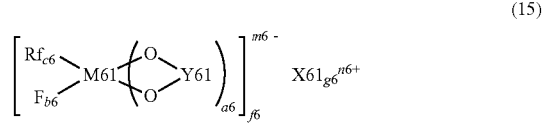
(15)

(X61 is one of Group 1 elements and Group 2 elements in the long-period periodic table. M61 is one of transition metals and Group 13 elements, Group 14 elements, and Group 15 elements in the long-period periodic table. Rfs are each one of a fluorinated alkyl group and a fluorinated aryl group, and carbon number of any of Rfs is from 1 to 10 both inclusive. Y61 is one of —C(=O)—(CR612)d6-C(=O)—, —R622C—(CR612)d6-C(=O)—, —R622C—(CR612)d6-CR622-, —R622C—(CR612)d6-S(=O)2-, —S(=O)2-(CR612)e6-S(=O)2-, and —C(=O)—(CR612)e6-S(=O)2-. It is to be noted that R61 is one of a hydrogen group, an alkyl group, a halogen group, and a halogenated alkyl group. R62s are each one of a hydrogen group, an alkyl group, a halogen group, and a halogenated alkyl group, and one or more of R62s are each one of a halogen group and a halogenated alkyl group. It is to be noted that a6, f6, and n6 are each an integer of 1 or 2, b6, c6, and e6 are each an integer from 1 to 4, d6 is an integer from 0 to 4, and g6 and m6 are each an integer from 1 to 3.)

It is to be noted that Group 1 elements include H, Li, Na, K, Rb, Cs, and Fr. Group 2 elements include Be, Mg, Ca, Sr, Ba, and Ra. Group 13 elements include B, Al, Ga, In, and Tl. Group 14 elements include C, Si, Ge, Sn, and Pb. Group 15 elements include N, P, As, Sb, and Bi.

Examples of the compound represented by Formula (13) may include compounds represented by Formula (13-1) to Formula (13-6). Examples of the compound represented by Formula (14) may include compounds represented by Formula (14-1) to Formula (14-8). Examples of the compound represented by Formula (15) may include a compound represented by Formula (15-1).

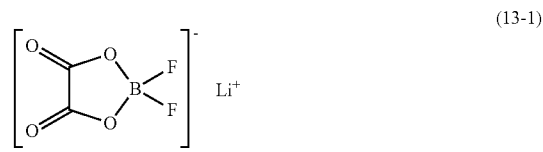
(13-1)

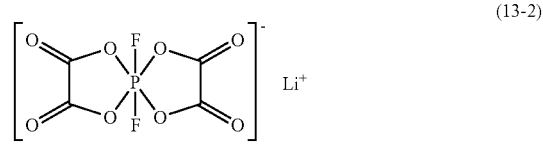
(13-2)

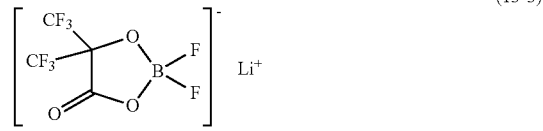
(13-3)

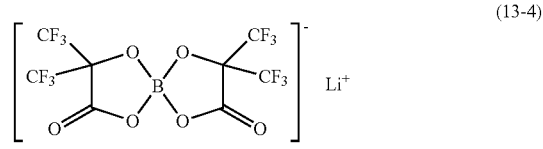
(13-4)

-continued

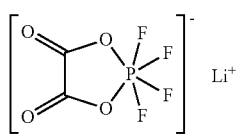 (13-5)

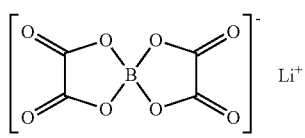 (13-6)

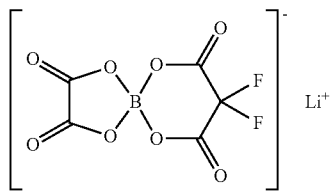 (14-1)

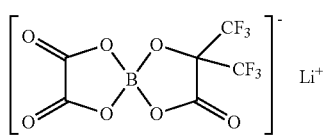 (14-2)

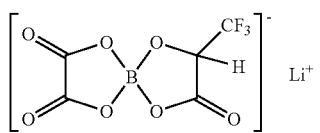 (14-3)

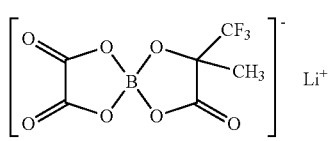 (14-4)

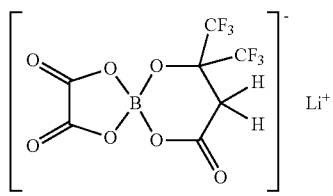 (14-5)

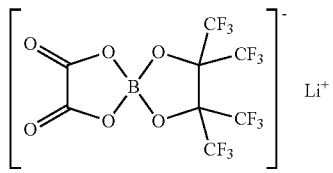 (14-6)

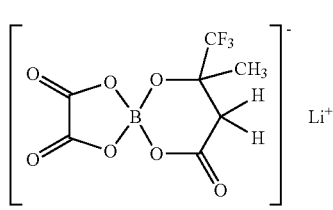 (14-7)

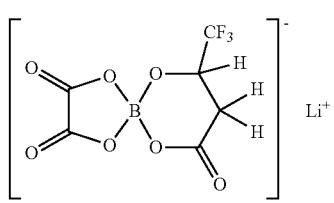 (14-8)

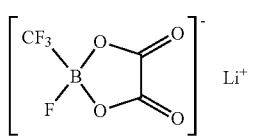 (15-1)

Further, the electrolyte salt preferably includes one or more of chain imide compounds represented by the following Formula (16), cyclic imide compounds represented by the following Formula (17), and chain methide compounds represented by the following Formula (18), since a higher effect is obtained thereby. It is to be noted that m and n may be the same value, or may be different values. This is similarly applicable to p, q, and r. It is to be noted that specific examples of the compounds represented by Formula (16) to Formula (18) are not limited to compounds described below.

$$\text{LiN}(C_mF_{2m+1}SO_2)(C_nF_{2n+1}SO_2) \tag{16}$$

(m and n are each an integer of 1 or larger.)

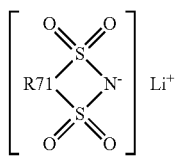 (17)

(R71 is a straight-chain or branched perfluoroalkylene group with carbon number from 2 to 4 both inclusive.)

$$\text{LiC}(C_pF_{2p+1}SO_2)(C_qF_{2q+1}SO_2)(C_rF_{2r+1}SO_2) \tag{18}$$

(p, q, and r are each an integer of 1 or larger.)

Examples of the chain imide compound may include bis(trifluoromethanesulfonyl)imide lithium (LiN(CF3SO2)2), bis(pentafluoroethanesulfonyl)imide lithium (LiN(C2F5SO2)2), (trifluoromethanesulfonyl) (pentafluoroethanesulfonyl) imide lithium (LiN(CF3SO2)(C2F5SO2)), (trifluoromethanesulfonyl)(heptafluoropropanesulfonyl) imide lithium (LiN(CF3SO2)(C3F7SO2)), and (trifluoromehtanesulfonyl)(nonafluorobuthanesulfonyl) imide lithium (LiN(CF3SO2)(C4F9SO2)).

Examples of the cyclic imide compound may include compounds represented by Formula (17-1) to (17-4).

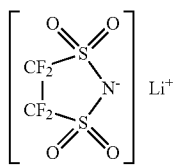 (17-1)

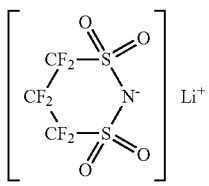

(17-2)

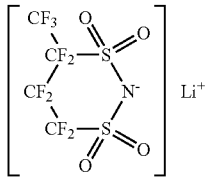

(17-3)

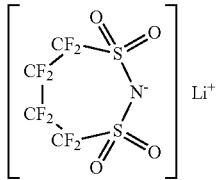

(17-4)

Examples of the chain methide compound may include lithium tris(trifluoromethanesulfonyl)methide (LiC(CF3SO2)3).

A content of the electrolyte salt is not particularly limited. However, in particular, the content thereof is preferably from 0.3 mol/kg to 3.0 mol/kg both inclusive with respect to the non-aqueous solvent since high ion conductivity is obtained thereby.

[Operation of Secondary Battery]

The secondary battery may operates as follows, for example. Lithium ions extracted from the cathode 21 may be inserted in the anode 22 through the electrolytic solution at the time of charge. On the other hand, lithium ions extracted from the anode 22 may be inserted in the cathode 21 through the electrolytic solution at the time of discharge.

[Method of Manufacturing Secondary Battery]

The secondary battery may be manufactured, for example, by the following procedure.

First, the cathode 21 is fabricated. A cathode active material is mixed with, for example, a cathode binder and the like where appropriate to prepare a cathode mixture. Subsequently, the cathode mixture is dispersed, for example, in an organic solvent and/or the like to obtain paste cathode mixture slurry. Subsequently, both surfaces of the cathode current collector 21A are coated with the cathode mixture slurry, and the resultant is dried. Thus, the cathode active material layer 21B is formed. Subsequently, the cathode active material layer 21B is compression-molded with the use of, for example, a roll pressing machine and/or the like where appropriate. In this case, the cathode active material layer 21B may be compression-molded while being heated and compression-molding may be repeated several times.

Further, the anode 22 is fabricated by procedures similar to those described above for the cathode 21. An anode mixture in which the anode active material, and, where appropriate, the anode binder and/or the like are mixed is dispersed in an organic solvent and/or the like to obtain paste anode mixture slurry. Subsequently, both surfaces of the anode current collector 22A are coated with the anode mixture slurry, and the resultant is dried. Thus, the anode active material layer 22B is formed. Thereafter, the anode active material layer 22B is compression-molded where appropriate.

Further, the electrolyte salt is dispersed in the solvent, and then, a cyano compound is added thereto to prepare the electrolytic solution. In this case, a non-cyano compound may be added thereto where appropriate.

Finally, the secondary battery is assembled with the cathode 21 and the anode 22. The cathode lead 25 is attached to the cathode current collector 21A, for example, by a welding method and/or the like and the anode lead 26 is similarly attached to the anode current collector 22A, for example, by a welding method and/or the like. Subsequently, the cathode 21 and the anode 22 are laminated with the separator 23 in between and are spirally wound. Thus, the spirally wound electrode body 20 is fabricated. Thereafter, the center pin 24 is inserted in a center hollow of the spirally wound electrode body 20. Subsequently, the spirally wound electrode body 20 is sandwiched between the pair of insulating plates 12 and 13, and is contained in the battery can 11. In this case, the end tip of the cathode lead 25 is attached to the safety valve mechanism 15, for example, by a welding method and/or the like and the end tip of the anode lead 26 is similarly attached to the battery can 11, for example, by a welding method and/or the like. Subsequently, the electrolytic solution is injected into the battery can 11, and the separator 23 is impregnated with the electrolytic solution. Subsequently, the battery cover 14, the safety valve mechanism 15, and the PTC device 16 are fixed by being swaged with the gasket 17 at the open end of the battery can 11.

[Functions and Effects of Secondary Battery]

According to the present cylindrical type secondary battery, the electrolytic solution includes the above-described cyano compound. In this case, a decomposition reaction of the electrolytic solution is suppressed even under severe temperature environment, in particular, under high temperature, compared to in the case where the electrolytic solution does not include the cyano compound and to in the case where the electrolytic solution includes other cyano compound. Examples of "other cyano compound" may include a carbonate-ester type cyano compound represented by the following Formula (18-1) and an ester type cyano compound represented by the following Formula (18-2). In the compound represented by Formula (18-1), R1 is a saturated hydrocarbon group (methyl group) and R2 is a cyano-group-containing group in Formula (1). Irrespective of this, the number of cyano group in R2 is one. In the compound represented by Formula (18-2), R3 is a saturated hydrocarbon group (methyl group) in Formula (2). Irrespective of this, the number of cyano group in R4 is one. Therefore, even when the secondary battery is charged and discharged or is stored under severe temperature environment, the electrolytic solution is less likely to be decomposed. Therefore, superior battery characteristics are obtained.

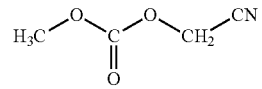

(18-1)

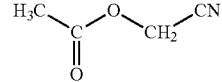

(18-2)

In particular, when the content of the cyano compound in the electrolytic solution is from 0.01 wt % to 20 wt % both inclusive, a higher effect is obtained.

Further, when the electrolytic solution includes the non-cyano compound, a higher effect is obtained. In this case, when the content of the non-cyano compound in the electrolytic solution is from 0.001 wt % to 2 wt % both inclusive, a further higher effect is obtained.

[1-2. Lithium Ion Secondary Battery (Laminated Film Type)]

Figure 3:
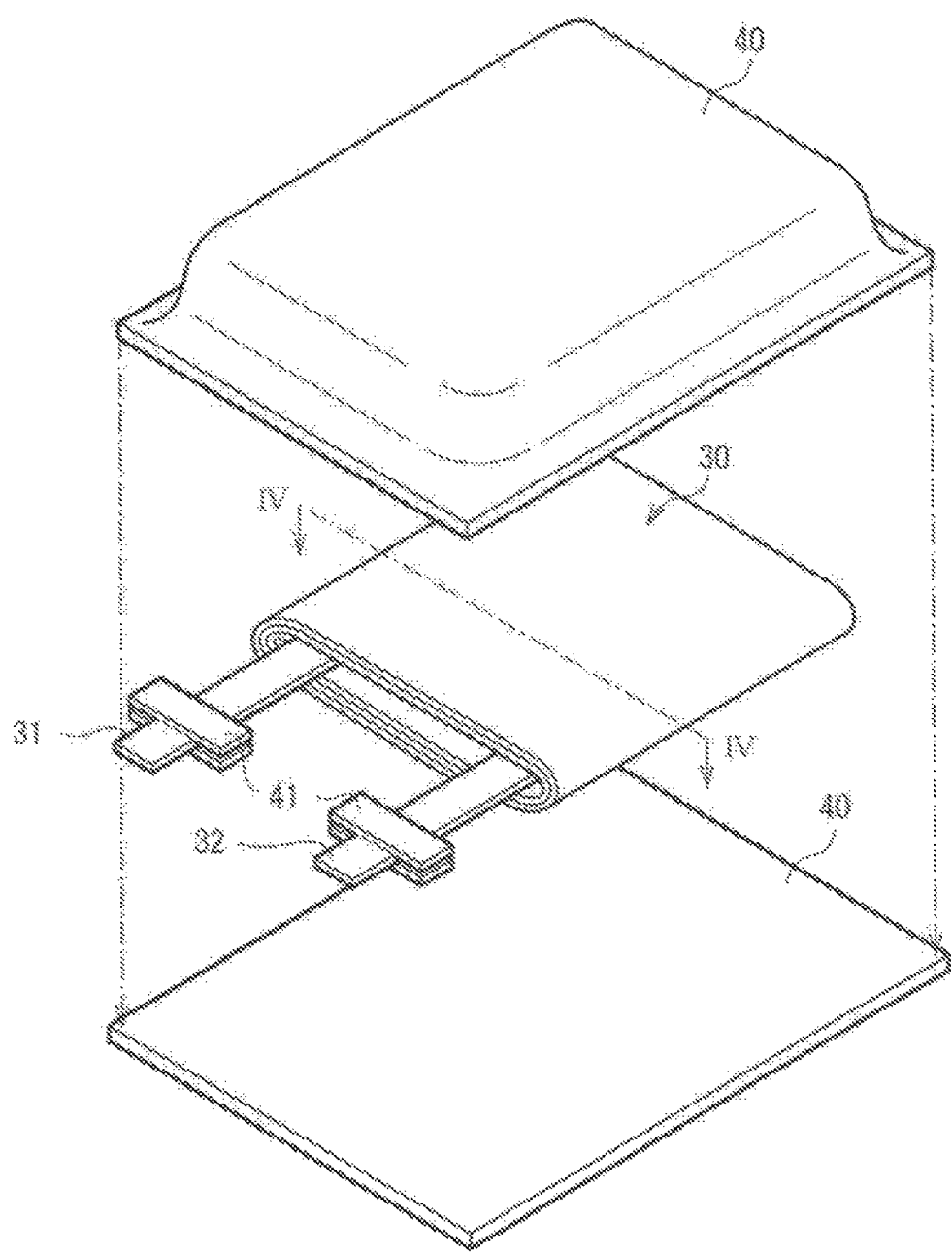
FIG. 3 is a perspective view illustrating a configuration of another secondary battery (laminated film type) provided with the electrolytic solution of the first embodiment of the present technology.
Figure 4:
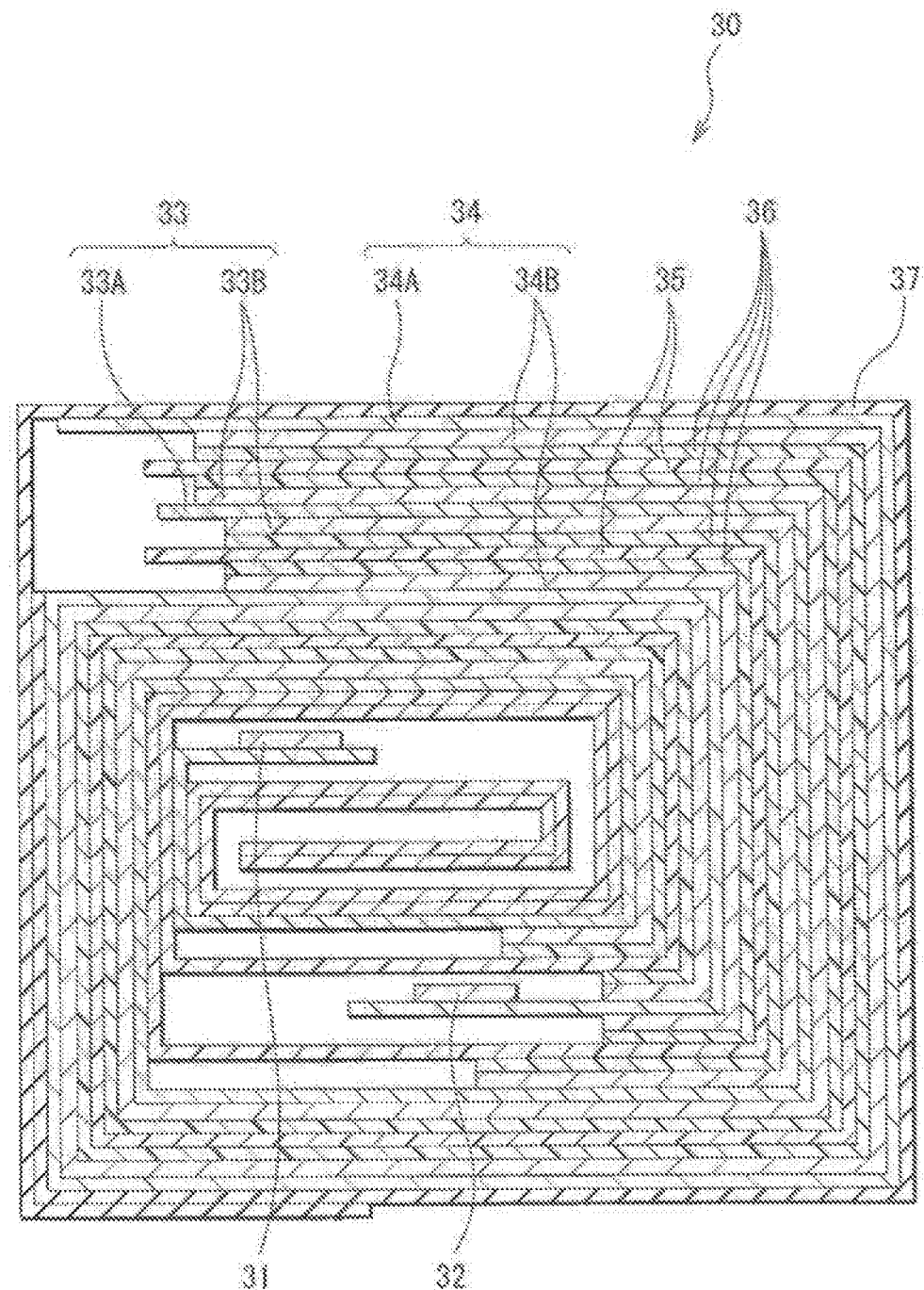
FIG. 4 is a cross-sectional view of a spirally wound electrode body shown in FIG. 3 taken along a line IV-IV.

FIG. 3 illustrates an exploded perspective configuration of another secondary battery according to the present embodiment. FIG. 4 illustrates an enlarged cross section taken along a line IV-IV of a spirally wound electrode body 30 illustrated in FIG. 3. The elements of the cylindrical type secondary battery that have already been described will be used as necessary in the following description.

[General Configuration of Secondary Battery]

The secondary battery described herein is a so-called laminated film type lithium ion secondary battery. In the secondary battery, for example, the spirally wound electrode body 30 may be contained in a film-like outer package member 40. The spirally wound electrode body 30 includes a cathode 33 and an anode 34 that are laminated with a separator 35 and an electrolyte layer 36 in between, which is spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be formed, for example, of an electrically-conductive material such as aluminum, and the anode lead 32 may be formed, for example, of an electrically-conducive material such as copper, nickel, and stainless steel. These electrically-conductive materials may be in the shape of, for example, a thin plate or mesh.

The outer package member 40 may be, for example, a laminated film in which a fusion bonding layer, a metal layer, and a surface protective layer are laminated in this order. The outer package member 40 may formed, for example, by overlaying two laminated films so that the fusion bonding layer faces the spirally wound electrode body 30, and then bonding the respective outer edges of the fusion bonding layers to each other. It is to be noted that the two laminated film may be attached to each other, for example, with an adhesive agent and/or the like in between. Examples of the fusion bonding layer include a film made of a material such as polyethylene and polypropylene. Examples of the metal layer include an aluminum foil. Examples of the surface protective layer include a film made of a material such as nylon and polyethylene terephthalate.

In particular, the outer package member 40 is preferably an aluminum laminated film in which a polyethylene film, an aluminum foil, and a nylon film are laminated in this order. It is to be noted that the outer package member 40 may be a laminated film that has other laminated structure, a polymer film such as a polypropylene film, or a metal film.

For example, an adhesive film 41 may be inserted between the outer package member 40 and the cathode lead 31 and between the outer package member 40 and the anode lead 32 to prevent outside air intrusion. The adhesive film 41 is formed of a material that has adhesion characteristics with respect to the cathode lead 31 and to the anode lead 32. Examples of such an adhesive material include a polyolefin resin, and more specifically, a material such as polyethylene, polypropylene, modified polyethylene, and modified polypropylene.

The cathode 33 may include, for example, a cathode current collector 33A and a cathode active material layer 33B that is provided on one or both surfaces of the cathode current collector 33A. The anode 34 may include, for example, an anode current collector 34A and an anode active material layer 34B that is provided on one or both surfaces of the anode current collector 34A. The configurations of the cathode current collector 33A, the cathode active material layer 33B, the anode current collector 34A, and the anode active material layer 34B are similar to those of the cathode current collector 21A, the cathode active material layer 21B, the anode current collector 22A, and the anode active material layer 22B, respectively. Further, the configuration of the separator 35 is similar to that of the separator 23.

The electrolyte layer 36 includes an electrolytic solution that is held by a polymer compound, and is a so-called gel electrolyte, since high ion conductivity (for example, 1 mS/cm or more at room temperature) is obtained and liquid leakage of the electrolytic solution is prevented. The electrolyte layer 36 may contain other materials such as an additive where appropriate.

Examples of the polymer compound may include one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, and a copolymer of vinylidene fluoride and hexafluoro propylene. In particular, polyvinylidene fluoride or the copolymer of vinylidene fluoride and hexafluoro propylene is preferable, and polyvinylidene fluoride is more preferable, since such polymer compounds are electrochemically stable.

The composition of the electrolytic solution is similar to that of the cylindrical type secondary battery and the electrolytic solution thereof includes the above-described cyano compound. It is to be noted that, in the electrolyte layer 36 that is a gel electrolyte, "solvent" of the electrolytic solution refers to a wide concept that includes not only a liquid solvent but also a material that has ion conductivity capable of dissociating electrolyte salts. Therefore, when a polymer compound that has ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

The secondary battery may operates as follows, for example. Lithium ions extracted from the cathode 33 may be inserted in the anode 34 through the electrolyte layer 36 at the time of charge. On the other hand, lithium ions extracted from the anode 34 may be inserted in the cathode 33 through the electrolyte layer 36 at the time of discharge.

[Method of Manufacturing Secondary Battery]

The secondary battery that includes the gel electrolyte layer 36 may be manufactured, for example, by the following three types of procedures.

In the first procedure, the cathode 33 and the anode 34 are fabricated by a fabrication procedure similar to that of the cathode 21 and the anode 22. Specifically, the cathode 33 is fabricated by forming the cathode active material layer 33B on one or both surfaces of the cathode current collector 33A, and the anode 34 is fabricated by forming the anode active material layer 34B on one or both surfaces of the anode current collector 34A. Subsequently, a precursor solution that includes an electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A for example, by a welding method and/or the like, and the anode lead 32 is similarly attached to the anode current collector 34A, for example, by a welding method and/or the like. Subsequently, the cathode 33 and the anode 34 are laminated with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded, for example, by a thermal fusion bonding method and/or the like to enclose the spirally wound electrode body 30 in the outer package member 40. In this case, the adhesive films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are laminated with the separator 35 in between and are spirally wound to fabricate a spirally wound body that is a precursor of the spirally wound electrode body 30. Thereafter, the protective tape 37 is adhered to the outermost periphery thereof. Subsequently, after the spirally wound body is sandwiched between two pieces of the film-like outer package member 40, the outermost peripheries except for one side are bonded, for example, by a thermal fusion bonding method and/or the like. The spirally wound body is contained in the pouch-like outer package member 40. Subsequently, a composition for electrolyte is prepared that includes an electrolytic solution, a monomer as a raw material of the polymer compound, a polymerization initiator, and other materials such as a polymerization inhibitor where appropriate. The composition for electrolyte is injected into the pouch-like outer package member 40. Thereafter, the outer package member 40 is hermetically sealed, for example, by a thermal fusion bonding method and/or the like. Subsequently, the monomer is thermally polymerized to form a polymer compound. Thus, the polymer compound is impregnated with the electrolytic solution and the polymer compound is gelated thereby. Accordingly, the gel electrolyte layer 36 is formed.

In the third procedure, the spirally wound body is fabricated and contained in the pouch-like outer package member 40 in a manner similar to that of the foregoing second procedure, except that the separator 35 having both surfaces coated with a polymer compound is used. Examples of the polymer compound with which the separator 35 is coated include a polymer (a homopolymer, a copolymer, or a multicomponent copolymer) that includes vinylidene fluoride as a component. Specific examples of the homopolymer include polyvinylidene fluoride. Specific examples of the copolymer include a binary copolymer that includes vinylidene fluoride and hexafluoro propylene as components. Specific examples of the multicomponent copolymer include a ternary copolymer that includes vinylidene fluoride, hexafluoro propylene, and chlorotrifluoroethylene as components. It is to be noted that other one or more polymer compounds may be used in addition to the polymer that includes vinylidene fluoride as a component. Subsequently, an electrolytic solution is prepared and is injected into the outer package member 40. Thereafter, the opening of the outer package member 40 is hermetically sealed, for example, by a thermal fusion bonding method and/or the like. Subsequently, the resultant is heated while a weight is applied to the outer package member 40, and the separator 35 is closely adhered to the cathode 33 and the anode 34 with the polymer compound in between. Thus, the polymer compound is impregnated with the electrolytic solution, and accordingly, the polymer compound is gelated to form the electrolyte layer 36.

In the third procedure, swollenness of the secondary battery is suppressed more than in the first procedure. Further, in the third procedure, little of the materials such as the monomer as the raw material of the polymer compound and the solvent is left in the electrolyte layer 36, compared to in the second procedure. Therefore, the formation step of the polymer compound is favorably controlled. Therefore, sufficient adhesive characteristics are obtained between the electrolyte layer 36 and the cathode 33, the anode 34, and the separator 35.

[Functions and Effects of Secondary Battery]

According to the present laminated film type secondary battery, the electrolytic solution in the electrolyte layer 36 includes the above-described cyano compound. Therefore, superior battery characteristics are obtained for a reason similar to that in the cylindrical type secondary battery. Functions and effects other than this are similar to those of the cylindrical type secondary battery.

[1-3. Lithium Metal Secondary Battery (Cylindrical Type and Laminated Film Type)]

A secondary battery described herein is a lithium secondary battery (lithium metal secondary battery) in which the capacity of the anode 22 is expressed by precipitation and dissolution of lithium metal. The present secondary battery has a configuration similar to that of the above-described lithium ion secondary battery (cylindrical type) and is manufactured by procedures similar to those of the above-described lithium ion secondary battery (cylindrical type) except that the anode active material layer 22B is formed of lithium metal.

In this secondary battery, lithium metal is used as the anode active material. Therefore, high energy density is obtainable. The anode active material layer 22B may exist from the time of assembling. However, the anode active material layer 22B may not exist at the time of assembling and may be formed by lithium metal precipitated at the time of charge. Further, the anode active material layer 22B may be utilized as a current collector and the anode current collector 22A may not be provided.

The present secondary battery may operate, for example, as follows. Lithium ion is extracted from the cathode 21 and is precipitated as lithium metal on the surface of the anode current collector 22A through the electrolytic solution, at the time of charge. On the other hand, lithium metal is dissolved in the electrolytic solution as lithium ions from the anode active material layer 22B, and the lithium ions are inserted to the cathode 21 through the electrolytic solution, at the time of discharge.

According to the present lithium metal secondary battery, the electrolytic solution includes the above-described cyano compound. Therefore, superior battery characteristics are obtained for a reason similar to that of the lithium ion secondary battery. Functions and effects other than this are similar to those of the cylindrical type secondary battery. It is to be noted that the above-described lithium metal secondary battery is not limited to the cylindrical type and may be of a laminated film type. Also in this case, similar effects are obtained.

2. Second Embodiment/Secondary Battery (Cyano Compound: The Number of Cyano Group is not Limited+Metal-Based Material)

Next, description will be given of a secondary battery of a second embodiment of the present technology.

[2-1. Lithium Ion Secondary Battery (Cylindrical Type)]

The secondary battery of the present embodiment has a configuration similar to that of the secondary battery of the first embodiment except that the configuration of the anode 22 and the composition of the electrolytic solution are different from those in the first embodiment. Therefore, the secondary battery described herein is a lithium ion secondary battery of a cylindrical type. The elements of the secondary battery of the first embodiment that have already been described will be used as necessary in the following description.

The anode active material layer 22B of the anode 22 includes a metal-based material as the anode active material. The details of the metal-based material are similar to those described in the first embodiment. In particular, the metal-based material preferably includes Si, Sn, or both as constituent elements since high energy density is obtained thereby.

It is to be noted that the anode active material layer 22B may additionally include one or more of other anode materials that is capable of inserting and extracting lithium ions when the anode active material layer 22B includes the above-described anode material (metal-based material) as the anode active material. Other anode material may be, for example, a carbon material, a metal oxide, a polymer compound, or the like and the details thereof are similar to those described in the first embodiment.

The electrolytic solution includes a cyano compound and the cyano compound includes a compound represented by the following Formula (19), a compound represented by the following Formula (20), or both. It is to be noted that the electrolytic solution may include other materials such as a solvent (excluding the above-described cyano compounds) and an electrolyte salt. The details of the solvent and the electrolyte salt are similar to those described in the first embodiment.

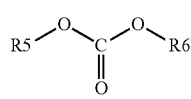
(19)

(R5 and R6 are each one of a hydrocarbon group, an oxygen-containing hydrocarbon group, a cyano-group-containing group, halogenated groups of the foregoing groups, and groups each obtained by bonding two or more of the foregoing groups to one another, and R5, R6, or both include the cyano-group-containing group. A cyano group in the cyano-group-containing group in R5, R6, or both is bonded to an oxygen atom at a terminal of a —O—C(=O)—O— bond with one or more carbon atoms in between.)

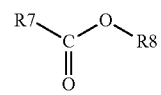
(20)

(R7 is one of a hydrocarbon group, an oxygen-containing hydrocarbon group, a cyano-group-containing group, halogenated groups of the foregoing groups, and groups each obtained by bonding two or more of the foregoing groups to one another. R8 is one of a cyano-group-containing group, halogenated groups of the foregoing group, and groups each obtained by bonding two or more of the foregoing groups to one another. A cyano group in the cyano-group-containing group in R8 is bonded to an oxygen atom at a terminal of a —C(=O)—O— bond with one or more carbon atoms in between.)

The cyano compound described herein is one of compounds defined by Formula (19) and by Formula (20), which is different from the compound in the first embodiment that is one of compounds defined by Formula (1) and by Formula (2). The compound represented by Formula (19) is a compound (carbonate-ester type cyano compound) that includes the carbonate-ester type bond (—O—C(=O)—O—) as a skeleton. Further, the compound represented by Formula (20) is a compound (ester type cyano compound) that includes the ester type bond (—C(=O)—O—) as a skeleton.

One reason why the electrolytic solution includes the cyano compound is that chemical stability of the electrolytic solution is remarkably improved even when the anode 22 includes a metal-based material as the anode active material. Accordingly, a decomposition reaction of the electrolytic solution is remarkably suppressed, and therefore decrease in discharge capacity is suppressed even when the secondary battery is repeatedly charged and discharged and is stored.

In detail, when the anode active material is a non-metal-based material (such as a carbon material) having low reactivity, the decomposition reaction of the electrolytic solution resulting from reactivity of the carbon material is less likely to occur upon charge and discharge. Therefore, discharge capacity is less likely to be influenced depending on whether or not the cyano compound is present in the electrolytic solution.

On the other hand, when the anode active material is the metal-based material having high reactivity, high energy density is obtained but the decomposition reaction of the electrolytic solution resulting from reactivity of the metal-based material is remarkable upon charge and discharge. Therefore, discharge capacity is largely varied depending on whether or not the cyano compound is present in the electrolytic solution. Specifically, when the metal-based material is used, the decomposition reaction of the electrolytic solution resulting from reactivity of the anode active material easily proceeds if the electrolytic solution does not include the cyano compound. Therefore, discharge capacity is decreased easily. This tendency is remarkable especially under severe conditions such as high temperature environment. However, when the electrolytic solution includes the cyano compound, a rigid film resulting from the cyano compound is formed on the surface of the anode 22 upon charge and discharge, and therefore the anode 22 is protected from the electrolytic solution. Accordingly, the decomposition reaction of the electrolytic solution resulting from reactivity of the anode active material is less likely to proceed, and therefore discharge capacity is maintained easily. This tendency is remarkable especially when the secondary battery is charged, discharged, and stored under severe temperature environment such as high temperature environment.

In Formula (19), the types of R5 and R6 is not particularly limited as long as R5 and R6 are each one of a hydrocarbon group, an oxygen-containing hydrocarbon group, a cyano-group-containing group, halogenated groups of the foregoing groups, and groups each obtained by bonding two or more of the foregoing groups to one another, as described above.

It is to be noted that it is made a condition that R5, R6, or both include the cyano-group-containing group (that is, a cyano group). The above-described advantages are obtained independently of the types of R5 and R6 when R5, R6, or both include a cyano group.

Moreover, it is made a condition that a cyano group in the cyano-group-containing group is bonded to an oxygen atom at a terminal of the —O—C(=O)—O— bond with one or more carbon atoms in between. In other words, it is necessary that the cyano group is not directly bonded to the oxygen atom and is indirectly bonded to the oxygen atom with a carbon atom in between. One reason for this is that the above-described advantages are obtained independently of the types of R5 and R6 since the cyano group is indirectly bonded to the oxygen atom.

It is to be noted that R5 and R6 may be the same type of group or may be different types of group. Further, R5 and R6 may be bonded to each other and the bonded R5 and R6 may form a ring.

In Formula (20), the type of R7 is not particularly limited as long as R7 is one of a hydrocarbon group, an oxygen-containing hydrocarbon group, a cyano-group-containing group, halogenated groups of the foregoing groups, and groups each obtained by bonding two or more of the foregoing groups to one another, as described above. Further, the type of R8 is not particularly limited as long as R8 is one of a cyano-group-containing group, halogenated groups, and groups each obtained by bonding two or more of the foregoing groups to one another, as described above.

It is to be noted that it is made a condition that a cyano group in the cyano-group-containing group is bonded to an oxygen atom at a terminal of the —C(=O)—O— bond with one or more carbon atoms in between. One reason for this is that the above-described advantages are obtained independently of the type of R7 since the cyano group is indirectly bonded to an oxygen atom.

It is to be noted that R7 and R8 may be bonded to each other and the bonded R7 and R8 may form a ring.

Here, the details of R5 to R8, that is, what is referred to by each of the terms "hydrocarbon group", "oxygen-containing hydrocarbon group", "cyano-group-containing group", "halogenated group", "groups each obtained by bonding two or more of the foregoing groups to one another" is similar to that described for R1 to R4 in the first embodiment. Out of the foregoing groups, it goes without saying that the hydrocarbon group includes a saturated hydrocarbon group and an unsaturated hydrocarbon group, and the oxygen-containing hydrocarbon group corresponds to an oxygen-containing saturated hydrocarbon group.

Specific examples of the cyano compound may be as follows. Examples of the carbonate-ester type cyano compound may include compounds represented by the following Formula (19-1) to Formula (19-31). Further, examples of the ester type cyano compound may include compounds represented by the following Formula (20-1) to Formula (20-28).

It is to be noted that the cyano compound may be other compounds that satisfy the condition shown in Formula (19) or in Formula (20).

(19-1)

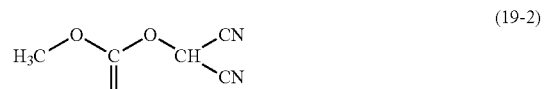
(19-2)

(19-3)

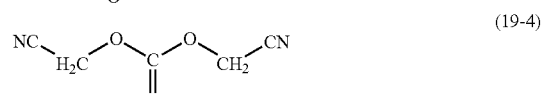
(19-4)

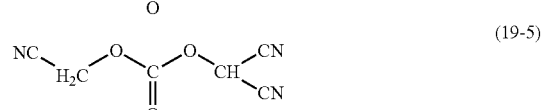
(19-5)

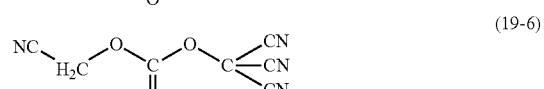
(19-6)

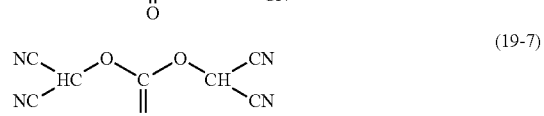
(19-7)

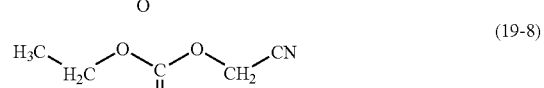
(19-8)

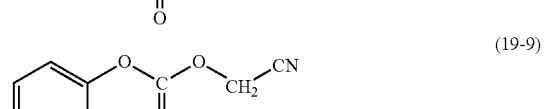
(19-9)

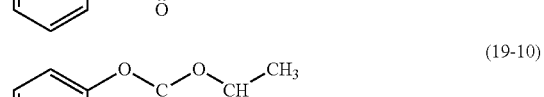
(19-10)

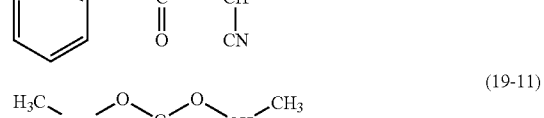
(19-11)

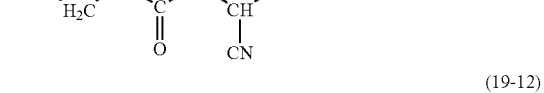
(19-12)

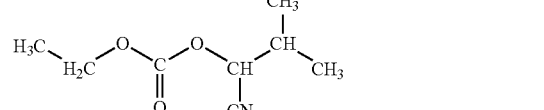
(19-13)

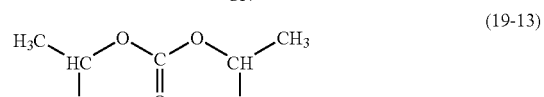
(19-14)

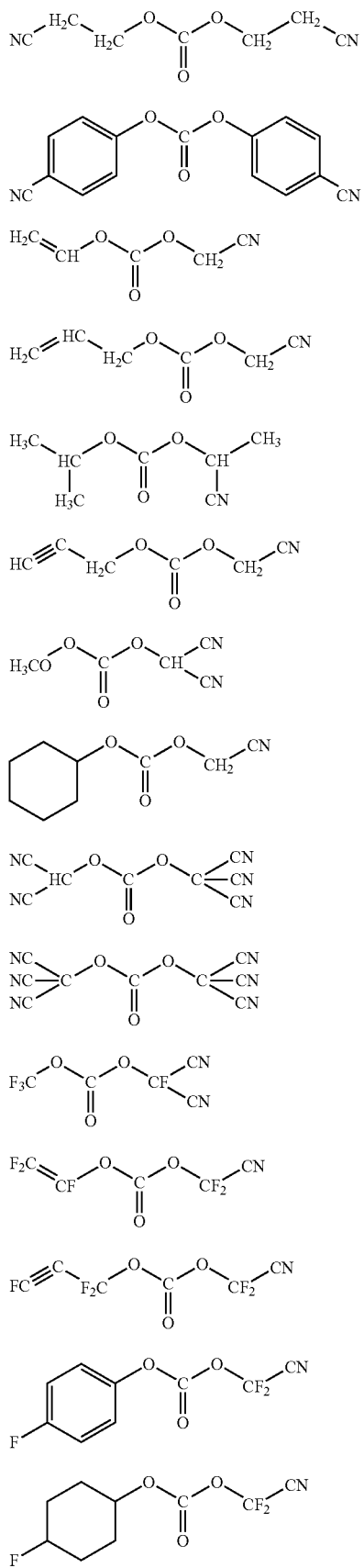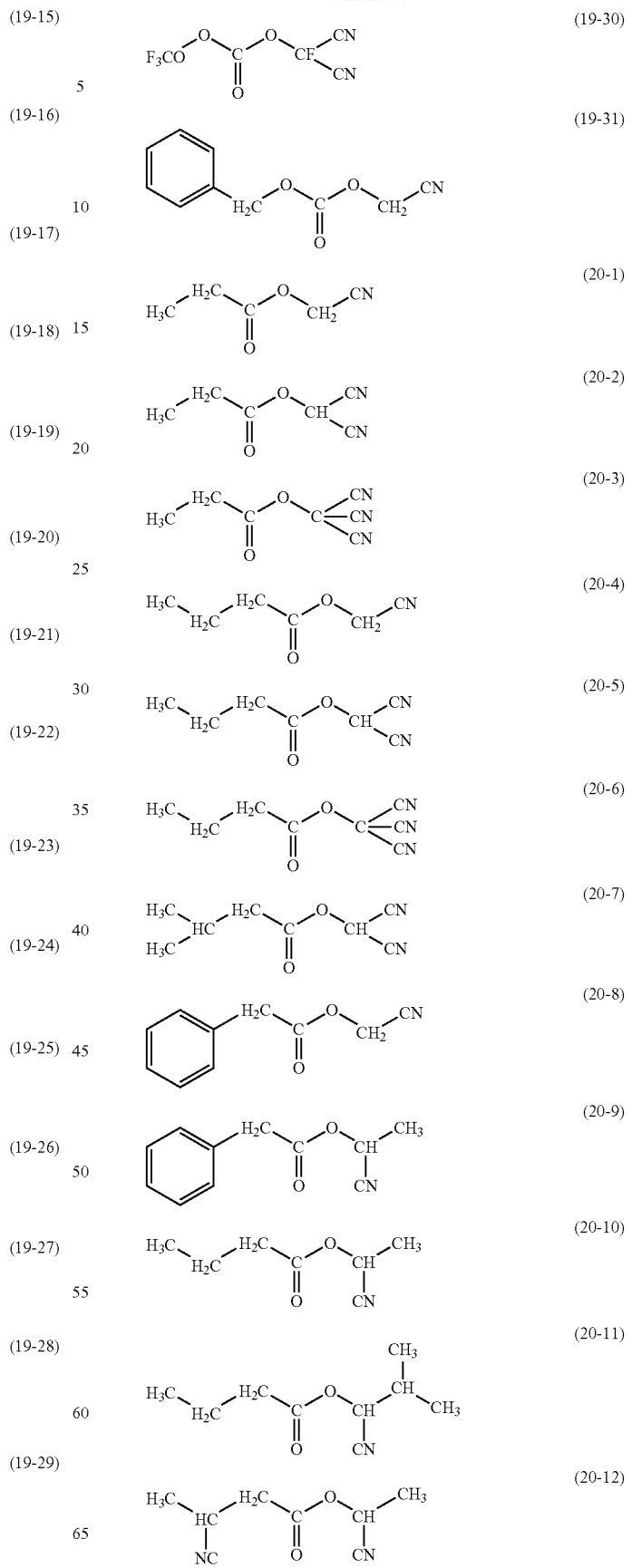

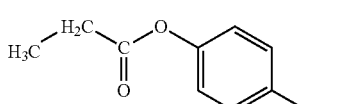
(20-13)

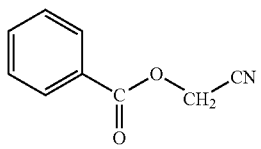
(20-14)

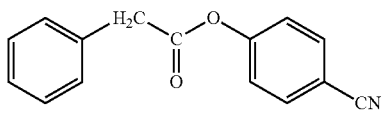
(20-15)

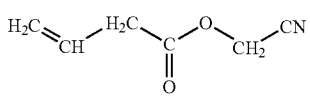
(20-16)

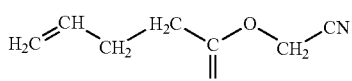
(20-17)

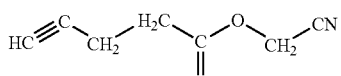
(20-18)

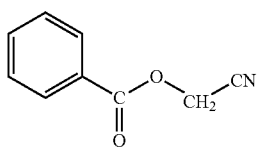
(20-19)

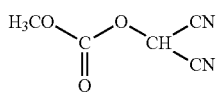
(20-20)

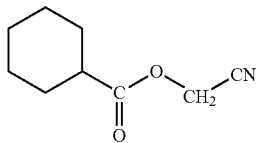
(20-21)

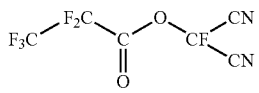
(20-22)

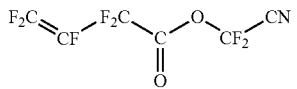
(20-23)

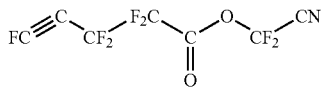
(20-24)

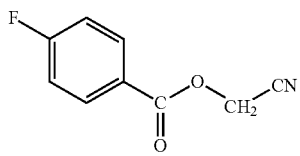
(20-25)

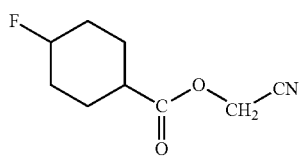
(20-26)

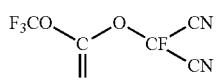
(20-27)

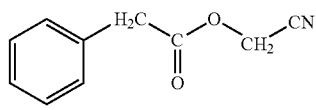
(20-28)

A content of the cyano compound in the electrolytic solution is not particularly limited. However, in particular, the content of the cyano compound is preferably from 0.01 wt % to 20 wt % both inclusive, and more preferably from 0.5 wt % to 20 wt % both inclusive, since a higher effect is obtained thereby.

The details of operation and of a manufacturing method of the present secondary battery may be similar to those in the first embodiment (cylindrical type) except that the composition of the electrolytic solution is different from that in the first embodiment, for example.

According to the present secondary battery of a cylindrical type, the anode active material layer 22B of the anode 22 includes the metal-based material and the electrolytic solution includes the cyano compound. In this case, as described above, chemical stability of the electrolytic solution is specifically improved, and therefore the decomposition reaction of the electrolytic solution is remarkably suppressed even when the electrolytic solution includes the metal-based material having high reactivity as the anode active material. Accordingly, the electrolytic solution is less likely to be decomposed even when the secondary battery is charged and discharged or is stored. Therefore, superior battery characteristics are obtained.

In particular, when the metal-based material is one of a simple substance, an alloy, and a compound of Si and a simple substance, an alloy, and a compound of Sn, a higher effect is obtained. Further, when the content of the cyano compound in the electrolytic solution is from 0.01 wt % to 20 wt % both inclusive, a higher effect is obtained.

[2-2. Lithium Ion Secondary Battery (Laminated Film Type)]

It is to be noted that the secondary battery of the present embodiment may be of a laminated film type instead of the above-described cylindrical type. A configuration of the secondary battery of the laminated film type is similar to that in the first embodiment except that the composition of the electrolytic solution is different from that in the first embodiment. Also in this case, superior battery characteristics are obtained.

3. Third Embodiment/Electrolytic Solution and Secondary Battery (Cyano Compound: The Number of Cyano Compound is not Limited+Non-Cyano Compound)

Next, description will be given of an electrolytic solution and a secondary battery of a third embodiment of the present technology.

[3-1. Lithium Ion Secondary Battery (Cylindrical Type)]

The secondary battery of the present embodiment has a configuration similar to that of the secondary battery of the first embodiment except that the composition of the electrolytic solution is different from that in the first embodiment. Therefore, the secondary battery described herein is a lithium ion secondary battery of a cylindrical type. The elements of the secondary battery of the first embodiment that have already been described will be used as necessary in the following description.

The electrolytic solution includes one or more of cyano compounds and one or more of non-cyano compounds. The details of the cyano compounds are similar to those of the cyano compounds described in the second embodiment, and the details of the non-cyano compounds are similar to those of the non-cyano compounds described in the first embodiment. Therefore, description thereof will be omitted. It is to be noted that the electrolytic solution may include other materials such as a solvent and an electrolytic salt.

One reason why the electrolytic solution includes the cyano compound and the non-cyano compound is that chemical stability is improved due to a synergetic function thereof compared to in a case where only one of the cyano compound and the non-cyano compound is included, and therefore the decomposition reaction is suppressed. In detail, a rigid film resulting from the cyano compound and the non-cyano compound is mainly formed on the surface of the anode 22 upon charge and discharge, and therefore the decomposition reaction of the electrolytic solution due to presence of the anode 22 having high reactivity is suppressed. Accordingly, decrease in discharge capacity is suppressed even when the secondary battery is repeatedly charged and discharged or is stored. This tendency is remarkable especially when the secondary battery is charged and discharged or is stored under severe temperature environment such as high temperature environment.

The content of the cyano compound in the electrolytic solution is not particularly limited. However, in particular, the content of the cyano compound is preferably from 0.01 wt % to 20 wt % both inclusive, and more preferably from 0.5 wt % to 20 wt % both inclusive, since a higher effect is obtained thereby.

The content of the non-cyano compound in the electrolytic solution is not particularly limited. However, the content of the non-cyano compound is preferably from 0.001 wt % to 2 wt % both inclusive, since a higher effect is obtained thereby.

The details of operation and of a manufacturing method of the present secondary battery may be similar to those in the first embodiment (cylindrical type) except that the composition of the electrolytic solution is different from that in the first embodiment.

According to the present secondary battery of a cylindrical type, the electrolytic solution includes the cyano compound and the non-cyano compound. In this case, as described above, the decomposition reaction of the electrolytic solution is suppressed due to the synergetic function of the cyano compound and the non-cyano compound even under severe temperature environment such as high temperature environment. Accordingly, the electrolytic solution is less likely to be decomposed even when the secondary battery is charged and discharged or is stored under severe temperature environment. Therefore superior battery characteristics are obtained.

In particular, when the content of the cyano compound in the electrolytic solution is from 0.01 wt % to 20 wt % both inclusive, or when the content of the non-cyano compound in the electrolytic solution is from 0.001 wt % to 2 wt % both inclusive, a higher effect is obtained.

[3-2. Lithium Ion Secondary Battery (Laminated Film Type)]

It is to be noted that the secondary battery of the present embodiment may be of a laminated film type instead of the above-described cylindrical type. A configuration of the secondary battery of the laminated film type is similar to that in the first embodiment except that the composition of the electrolytic solution is different from that in the first embodiment. Also in this case, superior battery characteristics are obtained.

[3-3. Lithium Metal Secondary Battery (Cylindrical Type and Laminated Film Type)]

Moreover, the secondary battery of the present embodiment may be a lithium metal secondary battery instead of the above-described lithium ion secondary battery. A battery structure in this case may be either of a cylindrical type or a laminated film type. A configuration of the lithium metal secondary battery is similar to that in the first embodiment except that the configuration of the anode and the composition of the electrolytic solution are different from those in the first embodiment. Also in this case, superior battery characteristics are obtained.

4. Applications of Secondary Battery

Next, description will be given of application examples of the above-described secondary batteries.

Applications of the secondary battery are not particularly limited as long as the secondary battery is used for applications such as a machine, a device, an instrument, an apparatus, a system (collective entity of a plurality of devices and the like) that are capable of using the secondary battery, for example, as a driving electric power source, an electric power storage source for electric power storage, or the like. It is to be noted that the secondary battery used as an electric power source may be a main electric power source (electric power source used preferentially), or may be an auxiliary electric power source (electric power source used instead of a main electric power source or used being switched from the main electric power source). When the secondary battery is used as an auxiliary electric power source, the type of the main electric power source is not limited to a secondary battery.

Examples of applications of the secondary battery include electronic apparatuses (including mobile electronic apparatuses) such as video camcorders, digital still cameras, mobile phones, notebook personal computers, cordless phones, headphone stereos, portable radios, portable televisions, and personal digital assistants. Further examples thereof include mobile lifestyle electric appliances such as electric shavers; memory devices such as backup electric power sources and memory cards; electric power tools such as electric drills and electric saws; battery packs used as an attachable and detachable electric power source, for example, for notebook personal computers or the like; medical electronic apparatuses such as pacemakers and hearing aids; electric vehicles such as electric automobiles (including hybrid automobiles); and electric power storage systems such as home battery systems for storing electric power, for example, for emergency or the like. It goes without saying that the secondary battery may be also used for applications other than the foregoing applications.

In particular, the secondary battery is effective in applications such as the battery pack, the electric vehicle, the electric power storage system, the electric power tool, and the electronic apparatus. In these applications, since superior battery characteristics are demanded, the performance thereof is effectively improved by using the secondary battery according to the embodiments of the present technology. It is to be noted that the battery pack is an electric power source that uses a secondary battery, such as a so-called assembled battery. The electric vehicle is a vehicle that operates (runs) with the use of a secondary battery as a driving electric power source. As described above, the electric vehicle may be an automobile (such as a hybrid automobile) that also includes a drive source other than a secondary battery. The electric power storage system is a system that uses a secondary battery as an electric power storage source. For example, in a home electric power storage system, electric power is stored in the secondary battery that is an electric power storage source, and the electric power is consumed as necessary. Therefore, for example, home electric products and the like become usable. The electric power tool is a tool in which a movable section (such as a drill) is moved with the use of a secondary battery as a driving electric power source. The electronic apparatus is an apparatus that executes various functions with the use of a secondary battery as a driving electric power source (electric power supply source).

Here, description will be specifically given of some application examples of the secondary battery. It is to be noted that configurations of the respective application examples explained below are merely examples, and may be changed as appropriate.

[4-1. Battery Pack]

Figure 5:
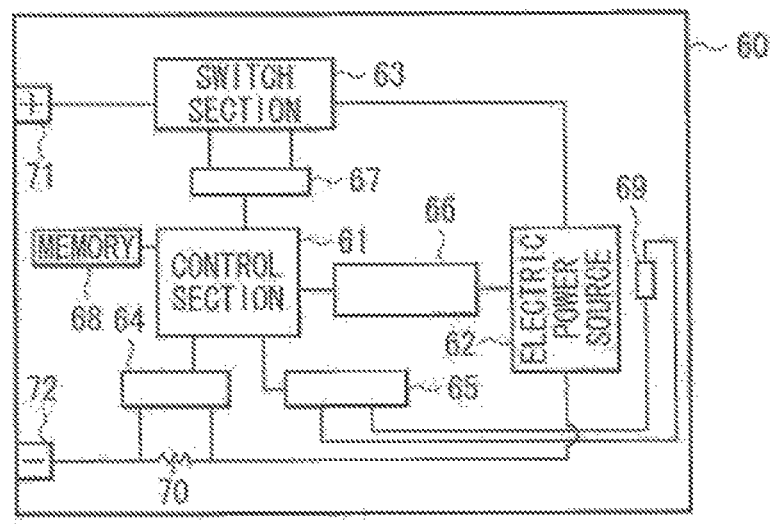
FIG. 5 is a block diagram illustrating a configuration of an application example (battery pack) of the secondary battery.

FIG. 5 illustrates a block configuration of a battery pack. The battery pack may include, for example, a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60 that is formed of materials such as a plastic material.

The control section 61 controls operation of the battery pack as a whole (including a used state of the electric power source 62), and may include, for example, a central processing unit (CPU) and/or the like. The electric power source 62 includes one or more secondary batteries (not illustrated). The electric power source 62 may be, for example, an assembled battery that includes two or more secondary batteries. The secondary batteries may be connected to one another in series, in parallel, or in a combination thereof. To give an example, the electric power source 62 includes six secondary batteries connected two in parallel and three in series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch each may be, for example, a semiconductor switch such as a field-effect transistor (MOSFET) that uses a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used, for example, in a case in which the control section 61 controls charge and discharge at the time of abnormal heat generation, or in a case in which the control section 61 performs correction processing at the time of calculating remaining capacity. The voltage detection section 66 measures a voltage of the secondary battery in the electric power source 62, performs analog-to-digital conversion (A/D conversion) on the measured voltage, and supplies the resultant to the control section 61.

The switch control section 67 controls operation of the switch section 63 according to signals inputted from the current measurement section 64 and the voltage measurement section 66.

The switch control section 67 disconnects the switch section 63 (charge control switch) so that a charge current is prevented from flowing in a current path of the electric power source 62 when a battery voltage reaches an overcharge detection voltage, for example. Thus, the electric power source 62 is allowed only to be discharged through the discharging diode. It is to be noted that the switch control section 67 blocks the charge current in the case where a large current flows at the time of charge, for example.

Moreover, the switch control section 67 disconnects the switch section 63 (discharge control switch) so that a discharge current is prevented from flowing in the current path of the electric power source 62 when a battery voltage reaches an over-discharge detection voltage, for example. Thus, the electric power source 62 is allowed only to be charged through the charging diode. It is to be noted that the switch control section 67 blocks the discharge current in the case where a large current flows at the time of discharge, for example.

It is to be noted that, in the secondary battery, for example, the overcharge detection voltage may be 4.20 V±0.05 V, and the over-discharge detection voltage may be 2.4 V±0.1 V.

The memory 68 may be, for example, a memory such as an EEPROM that is a nonvolatile memory. The memory 68 may store, for example, numerical values calculated by the control section 61 and information (such as an internal resistance in the initial state) of the secondary battery measured in a manufacturing step. It is to be noted that, when the memory 68 stores a full charge capacity of the secondary battery, the control section 61 comprehends information such as remaining capacity.

The temperature detection device 69 measures temperature of the electric power source 62, and outputs the measurement result to the control section 61. The temperature detection device 69 may be a device such as a thermistor.

The cathode terminal 71 and the anode terminal 72 are terminals connected to an external device (such as a notebook personal computer) driven with the use of the battery pack, or terminals connected to an external device (such as a battery charger) provided for charging the battery pack. The electric power source 62 is charged and discharged through the cathode terminal 71 and the anode terminal 72.

[4-2. Electric Vehicle]

Figure 6:
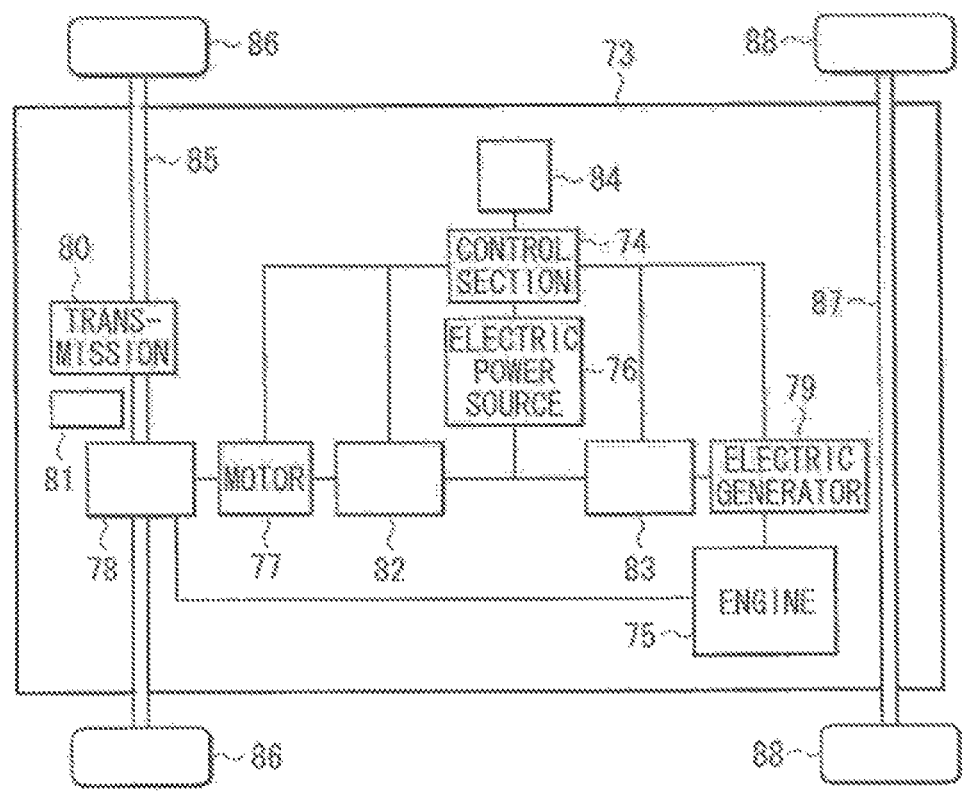
FIG. 6 is a block diagram illustrating a configuration of an application example (electric vehicle) of the secondary battery.

FIG. 6 illustrates a block configuration of a hybrid automobile that is an example of an electric vehicle. This electric vehicle may include, for example, a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front tire drive shaft 85 and a front tire 86 that are connected to the differential 78 and the transmission 80, a rear tire drive shaft 87, and a rear tire 88.

The electric vehicle runs with the use of one of the engine 75 and the motor 77 as a drive source. The engine 75 is a main power source, and may be an engine such as a petrol engine. In the case where the engine 75 is used as a power source, drive power (torque) of the engine 75 may be transferred, for example, to the front tire 86 or to the rear tire 88 through the differential 78, the transmission 80, and the clutch 81 that are drive sections. It is to be noted that the torque of the engine 75 is also transferred to the electric generator 79. Using the torque, the electric generator 79 generates alternating-current electric power, and the alternating-current electric power is converted to direct-current electric power through the inverter 83, and the thus-converted direct-current electric power is stored in the electric power source 76. On the other hand, in the case where the motor 77 that is a conversion section is used as a power source, electric power (direct-current electric power) supplied from the electric power source 76 is converted to alternating-current electric power through the inverter 82. The motor 77 is driven by the alternating-current electric power. Drive power (torque) converted from the electric power by the motor 77 may be transferred, for example, to the front tire 86 or to the rear tire 88 through the differential 78, the transmission 80, and the clutch 81 that are the drive sections.

It is to be noted that a scheme may be adopted in which, when speed of the electric vehicle is reduced by an unillustrated brake mechanism, the resistive force at the time of speed reduction is transferred to the motor 77 as torque, and the motor 77 generates alternating-current electric power by the torque. It is preferable that the alternating-current electric power be converted to direct-current electric power through the inverter 82, and the direct-current regenerative electric power be stored in the electric power source 76.

The control section 74 controls operation of the electric vehicle as a whole, and, for example, may include a CPU and/or the like. The electric power source 76 includes one or more secondary batteries (not illustrated). The electric power source 76 may be connected to an external electric power source, and be allowed to store electric power by receiving electric power from the external electric power source. The various sensors 84 may be used, for example, for controlling the number of rotations of the engine 75 or for controlling opening level (throttle opening level) of an unillustrated throttle valve. The various sensors 84 may include sensors such as, a speed sensor, an acceleration sensor, and an engine rotation frequency sensor.

It is to be noted that the description has been given above of a case where the electric vehicle is a hybrid automobile. However, the electric vehicle may be a vehicle (electric automobile) that operates by using only the electric power source 76 and the motor 77 without using the engine 75.

[4-3. Electric Power Storage System]

Figure 7:
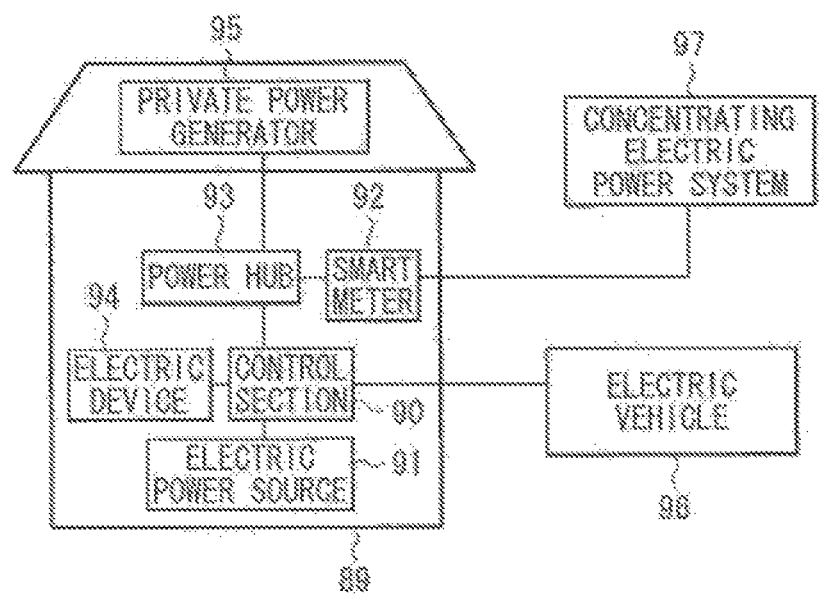
FIG. 7 is a block diagram illustrating a configuration of an application example (electric power storage system) of the secondary battery.

FIG. 7 illustrates a block configuration of an electric power storage system. The electric power storage system may include, for example, a control section 90, an electric power source 91, a smart meter 92, and a power hub 93, inside a house 89 such as a general residence and a commercial building.

In this example, the electric power source 91 may be connected to an electric device 94 arranged inside the house 89, and may be connectable to an electric vehicle 96 parked outside the house 89, for example. Further, the electric power source 91 may be connected to a private power generator 95 provided in the house 89 through the power hub 93, and may be connectable to an external concentrating electric power system 97 thorough the smart meter 92 and the power hub 93, for example.

It is to be noted that the electric device 94 may encompass, for example, one or more home electric appliances such as a refrigerator, an air conditioner, a television, and a water heater. The private power generator 95 may be, for example, one or more of generators such as a solar power generator and a wind-power generator. The electric vehicle 96 may be, for example, one or more of vehicles such as an electric automobile, an electric motorcycle, and a hybrid automobile. The concentrating electric power system 97 may be, for example, one or more of electric power systems such as a thermal power plant, a nuclear power plant, a hydraulic power plant, and a wind power plant.

The control section 90 controls operation of the electric power storage system as a whole (including a used state of the electric power source 91), and, may include, for example, a CPU and/or the like. The electric power source 91 includes one or more secondary batteries (not illustrated). The smart meter 92 may be, for example, an electric power meter compatible with a network provided in the house 89 which is a consumer of electric power, and may be communicable with a supplier of electric power. Accordingly, for example, while the smart meter 92 communicates with the outside as necessary, the smart meter 92 controls the balance between supply and demand in the house 89 and thereby allows effective and stable energy supply.

In the electric power storage system, for example, electric power is stored in the electric power source 91 from the concentrating electric power system 97 that is an external electric power source through the smart meter 92 and the power hub 93, and electric power is stored in the electric power source 91 from the private power generator 95 that is an independent electric power source through the power hub 93. The electric power stored in the electric power source 91 is supplied to the electric device 94 or to the electric vehicle 96 as necessary according to an instruction of the control section 90. Therefore, the electric device 94 becomes operable, and the electric vehicle 96 becomes chargeable. In other words, the electric power storage system is a system that achieves storing and supplying of electric power in the house 89 with the use of the electric power source 91.

The electric power stored in the electric power source 91 is used on an optional basis. Therefore, for example, electric power may be stored in the electric power source 91 from the concentrating electric power system 97 in the middle of the night when an electric rate is inexpensive, and the electric power stored in the electric power source 91 may be used during daytime hours when the electric rate is expensive.

It is to be noted that the above-described electric power storage system may be provided for each household (family unit), or may be provided for a plurality of households (a plurality of family units).

[4-4. Electric Power Tool]

Figure 8:
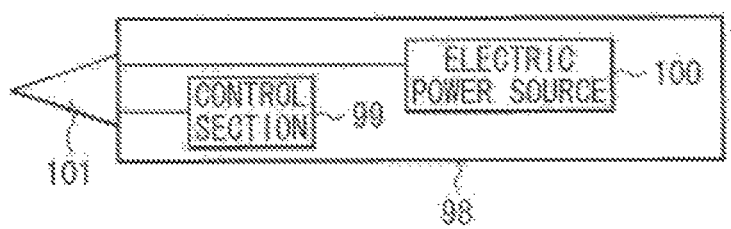
FIG. 8 is a block diagram illustrating a configuration of an application example (electric power tool) of the secondary battery.

FIG. 8 illustrates a block configuration of an electric power tool. The electric power tool may be, for example, an electric drill, and may include, for example, a control section 99 and an electric power source 100 in a tool body 98 made of materials such as a plastic material. For example, a drill section 101 that is a movable section may be attached to the tool body 98 in an operable (rotatable) manner.

The control section 99 controls operation of the electric power tool as a whole (including a used state of the electric power source 100), and may include, for example, a CPU and/or the like. The electric power source 100 includes one or more secondary batteries (not illustrated). The control section 99 allows electric power to be supplied from the electric power source 100 to the drill section 101 as necessary to operate the drill section 101 according to manipulation of an unillustrated operation switch.

EXAMPLES

Specific Examples of the embodiments of the present technology will be described in detail.

(1) Examples of First Embodiment

First, various characteristics of the secondary battery of the first embodiment were examined.

Examples 1-1 to 1-26

The lithium ion secondary battery of a cylindrical type shown in FIGS. 1 and 2 was fabricated by the following procedures.

Upon fabricating the cathode 21, first, lithium carbonate (Li2CO3) and cobalt carbonate (CoCO3) were mixed at a mole ratio of Li2CO3:CoCO3=0.5:1. Subsequently, the mixture was burned (at 900° C. for 5 hours) in the air and a lithium-cobalt composite oxide (LiCoO2) was obtained thereby. Subsequently, 91 parts by mass of the cathode active material (LiCoO2), 3 parts by mass of the cathode binder (polyvinylidene fluoride: PVDF), and 6 parts by mass of the cathode conductive agent (graphite) were mixed to prepare a cathode mixture. Subsequently, the cathode mixture was dispersed into an organic solvent (N-methyl-2-pyrrolidone: NMP) to prepare paste cathode mixture slurry. Subsequently, the cathode mixture slurry was coated uniformly on both surfaces of the strip-like cathode current collector 21A (an aluminum foil having a thickness of 20 μm) with the use of a coating device, and was dried to form the cathode active material layer 21B. Lastly, the cathode active material layer 21B was compression-molded with the use of a roll-pressing machine.

Upon fabricating the anode 22, first, 90 parts by mass of the anode active material (artificial graphite) and 10 parts by mass of the anode binder (PVDF) were mixed to obtain an anode mixture. Subsequently, the anode mixture was dispersed into an organic solvent (NMP) to obtain paste anode mixture slurry. Subsequently, the anode mixture slurry was coated uniformly on both surfaces of the stripe-like anode current collector 22A (a electrolyte copper foil having a thickness of 15 μm) with the use of a coating device, and was dried to form the anode active material layer 22B. Lastly, the anode active material layer 22B was compression-molded with the use of a roll-pressing machine.

Upon preparing the electrolytic solution, the electrolyte salt (LiPF6) was dissolved in the solvent (ethylene carbonate (EC) and dimethyl carbonate (DMC)), and the cyano compound was added thereto where appropriate as shown in Table 1. In this example, the composition of the solvent was set to be EC:DMC=50:50 at weight ratio and the content of the electrolyte salt with respect to the solvent was set to be 1 mol/kg. It is to be noted that, in the sake of comparison, other cyano compound represented by Formula (18-1) or Formula (18-2) was also used.

Upon assembling the secondary battery, first, the cathode lead 25 made of aluminum was welded to the cathode current collector 21A and the anode lead 26 made of nickel was welded to the anode current collector 22A. Subsequently, the cathode 21 and the anode 22 were laminated with the separator 23 (microporous polypropylene film having a thickness of 25 μm) in between and were spirally wound. Thereafter, the end of the wound portion was fixed with an adhesive tape to fabricate the spirally wound electrode body 20. Subsequently, the center pin 24 was inserted in the center hollow of the spirally wound electrode body 20. Subsequently, the spirally wound electrode body 20 was sandwiched between the pair of insulating plates 12 and 13 and contained inside the battery can 11 that was made of iron and plated with nickel. In this example, one end of the cathode lead 25 was welded to the safety valve mechanism 15, and one end of the anode lead 26 was welded to the battery can 11. Subsequently, the electrolytic solution was injected into the battery can 11 by depressurization to allow the separator 23 to be impregnated with the electrolytic solution. Lastly, the battery cover 14, the safety valve mechanism 15, and the PTC device 16 were swaged with the gasket 17 in between to be fixed onto the open end of the battery can 11. Thus, the secondary battery of a cylindrical type was completed. It is to be noted that, upon fabricating the secondary battery, the thickness of the cathode active material layer 21B was adjusted so that lithium metal did not precipitate on the anode 22 when the battery was fully charged.

Battery characteristics (cycle characteristics and conservation characteristics) of the secondary battery were examined and results shown in Table 1 were obtained.

Upon examining cycle characteristics, the secondary battery was charged and discharged for 1 cycle in an ambient temperature environment (23° C.) to stabilize the battery state. Thereafter, the secondary battery was charged and discharged for another cycle in the same environment, and the discharge capacity thereof was measured. Subsequently, the secondary battery was charged and discharged repeatedly in the same environment until the total number of cycle reached 300, and then, the discharge capacity thereof was measured. Based on this result, cycle retention ratio (%)=(discharge capacity at the 300th cycle/discharge capacity at the 2nd cycle)×100 was calculated. At the time of charging, the secondary battery was charged at a current of 0.2 C until the voltage reached the upper limit voltage of 4.2 V, and then, the secondary battery was charged at a voltage of 4.2 V until the current reached 0.05 C. At the time of discharging, the secondary battery was discharged at a current of 0.2 C until the voltage reached the final voltage of 2.5 V. "0.2 C" and "0.05 C" refer to current values with which the battery capacity (theoretical capacity) is completely discharged in 5 hours and in 20 hours, respectively.

Upon examining conservation characteristics, the secondary battery having a battery state that was stabilized by procedures similar to those in examining the cycle characteristics was used. The secondary battery was charged and discharged for 1 cycle in the ambient temperature environment (23° C.), and the discharge capacity thereof was measured. Subsequently, the secondary battery was stored in a constant temperature bath (80° C.) for 10 days in a state that the secondary battery was charged again. Thereafter, the secondary battery was discharged in an ambient temperature environment (23° C.), and discharge capacity thereof was measured. Based on this result, conservation retention ratio (%)=(discharge capacity after storing/discharge capacity before storing)×100 was calculated. Conditions of charge and discharge were similar to those upon examining cycle characteristics.

TABLE 1

Anode active material: artificial graphite

| Example | Electrolyte salt | Solvent | Cyano compound Type | Cyano compound Content (wt %) | Cycle retention ratio (%) | Conservation retention ratio (%) |
|---|---|---|---|---|---|---|
| 1-1 | LiPF$_6$ | EC + DMC | Formula (1-3) | 0.01 | 68 | 82 |
| 1-2 | | | | 0.1 | 72 | 82 |
| 1-3 | | | | 0.5 | 75 | 84 |
| 1-4 | | | | 1 | 80 | 84 |
| 1-5 | | | | 2 | 85 | 84 |
| 1-6 | | | | 5 | 85 | 84 |
| 1-7 | | | | 10 | 83 | 82 |
| 1-8 | | | | 20 | 82 | 82 |
| 1-9 | | | Formula (1-8) | 2 | 85 | 84 |
| 1-10 | | | Formula (1-10) | | 84 | 82 |
| 1-11 | | | Formula (1-11) | | 83 | 83 |
| 1-12 | | | Formula (1-12) | | 84 | 83 |
| 1-13 | | | Formula (1-14) | | 82 | 83 |
| 1-14 | | | Formula (1-15) | | 84 | 83 |
| 1-15 | | | Formula (2-8) | 2 | 78 | 83 |
| 1-16 | | | Formula (2-13) | 0.01 | 66 | 82 |
| 1-17 | | | | 0.1 | 70 | 82 |
| 1-18 | | | | 0.5 | 72 | 83 |
| 1-19 | | | | 1 | 78 | 83 |
| 1-20 | | | | 2 | 80 | 83 |
| 1-21 | | | | 5 | 80 | 83 |
| 1-22 | | | | 10 | 80 | 82 |
| 1-23 | | | | 20 | 78 | 82 |
| 1-24 | LiPF$_6$ | EC + DMC | — | — | 65 | 81 |
| 1-25 | | | Formula (18-1) | 2 | 62 | 75 |
| 1-26 | | | Formula (18-2) | 2 | 55 | 60 |

When a carbon material (artificial graphite) was used as the anode active material, battery characteristics were largely varied depending on whether or not the cyano compound was present in the electrolytic solution.

In detail, the example (Example 1-24) in which the cyano compound or other cyano compound was not used was used as a reference. In examples (Examples 1-25 and 1-26) in which other cyano compounds were used, both cycle retention ratio and conservation retention ratio were decreased. On the other hand, in examples (Examples 1-1 to 1-23) in which the cyano compounds were used, cycle retention ratio was increased while conservation retention ratio was maintained.

This result shows that, in a case where the carbonate-ester type cyano compound represented by Formula (1) is used, the decomposition reaction of the electrolytic solution is specifically suppressed when the number of cyano group in R2 (cyano-group-containing group) is adjusted appropriately according to the type of R1 (group other than a cyano-group-containing group).

Specifically, when R1 is a saturated hydrocarbon group (—CH3) that does not include the unsaturated carbon bond and R2 is a cyano-group-containing group (—CH2-CN) that does not include the unsaturated carbon bond, battery characteristics are varied according to the number of cyano group in R2. In this case, when the number of cyano group is one, the decomposition reaction of the electrolytic solution is not suppressed. Therefore, cycle retention ratio and conservation retention ratio are rather decreased. On the other hand, when the number of cyano group is two or larger (two, in this example), the decomposition reaction of the electrolytic solution is specifically suppressed. Therefore, cycle retention ratio is increased while decrease in conservation retention ratio is suppressed.

Moreover, when only R2 includes the cyano-group-containing group and R1 or R2 includes the unsaturated carbon bond, the decomposition reaction of the electrolytic solution is specifically suppressed even when the number of cyano group in R2 is one. Therefore, cycle retention ratio is increased also in this case.

It is to be noted that the tendency described above for the carbonate-ester type cyano compound was similarly obtained in an example in which the ester type cyano compound represented by Formula (2) was used.

In particular, in examples in which the cyano compound was used, high cycle retention ratio and high conservation retention ratio were obtained when the content of the cyano compound in the electrolytic solution was from 0.01 wt % to 20 wt % both inclusive.

Examples 2-1 to 2-23

As shown in Table 2, secondary batteries were fabricated by procedures similar to those in Examples 1-1 to 1-24 except that the non-cyano compound was added to the electrolytic solution, and various characteristics thereof were examined.

TABLE 2

Anode active material: artificial graphite

| Example | Electrolyte salt | Solvent | Cyano compound Type | Cyano compound Content (wt %) | Non-cyano compound Type | Non-cyano compound Content (wt %) | Cycle retention ratio (%) | Conservation retention ratio (%) |
|---|---|---|---|---|---|---|---|---|
| 2-1 | LiPF$_6$ | EC + DMC | Formula (1-3) | 2 | Formula (3-1) | 0.2 | 85 | 89 |
| 2-2 | | | | | Formula (4-1) | | 85 | 88 |
| 2-3 | | | | | Formula (5-1) | | 85 | 90 |
| 2-4 | | | | | LiPF$_2$O$_2$ | 0.001 | 85 | 88 |
| 2-5 | | | | | | 0.1 | 85 | 89 |
| 2-6 | | | | | | 0.2 | 85 | 90 |
| 2-7 | | | | | | 1 | 85 | 88 |
| 2-8 | | | | | | 2 | 85 | 88 |
| 2-9 | | | | | Li$_2$PFO$_3$ | 0.2 | 85 | 90 |
| 2-10 | | | Formula (2-13) | 2 | Formula (3-1) | 0.2 | 80 | 87 |
| 2-11 | | | | | Formula (4-1) | | 80 | 86 |
| 2-12 | | | | | Formula (5-1) | | 80 | 88 |
| 2-13 | | | | | LiPF$_2$O$_2$ | 0.001 | 80 | 84 |
| 2-14 | | | | | | 0.1 | 80 | 86 |
| 2-15 | | | | | | 0.2 | 80 | 87 |
| 2-16 | | | | | | 1 | 80 | 86 |
| 2-17 | | | | | | 2 | 80 | 86 |
| 2-18 | | | | | Li$_2$PFO$_3$ | 0.2 | 80 | 86 |
| 2-19 | LiPF$_6$ | EC + DMC | — | — | Formula (3-1) | 0.2 | 77 | 82 |
| 2-20 | | | | | Formula (4-1) | | 76 | 82 |
| 2-21 | | | | | Formula (5-1) | | 78 | 81 |
| 2-22 | | | | | LiPF$_2$O$_2$ | | 78 | 82 |
| 2-23 | | | | | Li$_2$PFO$_3$ | | 77 | 82 |

Even when the electrolytic solution included the non-cyano compound together with the cyano compound, high cycle retention ratio and high conservation retention ratio were obtained. In particular, in examples in which the electrolytic solution included the cyano compound, conservation retention ratio was further increased when the electrolytic solution further included the non-cyano compound. In this case, high conservation retention ratio was obtained when the content of the non-cyano compound in the electrolytic solution was from 0.001 wt % to 2 wt % both inclusive.

Examples 3-1 to 3-24

As shown in Table 3, secondary batteries were fabricated by procedures similar to those in Examples 1-1 to 1-24 except that the composition of the solvent was changed, and various characteristics thereof were examined.

The types of the solvent were as follows. The solvent used in combination with EC was diethyl carbonate (DEC), ethyl methyl carbonate (EMC), or propyl carbonate (PC). The unsaturated cyclic ester carbonate was vinylene carbonate (VC). The halogenated ester carbonate was 4-fluoro-1,3-dioxolan-2-one (FEC), trans-4,5-difluoro-1,3-dioxolan-2-one (t-DFEC), or bis(fluoromethyl) carbonate (DFDMC). The sulton was propene sultone (PRS). The acid anhydride was succinic anhydride (SCAH) or sulfopropionic anhydride (PSAH).

The composition of the solvent was set to be EC:PC:DMC=10:20:70 at weight ratio. Further, in the solvent, the content of VC was 2 wt %, the content of FEC, t-DFEC, or DFDMC was 5 wt %, and the content of PRS, SCAH, or PSAH was 1 wt %.

TABLE 3

Anode active material: artificial graphite

| Example | Electrolyte salt | Solvent | Cyano compound Type | Cyano compound Content (wt %) | Cycle retention ratio (%) | Conservation retention ratio (%) |
|---|---|---|---|---|---|---|
| 3-1 | LiPF$_6$ | EC + DEC | Formula (1-3) | 2 | 82 | 86 |
| 3-2 | | EC + EMC | | | 84 | 86 |
| 3-3 | | EC + PC + DMC | | | 84 | 86 |

TABLE 3-continued

Anode active material: artificial graphite

| Example | Electrolyte salt | Solvent | Cyano compound Type | Content (wt %) | Cycle retention ratio (%) | Conservation retention ratio (%) |
|---|---|---|---|---|---|---|
| 3-4 | | EC + DMC | VC | | 87 | 88 |
| 3-5 | | | FEC | | 90 | 90 |
| 3-6 | | | t-DFEC | | 87 | 88 |
| 3-7 | | | DFDMC | | 88 | 89 |
| 3-8 | | | PRS | | 88 | 93 |
| 3-9 | | | SCAH | | 88 | 92 |
| 3-10 | | | PSAH | | 90 | 94 |
| 3-11 | | EC + DEC | Formula | 2 | 78 | 84 |
| 3-12 | | EC + EMC | (2-13) | | 79 | 84 |
| 3-13 | | EC + PC + DMC | | | 78 | 84 |
| 3-14 | | EC + DMC | VC | | 85 | 85 |
| 3-15 | | | FEC | | 86 | 86 |
| 3-16 | | | t-DFEC | | 83 | 85 |
| 3-17 | | | DFDMC | | 83 | 85 |
| 3-18 | | | PRS | | 84 | 88 |
| 3-19 | | | SCAH | | 84 | 87 |
| 3-20 | | | PSAH | | 85 | 89 |
| 3-21 | $LiPF_6$ | EC + DMC | VC | — | 80 | 84 |
| 3-22 | | | FEC | | 79 | 81 |
| 3-23 | | | t-DFEC | | 79 | 80 |
| 3-24 | | | DFDMC | | 78 | 81 |

Even when the composition of the solvent was changed, high cycle retention ratio and high conservation ratio were obtained when the electrolytic solution included the cyano compound. In particular, cycle retention ratio and conservation retention ratio were further increased with some composition of the solvent.

Examples 4-1 to 4-6

As shown in Table 4, secondary batteries were fabricated by procedures similar to those in Examples 1-1 to 1-23 except that the composition of the electrolyte salt was changed, and various characteristics thereof were examined.

The type of the electrolyte salt was lithium tetrafluoroborate (LiBF4), bis[oxalato-O,O'] lithium borate (LiBOB) represented by Formula (13-6), or bis(trifluoromethane sulfonyl) imide lithium (LiN(CF3SO2)2: LiTFSI). The content of LiPF6 with respect to the solvent was set to be 0.9 mol/kg, and the content of LiBF4 or the like with respect to the solvent was set to be 0.1 mol/kg.

Even when the composition of the electrolyte salt was changed, high cycle retention ratio and high conservation retention ratio were obtained when the electrolytic solution included the cyano compound. In particular, conservation retention ratio was further increased when the electrolytic solution included LiBF4 or the like.

Examples 5-1 to 5-26, 6-1 to 6-23, 7-1 to 7-24, and 8-1 to 8-6

As shown in Tables 5 to 8, secondary batteries were fabricated by procedures similar to those in Examples 1-1 to 1-26, 2-1 to 2-23, 3-1 to 3-24, and 4-1 to 4-6 except that a metal-based material (silicon) was used as the anode active material, and various characteristics thereof were examined.

Upon fabricating the anode 22, silicon was deposited on both surfaces of the anode current collector 22A by an electron beam evaporation method to form the anode active material layer 22B. In this example, the deposition process was repeated for ten times until the thickness of the anode active material layer 22B on one surface of the anode current collector 22A became 6 μm.

TABLE 4

Anode active material: artificial graphite

| Example | Electrolyte salt | | Solvent | Cyano compound Type | Content (wt %) | Cycle retention ratio (%) | Conservation retention ratio (%) |
|---|---|---|---|---|---|---|---|
| 4-1 | $LiPF_6$ | $LiBF_4$ | EC + DMC | Formula | 2 | 85 | 90 |
| 4-2 | | LiBOB | | (1-3) | | 85 | 91 |
| 4-3 | | LiTFSI | | | | 85 | 90 |
| 4-4 | $LiPF_6$ | $LiBF_4$ | EC + DMC | Formula | 2 | 80 | 86 |
| 4-5 | | LiBOB | | (2-13) | | 80 | 86 |
| 4-6 | | LiTFSI | | | | 80 | 85 |

TABLE 5

| | | | Anode active material: silicon | | | |
|---|---|---|---|---|---|---|
| | | | | Cyano compound | Cycle retention | Conservation retention |
| Example | Electrolyte salt | Solvent | Type | Content (wt %) | ratio (%) | ratio (%) |
| 5-1 | LiPF$_6$ | EC + DMC | Formula (1-3) | 0.01 | 42 | 82 |
| 5-2 | | | | 0.1 | 45 | 82 |
| 5-3 | | | | 0.5 | 50 | 83 |
| 5-4 | | | | 1 | 62 | 85 |
| 5-5 | | | | 2 | 65 | 85 |
| 5-6 | | | | 5 | 65 | 84 |
| 5-7 | | | | 10 | 63 | 83 |
| 5-8 | | | | 20 | 60 | 82 |
| 5-9 | | | Formula (1-8) | 2 | 60 | 86 |
| 5-10 | | | Formula (1-10) | | 60 | 86 |
| 5-11 | | | Formula (1-11) | | 55 | 84 |
| 5-12 | | | Formula (1-12) | | 62 | 87 |
| 5-13 | | | Formula (1-14) | | 58 | 82 |
| 5-14 | | | Formula (1-15) | | 59 | 84 |
| 5-15 | | | Formula (2-8) | 2 | 48 | 82 |
| 5-16 | | | Formula (2-13) | 0.01 | 41 | 82 |
| 5-17 | | | | 0.1 | 42 | 82 |
| 5-18 | | | | 0.5 | 45 | 82 |
| 5-19 | | | | 1 | 50 | 83 |
| 5-20 | | | | 2 | 52 | 83 |
| 5-21 | | | | 5 | 52 | 82 |
| 5-22 | | | | 10 | 50 | 82 |
| 5-23 | | | | 20 | 48 | 82 |
| 5-24 | LiPF$_6$ | EC + DMC | — | — | 40 | 81 |
| 5-25 | | | Formula (18-1) | 2 | 32 | 70 |
| 5-26 | | | Formula (18-2) | 2 | 25 | 58 |

TABLE 6

| | | | Anode active material: silicon | | | | | |
|---|---|---|---|---|---|---|---|---|
| | | | Cyano compound | | Non-cyano compound | | Cycle retention | Conservation retention |
| Example | Electrolyte salt | Solvent | Type | Content (wt %) | Type | Content (wt %) | ratio (%) | ratio (%) |
| 6-1 | LiPF$_6$ | EC + DMC | Formula (1-3) | 2 | Formula (3-1) | 0.2 | 68 | 88 |
| 6-2 | | | | | Formula (4-1) | | 69 | 88 |
| 6-3 | | | | | Formula (5-1) | | 68 | 92 |
| 6-4 | | | | | LiPF$_2$O$_2$ | 0.001 | 67 | 86 |
| 6-5 | | | | | | 0.1 | 68 | 87 |
| 6-6 | | | | | | 0.2 | 70 | 88 |
| 6-7 | | | | | | 1 | 70 | 88 |
| 6-8 | | | | | | 2 | 70 | 88 |
| 6-9 | | | | | Li$_2$PFO$_3$ | 0.2 | 70 | 88 |
| 6-10 | | | Formula (2-13) | 2 | Formula (3-1) | 0.2 | 54 | 84 |
| 6-11 | | | | | Formula (4-1) | | 53 | 84 |
| 6-12 | | | | | Formula (5-1) | | 54 | 86 |
| 6-13 | | | | | LiPF$_2$O$_2$ | 0.001 | 54 | 85 |
| 6-14 | | | | | | 0.1 | 55 | 86 |
| 6-15 | | | | | | 0.2 | 56 | 86 |
| 6-16 | | | | | | 1 | 56 | 86 |
| 6-17 | | | | | | 2 | 56 | 86 |

TABLE 6-continued

Anode active material: silicon

| Example | Electrolyte salt | Solvent | Cyano compound Type | Cyano compound Content (wt %) | Non-cyano compound Type | Non-cyano compound Content (wt %) | Cycle retention ratio (%) | Conservation retention ratio (%) |
|---|---|---|---|---|---|---|---|---|
| 6-18 | | | | | $Li_2PFO_3$ | 0.2 | 70 | 88 |
| 6-19 | $LiPF_6$ | EC + DMC | — | — | Formula (3-1) | 0.2 | 38 | 81 |
| 6-20 | | | | | Formula (4-1) | | 38 | 81 |
| 6-21 | | | | | Formula (5-1) | | 40 | 83 |
| 6-22 | | | | | $LiPF_2O_2$ | | 38 | 81 |
| 6-23 | | | | | $Li_2PFO_3$ | | 38 | 81 |

TABLE 7

Anode active material: silicon

| Example | Electrolyte salt | Solvent | Cyano compound Type | Cyano compound Content (wt %) | Cycle retention ratio (%) | Conservation retention ratio (%) |
|---|---|---|---|---|---|---|
| 7-1 | $LiPF_6$ | EC + DEC | Formula (1-3) | 2 | 64 | 86 |
| 7-2 | | EC + EMC | | | 65 | 85 |
| 7-3 | | EC + PC + DMC | | | 65 | 88 |
| 7-4 | | EC + DMC  VC | | | 76 | 88 |
| 7-5 | | FEC | | | 80 | 87 |
| 7-6 | | t-DFEC | | | 84 | 87 |
| 7-7 | | DFDMC | | | 75 | 87 |
| 7-8 | | PRS | | | 66 | 89 |
| 7-9 | | SCAH | | | 68 | 88 |
| 7-10 | | PSAH | | | 68 | 90 |
| 7-11 | | EC + DEC | Formula (2-13) | 2 | 51 | 84 |
| 7-12 | | EC + EMC | | | 52 | 83 |
| 7-13 | | EC + PC + DMC | | | 51 | 85 |
| 7-14 | | EC + DMC  VC | | | 74 | 85 |
| 7-15 | | FEC | | | 76 | 84 |
| 7-16 | | t-DFEC | | | 80 | 84 |
| 7-17 | | DFDMC | | | 72 | 84 |
| 7-18 | | PRS | | | 54 | 88 |
| 7-19 | | SCAH | | | 54 | 87 |
| 7-20 | | PSAH | | | 56 | 88 |
| 7-21 | $LiPF_6$ | EC + DMC  VC | — | — | 70 | 84 |
| 7-22 | | FEC | | | 60 | 81 |
| 7-23 | | t-DFEC | | | 76 | 78 |
| 7-24 | | DFDMC | | | 68 | 80 |

TABLE 8

Anode active material: silicon

| Example | Electrolyte salt | Solvent | Cyano compound Type | Cyano compound Content (wt %) | Cycle retention ratio (%) | Conservation retention ratio (%) |
|---|---|---|---|---|---|---|
| 8-1 | $LiPF_6$  $LiBF_4$ | EC + DMC | Formula (1-3) | 2 | 65 | 87 |
| 8-2 | LiBOB | | | | 68 | 87 |
| 8-3 | LiTFSI | | | | 65 | 88 |
| 8-4 | $LiPF_6$  $LiBF_4$ | EC + DMC | Formula (2-13) | 2 | 52 | 85 |
| 8-5 | LiBOB | | | | 54 | 85 |
| 8-6 | LiTFSI | | | | 52 | 86 |

Even when the metal-based material (silicon) was used as the anode active material, results similar to those of the examples (Tables 1 to 4) in which the non-metal-based material (artificial graphite which is a carbon material) was used were obtained. Specifically, high cycle retention ratio and high conservation ratio were obtained when the electrolytic solution included the cyano compound. Tendencies other than this were similar to those in the examples in which the non-metal-based material was used.

As can be seen from the results shown in Tables 1 to 8, superior battery characteristics were obtained when the electrolytic solution included the cyano compound.

(2) Examples of Second Embodiment

Next, various characteristics of secondary batteries of the second embodiment were examined.

Examples 9-1 to 9-30

Lithium ion secondary batteries of a cylindrical type were fabricated by procedures similar to those in Examples of the first embodiment except that the following procedures were changed.

Upon fabricating the anode 22, a metal-based material (silicon) was used as the anode active material.

For the sake of comparison, a non-metal-based material (artificial graphite which is a carbon material) was used as the anode active material to form the anode active material layer 22B. In this example, 90 parts by mass of the anode active material (artificial graphite) and 10 parts by mass of the anode binder (PVDF) were mixed to obtain an anode mixture. Subsequently, the anode mixture was dispersed into an organic solvent (NMP) to prepare paste cathode mixture slurry. Subsequently, the anode mixture slurry was coated uniformly on both surfaces of the strip-like anode current collector 22A with the use of a coating device, and was dried to form the anode active material layer 22B. Lastly, the anode active material layer 22B was compression-molded with the use of a roll-pressing machine.

Upon preparing the electrolytic solution, the electrolyte salt (LiPF6) was dissolved in the solvent (EC and DMC), and then the cyano compound was added thereto where appropriate as shown in Tables 9 and 10.

Various characteristics (cycle characteristics and conservation characteristics) of the secondary battery were examined by procedures similar to those in Examples of the first embodiment, and results shown in Tables 9 and 10 were obtained.

TABLE 9

| | Anode | Electrolytic solution | | | | Cycle retention ratio (%) | Conservation retention ratio (%) |
|---|---|---|---|---|---|---|---|
| | Anode active | | | Cyano compound | | | |
| Example | material | Electrolyte salt | Solvent | Type | Content (wt %) | | |
| 9-1 | Silicon | LiPF$_6$ | EC + DMC | Formula (19-1) | 5 | 65 | 83 |
| 9-2 | | | | Formula (19-4) | 0.01 | 42 | 82 |
| 9-3 | | | | | 0.1 | 45 | 83 |
| 9-4 | | | | | 0.5 | 50 | 83 |
| 9-5 | | | | | 1 | 55 | 84 |
| 9-6 | | | | | 2 | 60 | 85 |
| 9-7 | | | | | 5 | 80 | 85 |
| 9-8 | | | | | 10 | 80 | 84 |
| 9-9 | | | | | 20 | 75 | 82 |
| 9-10 | | | | Formula (19-9) | 5 | 66 | 83 |
| 9-11 | | | | Formula (19-14) | 5 | 55 | 85 |
| 9-12 | | | | Formula (19-15) | 5 | 60 | 84 |
| 9-13 | | | | Formula (19-16) | 5 | 58 | 86 |
| 9-14 | | | | Formula (19-18) | 5 | 62 | 84 |
| 9-15 | | | | Formula (19-20) | 5 | 63 | 84 |
| 9-16 | | | | Formula (20-1) | 5 | 72 | 83 |
| 9-17 | | | | Formula (20-4) | 0.01 | 42 | 82 |
| 9-18 | | | | | 0.1 | 45 | 83 |
| 9-19 | | | | | 0.5 | 50 | 83 |
| 9-20 | | | | | 1 | 55 | 83 |
| 9-21 | | | | | 2 | 58 | 83 |
| 9-22 | | | | | 5 | 72 | 83 |
| 9-23 | | | | | 10 | 72 | 83 |
| 9-24 | | | | | 20 | 66 | 82 |
| 9-25 | | | | Formula (20-13) | 5 | 60 | 83 |
| 9-26 | | | | Formula (20-14) | 5 | 72 | 84 |

TABLE 10

| Example | Anode active material | Electrolyte salt | Solvent | Cyano compound Type | Content (wt %) | Cycle retention ratio (%) | Conservation retention ratio (%) |
|---|---|---|---|---|---|---|---|
| 9-27 | Silicon | $LiPF_6$ | EC + DMC | — | — | 40 | 81 |
| 9-28 | Artificial graphite | $LiPF_6$ | EC + DMC | — | — | 90 | 81 |
| 9-29 | | | | Formula (19-4) | 5 | 88 | 81 |
| 9-30 | | | | Formula (20-4) | 5 | 85 | 81 |

In the examples where the non-metal-based material (artificial graphite) was used as the anode active material, favorable battery characteristics were obtained irrespective of whether or not the cyano compound was present in the electrolytic solution. Specifically, when the electrolytic solution included the cyano compound, cycle retention ratio was decreased but conservation retention ratio was equivalent compared to the examples in which the electrolytic solution did not include the cyano compound.

On the other hand, in the examples in which the metal-based material (silicon) was used, battery characteristics were largely varied depending on whether or not the cyano compound was present in the electrolytic solution. Specifically, when the electrolytic solution included the cyano compound, cycle retention ratio and conservation retention ratio were both increased compared to the examples in which the electrolytic solution did not include the cyano compound.

The following tendencies can be seen from these results. In a case in which the non-metal-based material (carbon material) having low reactivity is used as the anode active material, the non-metal-based material is less likely to influence chemical stability (or proceeding characteristics of a decomposition reaction) of the electrolytic solution. Accordingly, high cycle retention ratio and high conservation retention ratio are intrinsically obtained with almost no influence of whether or not the cyano compound is present. Therefore, cycle retention ratio and conservation retention ratio are less likely to be improved even when the cyano compound is used. On the other hand, in a case in which a metal-based material having high reactivity is used, the metal-based material largely influences chemical stability of the electrolytic solution. Accordingly, only low cycle retention ratio and low conservation retention ratio are obtained when the cyano compound is not used, and on the other hand, cycle retention ratio and conservation retention ratio are largely improved when the cyano compound is used.

In particular, in examples in which the metal-based material and the cyano compound were used, high cycle retention ratio and high conservation retention ratio were obtained when the content of the cyano compound in the electrolytic solution was from 0.01 wt % to 20 wt % both inclusive.

Examples 10-1 to 10-26

As shown in Table 11, secondary batteries were fabricated by procedures similar to those in Examples 9-1 to 9-27 except that the composition of the solvent was changed as in Examples of the first embodiment.

TABLE 11

| Example | Anode active material | Electrolyte salt | Solvent | Cyano compound Type | (wt %) | Cycle retention ratio (%) | Conservation retention ratio (%) |
|---|---|---|---|---|---|---|---|
| 10-1 | Silicon | $LiPF_6$ | EC + DEC | Formula (19-4) | 5 | 80 | 88 |
| 10-2 | | | EC + EMC | | | 80 | 87 |
| 10-3 | | | EC + PC + DMC | | | 80 | 90 |
| 10-4 | | | EC + DEC   VC | | | 85 | 86 |
| 10-5 | | | FEC | | | 90 | 85 |
| 10-6 | | | t-DFEC | | | 92 | 85 |
| 10-7 | | | DFDMC | | | 90 | 85 |
| 10-8 | | | PRS | | | 81 | 92 |
| 10-9 | | | SCAH | | | 81 | 90 |
| 10-10 | | | PSAH | | | 84 | 94 |
| 10-11 | | | EC + DEC | Formula (20-4) | 5 | 72 | 85 |
| 10-12 | | | EC + EMC | | | 72 | 86 |
| 10-13 | | | EC + PC + DMC | | | 72 | 86 |
| 10-14 | | | EC + DEC   VC | | | 78 | 86 |
| 10-15 | | | FEC | | | 80 | 85 |
| 10-16 | | | t-DFEC | | | 84 | 85 |
| 10-17 | | | DFDMC | | | 80 | 85 |
| 10-18 | | | PRS | | | 73 | 90 |
| 10-19 | | | SCAH | | | 74 | 88 |
| 10-20 | | | PSAH | | | 76 | 92 |
| 10-21 | Silicon | $LiPF_6$ | EC + DEC   VC | — | — | 70 | 84 |
| 10-22 | | | FEC | | | 60 | 81 |

TABLE 11-continued

| | Anode | Electrolytic solution | | | | Cycle | Conservation |
| | Anode active | | | Cyano compound | | retention ratio | retention ratio |
| Example | material | Electrolyte salt | Solvent | Type | (wt %) | (%) | (%) |
|---|---|---|---|---|---|---|---|
| 10-23 | | | t-DFEC | | | 76 | 78 |
| 10-24 | | | DFDMC | | | 68 | 80 |
| 10-25 | | | PRS | | | 42 | 84 |
| 10-26 | | | PSAH | | | 44 | 84 |

Even when the composition of the solvent was changed, high cycle retention ratio and high conservation retention ratio were obtained when the electrolytic solution included the cyano compound.

Examples 11-1 to 11-6

As shown in Table 12, secondary batteries were fabricated by procedures similar to those in Examples 9-1 to 9-26 except that the composition of the electrolyte salt was changed as in Examples of the first embodiment.

TABLE 12

| | Anode Anode active | Electrolytic solution | | | | Cycle retention | Conservation retention |
| | | | | Cyano compound | | | |
| Example | material | Electrolyte salt | Solvent | Type | Content (wt %) | ratio (%) | ratio (%) |
|---|---|---|---|---|---|---|---|
| 11-1 | Silicon | $LiPF_6$ $LiBF_4$ | EC + DMC | Formula (19-4) | 5 | 80 | 90 |
| 11-2 | | LiBOB | | | | 80 | 90 |
| 11-3 | | LiTFSI | | | | 80 | 90 |
| 11-4 | | $LiPF_6$ $LiBF_4$ | EC + DMC | Formula (20-4) | 5 | 73 | 88 |
| 11-5 | | LiBOB | | | | 72 | 87 |
| 11-6 | | LiTFSI | | | | 72 | 88 |

Even when the composition of the electrolyte salt was changed, high cycle retention ratio and high conservation retention ratio were obtained when the electrolytic solution included the cyano compound. In particular, conservation retention ratio was further increased when the electrolytic solution included LiBF4 or the like.

As can be seen from the results shown in Tables 9 to 12, superior battery characteristics were obtained when the anode included the metal-based material and the electrolytic solution included the cyano compound.

(3) Examples of Third Embodiment

Next, various characteristics of the secondary battery of the third embodiment were examined.

Examples 12-1 to 12-50

Lithium ion secondary batteries of a cylindrical type were fabricated by procedures similar to those in Examples of the first embodiment except that the following procedures were changed.

Upon preparing the electrolytic solution, the electrolyte salt (LiPF6) was dissolved in the solvent (EC and DMC) and then, the cyano compound and the non-cyano compound were added thereto where appropriate as shown in Tables 13 to 15.

Various characteristics (cycle characteristics and load characteristics) of the secondary battery were examined, and the results shown in Tables 13 to 15 were obtained.

Upon examining cycle characteristics, the secondary battery was charged and discharged for two cycles in a high temperature environment (45° C.), and discharge capacity thereof at the second cycle was measured. Subsequently, the secondary battery was charged and discharged repeatedly in the same environment until the total number of cycle reached 300, and then, the discharge capacity thereof at the 300th cycle was measured. Based on this result, capacity retention ratio (%)=(discharge capacity at the 300th cycle/discharge capacity at the 2nd cycle)×100 was calculated. The charge and discharge conditions were similar to those in Examples of the first embodiment.

Upon examining load characteristics, the secondary battery was charged in an ambient temperature environment (23° C.), and the secondary battery in the charged state was cooled in a thermostat bath (0° C.) for 2 hours. The secondary battery was charged at a current of 0.5 C until the voltage reached the upper limit voltage of 4.2 V, and then, the secondary battery was charged at a voltage of 4.2 V for 4 hours. "0.5 C" refers to a current value with which the battery capacity is completely discharged in 2 hours. Subsequently, the secondary battery was discharged at electric power of 15 W until the voltage reached the final voltage of 3.0 V. At this time, voltages were measured from the beginning of discharge to the time which was 5 minutes after the beginning of discharge, and the minimum value (minimum voltage (V)) thereof was measured.

TABLE 13

Anode active material: artificial graphite

| Example | Electrolyte salt | Solvent | Cyano compound Type | Content (wt %) | Non-cyano compound Type | Content (wt %) | Capacity retention ratio (%) | Minimum voltage (V) |
|---|---|---|---|---|---|---|---|---|
| 12-1 | LiPF$_6$ | EC + DMC | Formula (19-1) | 0.01 | LiPF$_2$O$_2$ | 0.2 | 80 | 3.45 |
| 12-2 | | | | 0.1 | | | 81 | 3.45 |
| 12-3 | | | | 0.5 | | | 83 | 3.52 |
| 12-4 | | | | 1 | | | 85 | 3.52 |
| 12-5 | | | | 2 | | | 88 | 3.51 |
| 12-6 | | | | 5 | | | 88 | 3.51 |
| 12-7 | | | | 10 | | | 86 | 3.5 |
| 12-8 | | | | 20 | | | 85 | 3.5 |
| 12-9 | | | Formula (19-4) | 2 | LiPF$_2$O$_2$ | 0.2 | 85 | 3.5 |
| 12-10 | | | Formula (19-9) | | | | 84 | 3.5 |
| 12-11 | | | Formula (19-14) | | | | 86 | 3.5 |
| 12-12 | | | Formula (19-15) | | | | 84 | 3.5 |
| 12-13 | | | Formula (19-16) | | | | 85 | 3.5 |
| 12-14 | | | Formula (19-18) | | | | 85 | 3.5 |
| 12-15 | | | Formula (19-20) | | | | 84 | 3.5 |
| 12-16 | | | Formula (19-1) | 2 | LiPF$_2$O$_2$ | 0.001 | 80 | 3.45 |
| 12-17 | | | | | | 0.1 | 85 | 3.48 |
| 12-18 | | | | | | 1 | 88 | 3.5 |
| 12-19 | | | | | | 2 | 87 | 3.48 |
| 12-20 | | | Formula (19-1) | 2 | Formula (3-1) | 0.2 | 86 | 3.5 |
| 12-21 | | | | | Formula (4-1) | | 86 | 3.5 |
| 12-22 | | | | | Formula (5-1) | | 88 | 3.58 |
| 12-23 | | | | | Li$_2$PFO$_3$ | | 87 | 3.51 |

TABLE 14

Anode active material: artificial graphite

| Example | Electrolyte salt | Solvent | Cyano compound Type | Content (wt %) | Non-cyano compound Type | Content (wt %) | Capacity retention ratio (%) | Minimum voltage (V) |
|---|---|---|---|---|---|---|---|---|
| 12-24 | LiPF$_6$ | EC + DMC | Formula (20-1) | 2 | LiPF$_2$O$_2$ | 0.2 | 84 | 3.5 |
| 12-25 | | | Formula (20-4) | 0.01 | LiPF$_2$O$_2$ | 0.2 | 80 | 3.45 |
| 12-26 | | | | 0.1 | | | 82 | 3.45 |
| 12-27 | | | | 0.5 | | | 83 | 3.52 |
| 12-28 | | | | 1 | | | 85 | 3.52 |
| 12-29 | | | | 2 | | | 85 | 3.51 |
| 12-30 | | | | 5 | | | 85 | 3.51 |
| 12-31 | | | | 10 | | | 84 | 3.5 |
| 12-32 | | | | 20 | | | 83 | 3.5 |
| 12-33 | | | Formula (20-13) | 2 | LiPF$_2$O$_2$ | 0.2 | 84 | 3.5 |
| 12-34 | | | Formula (20-14) | | | | 83 | 3.5 |
| 12-35 | | | Formula (20-4) | 2 | LiPF$_2$O$_2$ | 0.001 | 80 | 3.45 |
| 12-36 | | | | | | 0.1 | 83 | 3.48 |
| 12-37 | | | | | | 1 | 84 | 3.5 |
| 12-38 | | | | | | 2 | 84 | 3.48 |
| 12-39 | | | Formula (20-4) | 2 | Formula (3-1) | 0.2 | 85 | 3.5 |
| 12-40 | | | | | Formula (4-1) | | 84 | 3.5 |

TABLE 14-continued

Anode active material: artificial graphite

| Example | Electrolyte salt | Solvent | Cyano compound Type | Content (wt %) | Non-cyano compound Type | Content (wt %) | Capacity retention ratio (%) | Minimum voltage (V) |
|---|---|---|---|---|---|---|---|---|
| 12-41 | | | | | Formula (5-1) | | 86 | 3.58 |
| 12-42 | | | | | Li$_2$PFO$_3$ | | 84 | 3.51 |

TABLE 15

Anode active material: artificial graphite

| Example | Electrolyte salt | Solvent | Cyano compound Type | Content (wt %) | Non-cyano compound Type | Content (wt %) | Capacity retention ratio (%) | Minimum voltage (V) |
|---|---|---|---|---|---|---|---|---|
| 12-43 | LiPF$_6$ | EC + DMC | — | — | — | — | 65 | 3.42 |
| 12-44 | | | Formula (19-1) | 2 | — | — | 62 | 3.42 |
| 12-45 | | | Formula (20-4) | | | | 62 | 3.42 |
| 12-46 | | | — | — | Formula (3-1) | 0.2 | 77 | 3.43 |
| 12-47 | | | | | Formula (4-1) | | 76 | 3.42 |
| 12-48 | | | | | Formula (5-1) | | 78 | 3.45 |
| 12-49 | | | | | LiPF$_2$O$_2$ | | 78 | 3.44 |
| 12-50 | | | | | Li$_2$PFO$_3$ | | 77 | 3.44 |

In the examples in which the carbon material (artificial graphite) was used as the anode active material, high capacity retention ratio was obtained and the minimum voltage was increased when the electrolytic solution includes both the cyano compound and the non-cyano compound.

In detail, an example (Example 12-43) in which the cyano compound nor the non-cyano compound was used was used as a reference. In the examples (Examples 12-44 and 12-45) in which only the cyano compound was used, the minimum voltage was equivalent but capacity retention ratio was decreased. On the other hand, in the examples (Examples 12-46 to 12-50) in which only the non-cyano compound was used, capacity retention ratio was increased and the minimum voltage was slightly increased with some types of non-cyano compound. Based on these results, it can be expected that, when the cyano compound and the non-cyano compound are used in combination, capacity retention ratio is increased but the value thereof is lower than that in the case in which only the non-cyano compound is used, and the minimum voltage is only slightly increased with some types of non-cyano compound.

However, when the cyano compound and the non-cyano compound were used in combination (Examples 12-1 to 12-42), capacity retention ratio was remarkably increased and the value thereof was much larger than that in the examples in which only the non-cyano compound was used. Further, the minimum voltage was increased and the value thereof was larger than that in the examples in which only the non-cyano compound was used. As can be seen from these results, when the cyano compound and the non-cyano compound are used in combination, a decomposition reaction of the electrolytic solution is specifically suppressed due to the synergetic function of the both compounds. Specifically, influence of whether or not the respective cyano compound and non-cyano compound are present on capacity retention ratio and on minimum voltage were actually examined, and it was found that, by using the cyano compound and the non-cyano compound in combination, advantageous tendencies were obtained that were unpredictable from the tendencies obtained in the case in which only one of the compounds was solely used.

In particular, high capacity retention ratio and high minimum voltage were obtained when the content of the cyano compound was from 0.01 wt % to 20 wt % both inclusive or when the content of the non-cyano compound was from 0.001 wt % to 2 wt % both inclusive. In this case, more favorable results were obtained when the content of the cyano compound was from 0.5 wt % to 20 wt % both inclusive or when the content of the non-cyano compound was from 0.1 wt % to 2 wt % both inclusive.

Examples 13-1 to 13-24

As shown in Table 16, secondary batteries were fabricated by procedures similar to those in Examples 12-1 to 12-50 except that the composition of the solvent was changed as in Examples of the first embodiment, and various characteristics thereof were examined.

TABLE 16

Anode active material: artificial graphite

| Example | Electrolyte salt | Solvent | Cyano compound Type | Content (wt %) | Non-cyano compound Type | Content (wt %) | Capacity retention ratio (%) | Minimum voltage (V) |
|---|---|---|---|---|---|---|---|---|
| 13-1 | LiPF$_6$ | EC + DEC | Formula (19-1) | 2 | LiPF$_2$O$_2$ | 0.2 | 88 | 3.55 |
| 13-2 | | EC + EMC | | | | | 88 | 3.55 |
| 13-3 | | EC + PC + DMC | | | | | 87 | 3.58 |
| 13-4 | | EC + DEC   VC | | | | | 87 | 3.48 |
| 13-5 | | FEC | | | | | 92 | 3.45 |
| 13-6 | | t-DFEC | | | | | 90 | 3.45 |
| 13-7 | | DFDMC | | | | | 88 | 3.45 |
| 13-8 | | PRS | | | | | 90 | 3.62 |
| 13-9 | | SCAH | | | | | 90 | 3.48 |
| 13-10 | | PSAH | | | | | 92 | 3.65 |
| 13-11 | | EC + DEC | Formula (20-4) | 2 | LiPF$_2$O$_2$ | 0.2 | 85 | 3.55 |
| 13-12 | | EC + EMC | | | | | 86 | 3.55 |
| 13-13 | | EC + PC + DMC | | | | | 87 | 3.58 |
| 13-14 | | EC + DEC   VC | | | | | 87 | 3.48 |
| 13-15 | | FEC | | | | | 90 | 3.45 |
| 13-16 | | t-DFEC | | | | | 88 | 3.45 |
| 13-17 | | DFDMC | | | | | 87 | 3.45 |
| 13-18 | | PRS | | | | | 88 | 3.62 |
| 13-19 | | SCAH | | | | | 90 | 3.48 |
| 13-20 | | PSAH | | | | | 90 | 3.65 |
| 13-21 | | EC + DEC   VC | — | — | — | — | 80 | 3.2 |
| 13-22 | | FEC | | | | | 79 | 3.36 |
| 13-23 | | t-DFEC | | | | | 79 | 3.32 |
| 13-24 | | DFDMC | | | | | 78 | 3.33 |

Even when the composition of the solvent was changed, high cycle retention ratio and high minimum voltage were obtained when the electrolytic solution included the cyano compound and the non-cyano compound. In particular, with some composition of the solvent, cycle retention ratio and minimum voltage were further increased.

Examples 14-1 to 14-6

As shown in Table 17, secondary batteries were fabricated by procedures similar to those in Examples 12-1 to 12-50 except that the composition of the electrolyte salt was changed as in Examples of the first embodiment, and various characteristics thereof were examined.

TABLE 17

Anode active material: artificial graphite

| Example | Electrolyte salt | Solvent | Cyano compound Type | Content (wt %) | Non-cyano compound Type | Content (wt %) | Capacity retention ratio (%) | Minimum voltage (V) |
|---|---|---|---|---|---|---|---|---|
| 14-1 | LiPF$_6$ LiBF$_4$ | EC + DMC | Formula (19-1) | 2 | LiPF$_2$O$_2$ | 0.2 | 89 | 3.52 |
| 14-2 | LiBOB | | | | | | 89 | 3.52 |
| 14-3 | LiTFSI | | | | | | 89 | 3.53 |
| 14-4 | LiPF$_6$ LiBF$_4$ | | Formula (20-4) | 2 | | | 86 | 3.52 |
| 14-5 | LiBOB | | | | | | 86 | 3.52 |
| 14-6 | LiTFSI | | | | | | 86 | 3.53 |

Even when the composition of the electrolyte salt was changed, high cycle retention ratio and high minimum voltage were obtained when the electrolytic solution included the cyano compound and the non-cyano compound. In particular, cycle retention ratio and minimum voltage were further increased when the electrolytic solution included LiBF4 or the like.

Examples 15-1 to 15-50, 16-1 to 16-24, and 17-1 to 17-6

As shown in Tables 18 to 20, secondary batteries were fabricated by procedures similar to those in Examples 12-1 to 12-50, 13-1 to 13-24, and 14-1 to 14-6 except that a metal-based material (silicon) was used as the anode active material, and various characteristics thereof were examined. Procedures of fabricating the anode 22 were similar to those in Examples of the first embodiment.

TABLE 18

Anode active material: silicon

| Example | Electrolyte salt | Solvent | Cyano compound Type | Cyano compound Content (wt %) | Non-cyano compound Type | Non-cyano compound Content (wt %) | Capacity retention ratio (%) | Minimum voltage (V) |
|---|---|---|---|---|---|---|---|---|
| 15-1 | LiPF$_6$ | EC + DMC | Formula (19-1) | 0.01 | LiPF$_2$O$_2$ | 0.2 | 41 | 3.48 |
| 15-2 | | | | 0.1 | | | 42 | 3.49 |
| 15-3 | | | | 0.5 | | | 44 | 3.49 |
| 15-4 | | | | 1 | | | 48 | 3.49 |
| 15-5 | | | | 2 | | | 50 | 3.5 |
| 15-6 | | | | 5 | | | 50 | 3.5 |
| 15-7 | | | | 10 | | | 47 | 3.5 |
| 15-8 | | | | 20 | | | 46 | 3.48 |
| 15-9 | | | Formula (19-4) | 2 | LiPF$_2$O$_2$ | 0.2 | 70 | 3.5 |
| 15-10 | | | Formula (19-9) | | | | 64 | 3.39 |
| 15-11 | | | Formula (19-14) | | | | 64 | 3.49 |
| 15-12 | | | Formula (19-15) | | | | 58 | 3.49 |
| 15-13 | | | Formula (19-16) | | | | 65 | 3.5 |
| 15-14 | | | Formula (19-18) | | | | 60 | 3.49 |
| 15-15 | | | Formula (19-20) | | | | 61 | 3.49 |
| 15-16 | | | Formula (19-1) | 2 | LiPF$_2$O$_2$ | 0.001 | 42 | 3.48 |
| 15-17 | | | | | | 0.1 | 44 | 3.49 |
| 15-18 | | | | | | 1 | 50 | 3.49 |
| 15-19 | | | | | | 2 | 50 | 3.49 |
| 15-20 | | | Formula (19-1) | 2 | Formula (3-1) | 0.2 | 48 | 3.49 |
| 15-21 | | | | | Formula (4-1) | | 48 | 3.49 |
| 15-22 | | | | | Formula (5-1) | | 50 | 3.51 |
| 15-23 | | | | | Li$_2$PFO$_3$ | | 49 | 3.49 |

TABLE 19

Anode active material: silicon

| Example | Electrolyte salt | Solvent | Cyano compound Type | Cyano compound Content (wt %) | Non-cyano compound Type | Non-cyano compound Content (wt %) | Capacity retention ratio (%) | Minimum voltage (V) |
|---|---|---|---|---|---|---|---|---|
| 15-24 | LiPF$_6$ | EC + DMC | Formula (20-1) | 2 | LiPF$_2$O$_2$ | 0.2 | 46 | 3.48 |
| 15-25 | | | Formula (20-4) | 0.01 | LiPF$_2$O$_2$ | 0.2 | 42 | 3.48 |
| 15-26 | | | | 0.1 | | | 42 | 3.48 |
| 15-27 | | | | 0.5 | | | 44 | 3.48 |
| 15-28 | | | | 1 | | | 47 | 3.48 |
| 15-29 | | | | 2 | | | 48 | 3.49 |
| 15-30 | | | | 5 | | | 48 | 3.49 |
| 15-31 | | | | 10 | | | 46 | 3.49 |
| 15-32 | | | | 20 | | | 44 | 3.49 |
| 15-33 | | | Formula (20-13) | 2 | LiPF$_2$O$_2$ | 0.2 | 48 | 3.49 |
| 15-34 | | | Formula (20-14) | | | | 56 | 3.49 |
| 15-35 | | | Formula (20-4) | | LiPF$_2$O$_2$ | 0.001 | 46 | 3.48 |
| 15-36 | | | | 2 | | 0.1 | 48 | 3.49 |
| 15-37 | | | | | | 1 | 48 | 3.49 |
| 15-38 | | | | | | 2 | 48 | 3.49 |
| 15-39 | | | Formula (20-4) | 2 | Formula (3-1) | 0.2 | 46 | 3.5 |

TABLE 19-continued

| | | | Anode active material: silicon | | | | |
|---|---|---|---|---|---|---|---|
| | | | | Cyano compound | | Non-cyano compound | | Capacity retention | Minimum |
| Example | Electrolyte salt | Solvent | Type | Content (wt %) | Type | Content (wt %) | ratio (%) | voltage (V) |
| 15-40 | | | | | Formula (4-1) | | 46 | 3.5 |
| 15-41 | | | | | Formula (5-1) | | 47 | 3.5 |
| 15-42 | | | | | $Li_2PFO_3$ | | 48 | 3.51 |

TABLE 20

| | | | Anode active material: silicon | | | | |
|---|---|---|---|---|---|---|---|
| | | | | Cyano compound | | Non-cyano compound | | Capacity retention | Minimum |
| Example | Electrolyte salt | Solvent | Type | Content (wt %) | Type | Content (wt %) | ratio (%) | voltage (V) |
| 15-43 | $LiPF_6$ | EC + DMC | — | — | — | — | 40 | 3.42 |
| 15-44 | | | Formula (19-1) | 2 | — | — | 32 | 3.32 |
| 15-45 | | | Formula (20-4) | | | | 25 | 3.33 |
| 15-46 | | | — | — | Formula (3-1) | 0.2 | 38 | 3.43 |
| 15-47 | | | | | Formula (4-1) | | 38 | 3.42 |
| 15-48 | | | | | Formula (5-1) | | 40 | 3.44 |
| 15-49 | | | | | $LiPF_2O_2$ | | 38 | 3.43 |
| 15-50 | | | | | $Li_2PFO_3$ | | 38 | 3.43 |

TABLE 21

| | | | Anode active material: silicon | | | | |
|---|---|---|---|---|---|---|---|
| | | | | Cyano compound | | Non-cyano compound | | Capacity retention | Minimum |
| Example | Electrolyte salt | Solvent | Type | Content (wt %) | Type | Content (wt %) | ratio (%) | voltage (V) |
| 16-1 | LiPF6 | EC + DEC | Formula (19-1) | 2 | $LiPF_2O_2$ | 0.2 | 49 | 3.49 |
| 16-2 | | EC + EMC | | | | | 50 | 3.5 |
| 16-3 | | EC + PC + DMC | | | | | 50 | 3.53 |
| 16-4 | | EC + DEC | VC | | | | 74 | 3.49 |
| 16-5 | | | FEC | | | | 74 | 3.49 |
| 16-6 | | | t-DFEC | | | | 76 | 3.5 |
| 16-7 | | | DFDMC | | | | 73 | 3.5 |
| 16-8 | | | PRS | | | | 56 | 3.53 |
| 16-9 | | | SCAH | | | | 58 | 3.49 |
| 16-10 | | | PSAH | | | | 60 | 3.55 |
| 16-11 | | EC + DEC | Formula (20-4) | 2 | $LiPF_2O_2$ | 0.2 | 47 | 3.49 |
| 16-12 | | EC + EMC | | | | | 48 | 3.5 |
| 16-13 | | EC + PC + DMC | | | | | 48 | 3.52 |
| 16-14 | | EC + DEC | VC | | | | 72 | 3.49 |
| 16-15 | | | FEC | | | | 74 | 3.5 |
| 16-16 | | | t-DFEC | | | | 78 | 3.49 |
| 16-17 | | | DFDMC | | | | 70 | 3.5 |
| 16-18 | | | PRS | | | | 52 | 3.52 |
| 16-19 | | | SCAH | | | | 55 | 3.5 |
| 16-20 | | | PSAH | | | | 58 | 3.54 |
| 16-21 | | EC + DEC | VC | — | — | — | 70 | 3.33 |
| 16-22 | | | FEC | | | | 60 | 3.4 |
| 16-23 | | | t-DFEC | | | | 76 | 3.38 |
| 16-24 | | | DFDMC | | | | 68 | 3.38 |

TABLE 22

| | | | Cyano compound | | Non-cyano compound | | Capacity retention | Minimum |
|---|---|---|---|---|---|---|---|---|
| Example | Electrolyte salt | Solvent | Type | Content (wt %) | Type | Content (wt %) | ratio (%) | voltage (V) |
| 17-1 | LiPF$_6$ LiBF$_4$ | EC + DMC | Formula (19-1) | 2 | LiPF$_2$O$_2$ | 0.2 | 51 | 3.5 |
| 17-2 | LiBOB | | | | | | 56 | 3.46 |
| 17-3 | LiTFSI | | | | | | 52 | 3.5 |
| 17-4 | LiPF$_6$ LiBF$_4$ | | Formula (20-4) | 2 | | | 52 | 3.5 |
| 17-5 | LiBOB | | | | | | 55 | 3.46 |
| 17-6 | LiTFSI | | | | | | 52 | 3.5 |

Anode active material: silicon

Even when the metal-based material (silicon) was used as the anode active material, results similar to those in the examples (Tables 13 to 17) in which the non-metal-based material (artificial graphite which is a carbon material) was used were obtained. Specifically, high cycle retention ratio and high minimum voltage were obtained when the electrolytic solution included both the cyano compound and the non-cyano compound. Tendencies other than this were similar to those in the cases in which the non-metal-based material was used.

As can be seen from the results shown in Tables 13 to 22, superior battery characteristics were obtained when the electrolytic solution included both the cyano compound and the non-cyano compound.

Hereinabove, the present technology has been described with reference to the preferred embodiments and Examples. However, the present technology is not limited to the examples described in the preferred embodiments and Examples and may be variously modified. For example, description has been given with referring to the examples in which the battery has a cylindrical type or a laminated film type battery structure and has a battery device of a spirally wound structure. However, the secondary battery of the present technology is not limited thereto, and may be similarly applicable, for example, to a battery that has other battery structure such as a square type, a coin type, and a button type and to a battery that has a battery device of other structure such as a lamination structure.

The case in which Li is used as the electrode reactant has been described. However, this is not limitative. The electrode reactant may be, for example, other Group 1 elements such as Na and K, Group 2 elements such as Mg and Ca, or other light metal such as Al. Since the effects of the present technology may be obtained irrespective of electrode reactant type, similar effects are obtainable even if the type of the electrode reactant is changed.

Further, the content of the cyano compound has been described with an appropriate range resulted from the results of Examples. However, the description does not necessarily deny a possibility that the content thereof is out of the above-described range. In other words, the above-described appropriate range is merely a range especially preferable in obtaining the effects of the present technology. Therefore, the content may be out of the above-described range in some degree as long as the effects of the present technology are obtained. The same is applicable to the content of the non-cyano compound.

It is possible to achieve at least the following configurations from the above-described example embodiments of the disclosure.

1. First Embodiment/Electrolytic Solution and Secondary Battery (Cyano Compound: The Number of Cyano Group is Limited)

(1) A secondary battery including:
a cathode;
an anode; and
an electrolytic solution including a cyano compound, the cyano compound including a compound represented by a following Formula (1), a compound represented by a following Formula (2), or both,

where R1 and R2 are each one of a saturated hydrocarbon group, an unsaturated hydrocarbon group, an oxygen-containing saturated hydrocarbon group, a cyano-group-containing group, halogenated groups of the foregoing groups, and groups each obtained by bonding two or more of the foregoing groups to one another, and the R1, the R2, or both include the cyano-group-containing group; a cyano group in the cyano-group-containing group is bonded to an oxygen atom (O) at a terminal of a —O—C(=O)—O— bond with one or more carbon atoms (C) in between; (A) when one of the R1 and the R2 does not include the cyano-group-containing group but includes an unsaturated carbon bond and the other of the R1 and the R2 includes the cyano-group-containing group, number of the cyano group in the other of the R1 and the R2 is one or larger; (B) when one of the R1 and the R2 include neither the cyano-group-containing group nor the unsaturated carbon bond and the other of the R1 and the R2 includes the cyano-group-containing group and the unsaturated carbon bond, the number of the cyano group in the other of the R1 and the R2 is one or larger; and (C) when one of the R1 and the R2 include neither the cyano-group-containing group nor the unsaturated carbon bond and the other of the R1 and the R2 includes the cyano-group-containing group but does not include the unsaturated carbon bond, the number of the cyano group in the other of the R1 and the R2 is two or larger,

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another; R4 is one of a cyano-group-containing group, halogenated groups thereof, and groups each obtained by bonding two or more of the foregoing groups to one another; a cyano group in the cyano-group-containing group is bonded to an oxygen atom at a terminal of a —C(=O)—O— bond with one or more carbon atoms in between; (D) when the R3 includes an unsaturated carbon bond, number of the cyano group in the R4 is one or larger; (E) when the R3 does not include the unsaturated carbon bond and the R4 includes the unsaturated carbon bond, the number of the cyano group in the R4 is one or larger; and (F) when the R3 does not include the unsaturated carbon bond and the R4 does not include the unsaturated carbon bond, the number of the cyano group in the R4 is two or larger.

(2) The secondary battery according to (1), wherein the cyano-group-containing group is one of a group obtained by substituting each of part or all of hydrogen groups in a saturated hydrocarbon group by a cyano group and a group obtained by substituting each of part or all of hydrogen groups in an unsaturated hydrocarbon group by a cyano group.

(3) The secondary battery according to (2), wherein
the saturated hydrocarbon group is an alkyl group with carbon number from 1 to 12 both inclusive, and
the unsaturated hydrocarbon group is an aryl group with carbon number from 6 to 18 both inclusive.

(4) The secondary battery according to any one of (1) to (3), wherein
the saturated hydrocarbon group is one of an alkyl group with carbon number from 1 to 12 both inclusive and a cycloalkyl group with carbon number from 3 to 18 both inclusive,
the unsaturated hydrocarbon group is one of an alkenyl group with carbon number from 2 to 12 both inclusive, an alkynyl group with carbon number from 2 to 12 both inclusive, and an aryl group with carbon number from 6 to 18 both inclusive,
the oxygen-containing saturated hydrocarbon group is an alkoxy group with carbon number from 1 to 12 both inclusive, and
the halogenated groups each include, as a halogen group, one or more of a fluorine group, a chlorine group, a bromine group, and an iodine group.

(5) The secondary battery according to any one of (1) to (4), wherein
the compound represented by the Formula (1) is one or more of compounds represented by following Formula (1-1) to Formula (1-25), and
the compound represented by the Formula (2) is one or more of compounds represented by following Formula (2-1) to Formula (2-21).

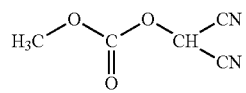
(1-1)

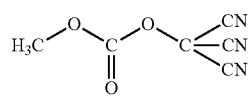
(1-2)

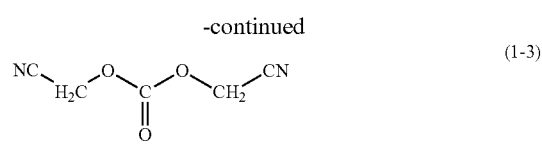
(1-3)

(1-4)

(1-5)

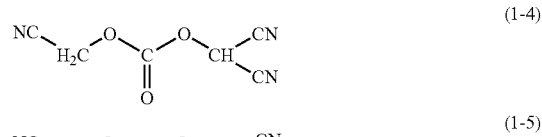
(1-6)

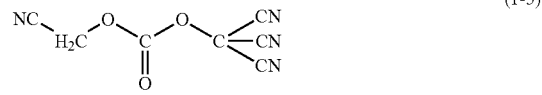
(1-7)

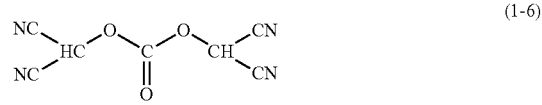
(1-8)

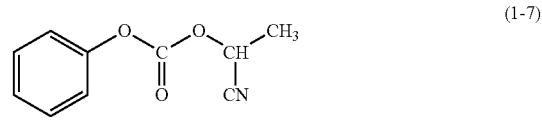
(1-9)

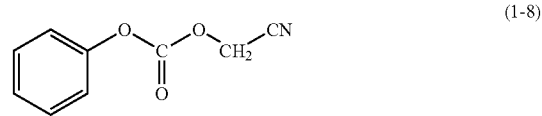
(1-10)

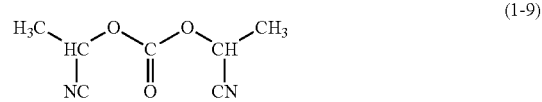
(1-11)

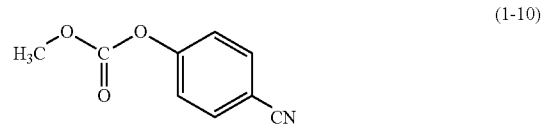
(1-12)

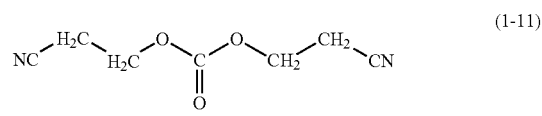
(1-13)

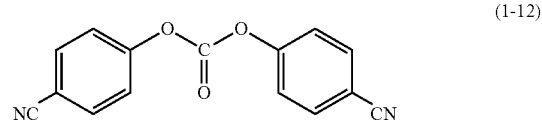
(1-14)

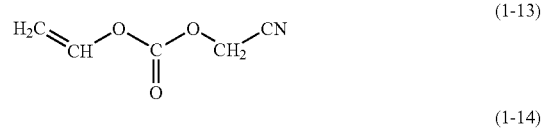
(1-15)

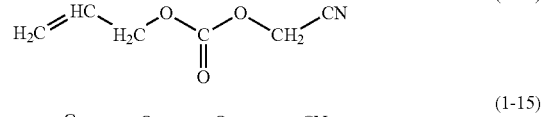
(1-16)

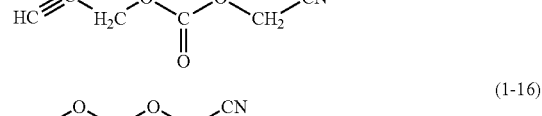
(1-17)

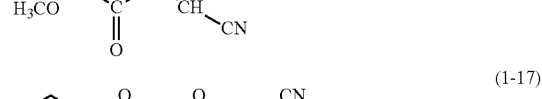

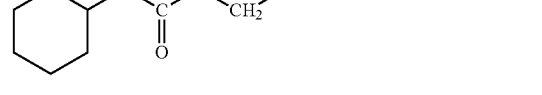

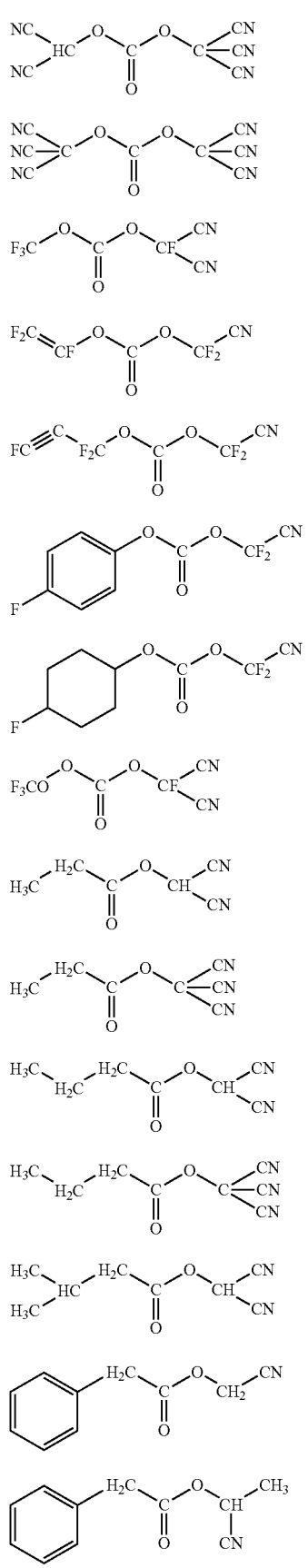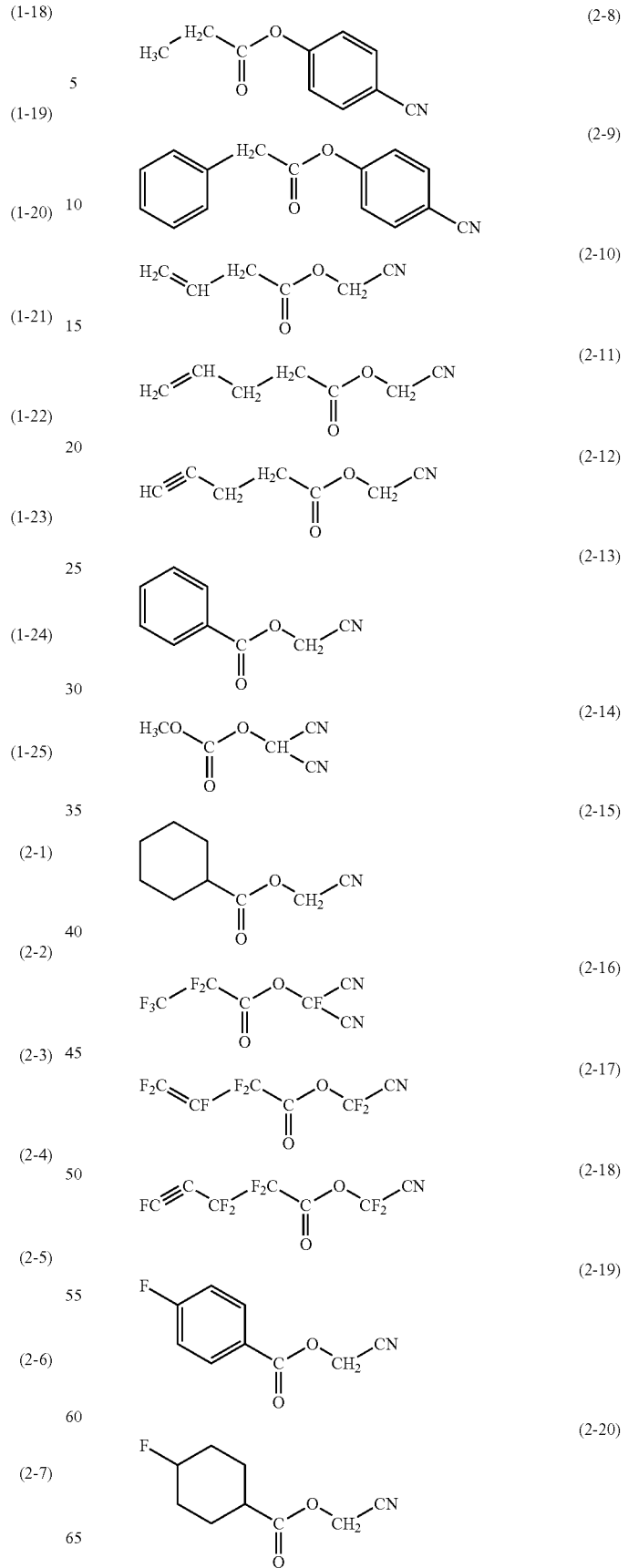

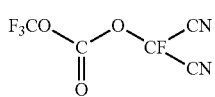
(2-21)

(6) The secondary battery according to any one of (1) to (5), wherein a content of the cyano compound in the electrolytic solution is from about 0.01 weight percent to about 20 weight percent both inclusive.

(7) The secondary battery according to any one of (1) to (6), wherein
the electrolytic solution includes a non-cyano compound, and
the non-cyano compound includes one or more of a compound represented by a following Formula (3), a compound represented by a following Formula (4), a compound represented by a following Formula (5), a compound represented by a following Formula (6), and a compound represented by a following Formula (7),

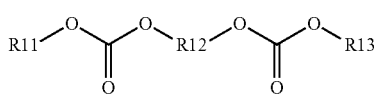
(3)

where R11 and R13 are each one of a monovalent hydrocarbon group, a monovalent oxygen-containing hydrocarbon group, halogenated groups of the foregoing groups, and groups each obtained by bonding two or more of the foregoing groups to one another; and R12 is one of a divalent hydrocarbon group and halogenated groups thereof,

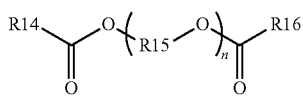
(4)

where R14 and R16 are each one of a monovalent hydrocarbon group, a monovalent oxygen-containing hydrocarbon group, halogenated groups of the foregoing groups, and groups each obtained by bonding two or more of the foregoing groups to one another; R15 is one of a divalent hydrocarbon group and halogenated groups thereof; and n is an integer that is 1 or larger,

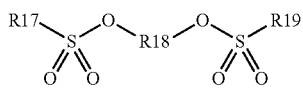
(5)

where R17 and R19 are each one of a monovalent hydrocarbon group, a monovalent oxygen-containing hydrocarbon group, halogenated groups of the foregoing groups, and groups each obtained by bonding two or more of the foregoing groups to one another; and R18 is one of a divalent hydrocarbon group and halogenated groups thereof.

LiPF$_2$O$_2$ (6)

Li$_2$PFO$_3$ (7)

(8) The secondary battery according to (7), wherein
the monovalent hydrocarbon group and the monovalent oxygen-containing hydrocarbon group include an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, a cycloalkyl group with carbon number from 3 to 18 both inclusive, and an alkoxy group with carbon number from 1 to 12 both inclusive,
the divalent hydrocarbon group is one of an alkylene group with carbon number from 1 to 12 both inclusive, an alkenylene group with carbon number from 2 to 12 both inclusive, an alkynylene group with carbon number from 2 to 12 both inclusive, an arylene group with carbon number from 6 to 18 both inclusive, a cycloalkylene group with carbon number from 3 to 18 both inclusive, groups each obtained by bonding two or more of the foregoing groups to one another, and groups each including one or more of the foregoing groups and an ether bond (—O—), and
the halogenated group includes, as a halogen group, one or more of a fluorine group, a chlorine group, a bromine group, and an iodine group.

(9) The secondary battery according to (7) or (8), wherein
the compound represented by the Formula (3) is one or more of compounds represented by following Formula (3-1) to Formula (3-12),
the compound represented by the Formula (4) is one or more of compounds represented by following Formula (4-1) to Formula (4-17), and
the compound represented by the Formula (5) is one or more of compounds represented by following Formula (5-1) to Formula (5-9).

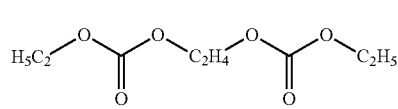
(3-1)

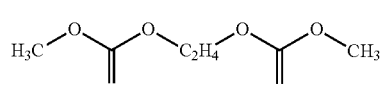
(3-2)

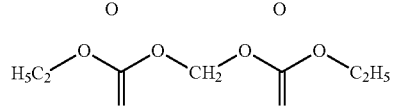
(3-3)

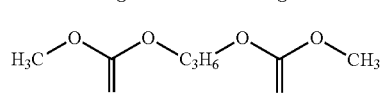
(3-4)

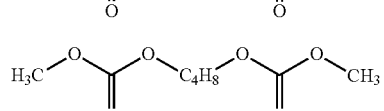
(3-5)

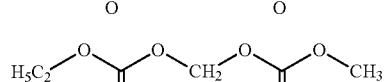
(3-6)

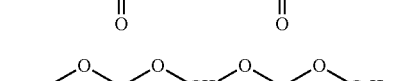
(3-7)

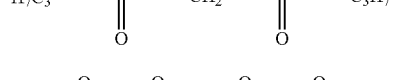
(3-8)

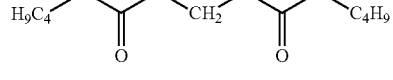
(3-9)

(10) The secondary battery according to any one of (7) to (9), wherein a content of the non-cyano compound in the electrolytic solution is from about 0.001 weight percent to about 2 weight percent both inclusive.

(11) The secondary battery according to any one of (1) to (10), wherein the secondary battery is a lithium secondary battery.

(12) An electrolytic solution including a cyano compound including a compound represented by a following Formula (1), a compound represented by a following Formula (2), or both,

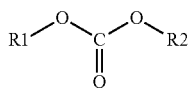

(1)

where R1 and R2 are each one of a saturated hydrocarbon group, an unsaturated hydrocarbon group, an oxygen-containing saturated hydrocarbon group, a cyano-group-containing group, halogenated groups of the foregoing groups, and groups each obtained by bonding two or more of the foregoing groups to one another, and the R1, the R2, or both include the cyano-group-containing group; a cyano group in the cyano-group-containing group is bonded to an oxygen atom (O) at a terminal of a —O—C(=O)—O— bond with one or more carbon atoms (C) in between; (A) when one of the R1 and the R2 does not include the cyano-group-containing group but includes an unsaturated carbon bond and the other of the R1 and the R2 includes the cyano-group-containing group, number of the cyano group in the other of the R1 and the R2 is one or larger; (B) when one of the R1 and the R2 include neither the cyano-group-containing group nor the unsaturated carbon bond and the other of the R1 and the R2 includes the cyano-group-containing group and the unsaturated carbon bond, the number of the cyano group in the other of the R1 and the R2 is one or larger; and (C) when one of the R1 and the R2 include neither the cyano-group-containing group nor the unsaturated carbon bond and the other of the R1 and the R2 includes the cyano-group-containing group but does not include the unsaturated carbon bond, the number of the cyano group in the other of the R1 and the R2 is two or larger,

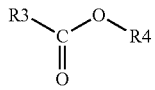

(2)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another; R4 is one of a cyano-group-containing group, halogenated groups thereof, and groups each obtained by bonding two or more of the foregoing groups to one another; a cyano group in the cyano-group-containing group is bonded to an oxygen atom at a terminal of a —C(=O)—O— bond with one or more carbon atoms in between; (D) when the R3 includes an unsaturated carbon bond, number of the cyano group in the R4 is one or larger; (E) when the R3 does not include the unsaturated carbon bond and the R4 includes the unsaturated carbon bond, the number of the cyano group in the R4 is one or larger; and (F) when the R3 does not include the unsaturated carbon bond and the R4 does not include the unsaturated carbon bond, the number of the cyano group in the R4 is two or larger.

(13) A battery pack including:
the secondary battery according to any one of (1) to (11);
a control section controlling a used state of the secondary battery; and
a switch section switching the used state of the secondary battery according to an instruction of the control section.

(14) An electric vehicle including:
the secondary battery according to any one of (1) to (11);
a conversion section converting electric power supplied from the secondary battery into drive power;
a drive section operating according to the drive power; and a control section controlling a used state of the secondary battery.

(15) An electric power storage system including:
the secondary battery according to any one of (1) to (11);
one or more electric devices supplied with electric power from the secondary battery; and
a control section controlling the supplying of the electric power from the secondary battery to the one or more electric devices.

(16) An electric power tool including:
the secondary battery according to any one of (1) to (11); and
a movable section supplied with electric power from the secondary battery.

(17) An electronic apparatus including
the secondary battery according to any one of (1) to (11) as an electric power supply source.

2. Second Embodiment/Secondary Battery (Cyano Compound: The Number of Cyano Compound is not Limited+Metal-Based Material)

(1) A secondary battery including:
a cathode;
an anode including a metal-based material that includes silicon (Si), tin (Sn), or both as constituent elements; and
an electrolytic solution including a cyano compound, the cyano compound including a compound represented by a following Formula (19), a compound represented by a following Formula (20), or both,

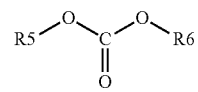

(19)

where R5 and R6 are each one of a hydrocarbon group, an oxygen-containing hydrocarbon group, a cyano-group-containing group, halogenated groups of the foregoing groups, and groups each obtained by bonding two or more of the foregoing groups to one another, and the R5, the R6, or both include the cyano-group-containing group; a cyano group in the cyano-group-containing group in the R5, the R6, or both is bonded to an oxygen atom (O) at a terminal of a —O—C(=O)—O— bond with one or more carbon atoms (C) in between,

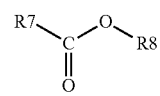

(20)

where R7 is one of a hydrocarbon group, an oxygen-containing hydrocarbon group, a cyano-group-containing group, halogenated groups of the foregoing groups, and groups each obtained by bonding two or more of the foregoing groups to one another; R8 is one of a cyano-group-containing group, halogenated groups thereof, and groups each obtained by bonding two or more of the foregoing groups to one another; a cyano group in the cyano-group-containing group in R8 is bonded to an oxygen atom at a terminal of a —C(=O)—O— bond with one or more carbon atoms in between.

(2) The secondary battery according to (1), wherein the cyano-group-containing group is a group obtained by substituting each of part or all of hydrogen groups in a hydrocarbon group by a cyano group.

(3) The secondary battery according to (2), wherein the hydrocarbon group is one of an alkyl group with carbon number from 1 to 12 both inclusive and an aryl group with carbon number from 6 to 18 both inclusive.

(4) The secondary battery according to any one of (1) to (3), wherein the hydrocarbon group is one of an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and a cycloalkyl group with carbon number from 3 to 18 both inclusive, the oxygen-containing saturated hydrocarbon group is an alkoxy group with carbon number from 1 to 12 both inclusive, and the halogenated groups each include, as a halogen group, one or more of a fluorine group, a chlorine group, a bromine group, and an iodine group.

(5) The secondary battery according to any one of (1) to (4), wherein the compound represented by the Formula (19) is one or more of compounds represented by following Formula (19-1) to Formula (19-31), and the compound represented by the Formula (20) is one or more of compounds represented by following Formula (20-1) to Formula (20-28).

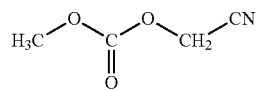
(19-1)

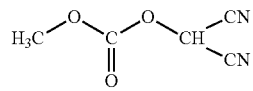
(19-2)

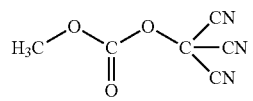
(19-3)

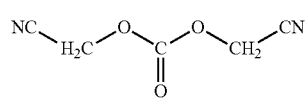
(19-4)

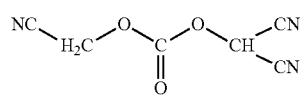
(19-5)

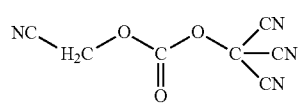
(19-6)

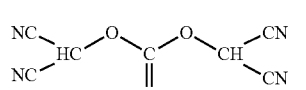
(19-7)

-continued

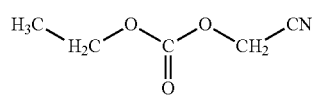
(19-8)

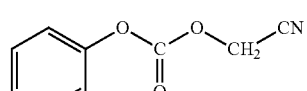
(19-9)

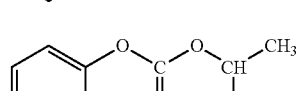
(19-10)

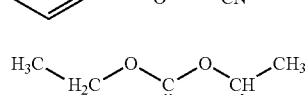
(19-11)

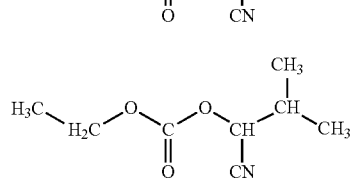
(19-12)

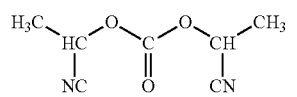
(19-13)

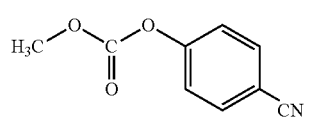
(19-14)

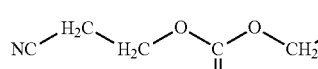
(19-15)

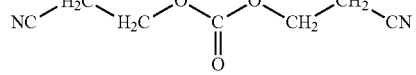
(19-16)

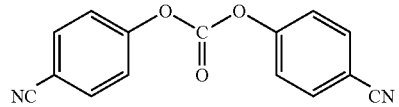
(19-17)

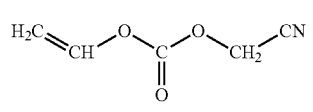
(19-18)

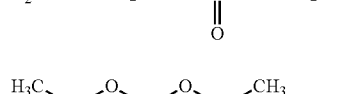
(19-19)

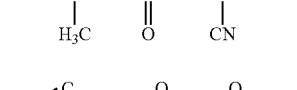
(19-20)

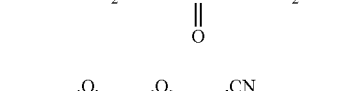
(19-21)

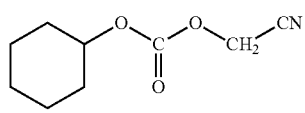 (19-22)
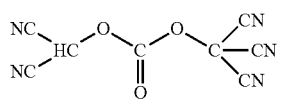 (19-23)
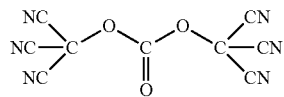 (19-24)
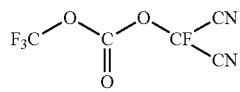 (19-25)
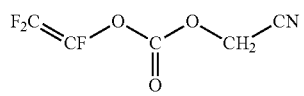 (19-26)
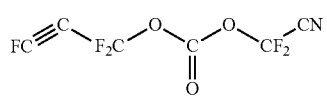 (19-27)
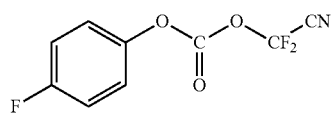 (19-28)
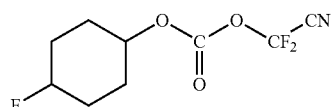 (19-29)
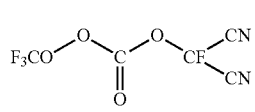 (19-30)
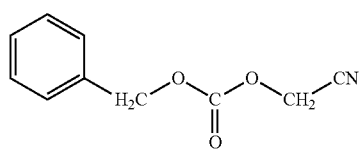 (19-31)
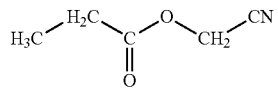 (20-1)
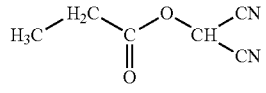 (20-2)
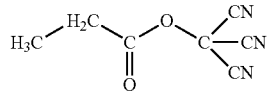 (20-3)
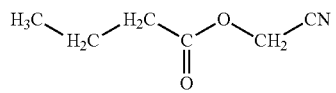 (20-4)
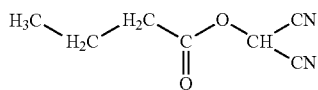 (20-5)
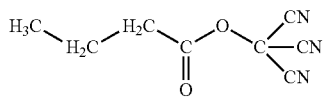 (20-6)
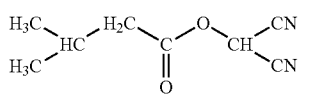 (20-7)
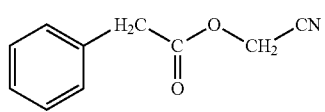 (20-8)
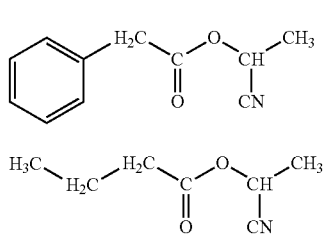 (20-9)
(20-10)
(20-11)
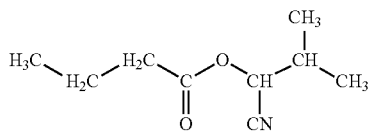 (20-12)
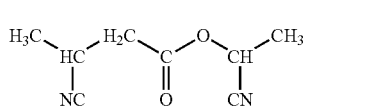 (20-13)
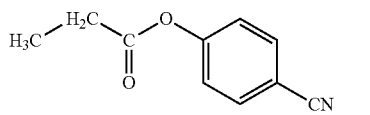 (20-14)
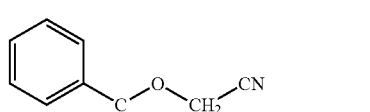 (20-15)
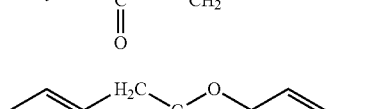 (20-16)
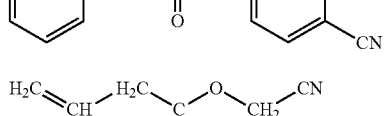 (20-17)
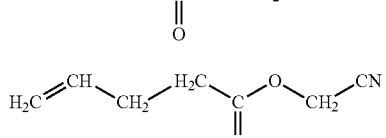 (20-18)
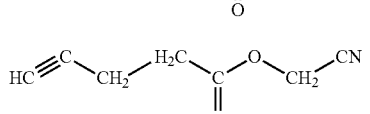
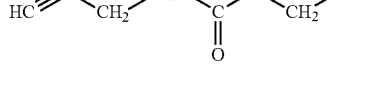

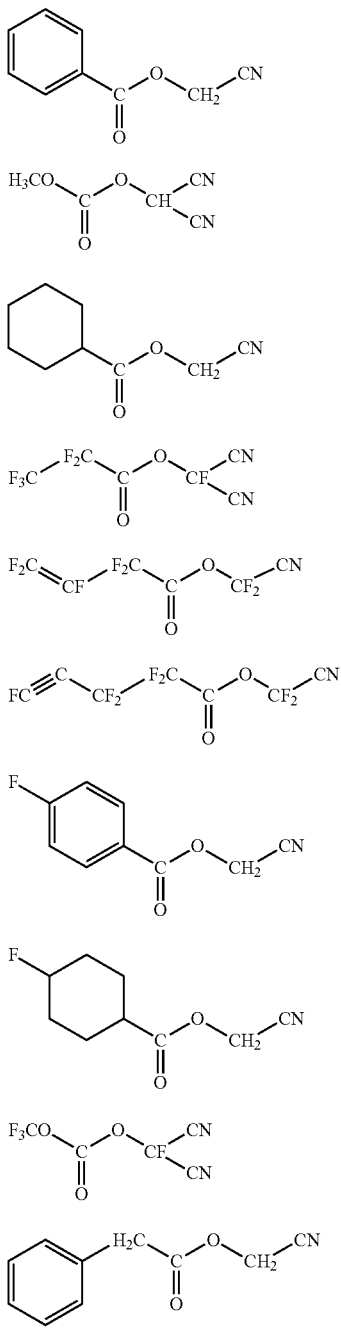

(20-19)
(20-20)
(20-21)
(20-22)
(20-23)
(20-24)
(20-25)
(20-26)
(20-27)
(20-28)

(6) The secondary battery according to any one of (1) to (5), wherein a content of the cyano compound in the electrolytic solution is from about 0.01 weight percent to about 20 weight percent both inclusive.

(7) The secondary battery according to any one of (1) to (6), wherein the metal-based material is one or more of a simple substance, an alloy, and a compound of Si, and a simple substance, an alloy, and a compound of Sn.

(8) The secondary battery according to any one of (1) to (7), wherein the secondary battery is a lithium secondary battery.

(9) A battery pack including:
the secondary battery according to any one of (1) to (8);
a control section controlling a used state of the secondary battery; and
a switch section switching the used state of the secondary battery according to an instruction of the control section.

(10) An electric vehicle including:
the secondary battery according to any one of (1) to (8);
a conversion section converting electric power supplied from the secondary battery into drive power;
a drive section operating according to the drive power; and
a control section controlling a used state of the secondary battery.

(11) An electric power storage system including:
the secondary battery according to any one of (1) to (8);
one or more electric devices supplied with electric power from the secondary battery; and
a control section controlling the supplying of the electric power from the secondary battery to the one or more electric devices.

(12) An electric power tool including:
the secondary battery according to any one of (1) to (8); and
a movable section supplied with electric power from the secondary battery.

(13) An electronic apparatus including
the secondary battery according to any one of (1) to (8) as an electric power supply source.

3. Third Embodiment/Secondary Battery (Cyano Compound: The Number of Cyano Compound is not Limited+Non-Cyano Compound)

(1) A secondary battery including:
a cathode;
an anode; and
an electrolytic solution including a cyano compound and a non-cyano compound, the cyano compound including a compound represented by a following Formula (19), a compound represented by a following Formula (20), or both, and the non-cyano compound including one of a compound represented by a following Formula (3), a compound represented by a following Formula (4), a compound represented by a following Formula (5), a compound represented by a following Formula (6), and a compound represented by a following Formula (7)

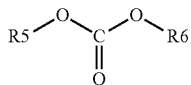

(19)

where R5 and R6 are each one of a hydrocarbon group, an oxygen-containing hydrocarbon group, a cyano-group-containing group, halogenated groups of the foregoing groups, and groups each obtained by bonding two or more of the foregoing groups to one another, and the R5, the R6, or both include the cyano-group-containing group; a cyano group in the cyano-group-containing group in the R5, the R6, or both is bonded to an oxygen atom (O) at a terminal of a —O—C(=O)—O— bond with one or more carbon atoms (C) in between,

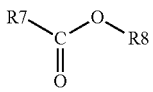 (20)

where R7 is one of a hydrocarbon group, an oxygen-containing hydrocarbon group, a cyano-group-containing group, halogenated groups of the foregoing groups, and groups each obtained by bonding two or more of the foregoing groups to one another; R8 is one of a cyano-group-containing group, halogenated groups thereof, and groups each obtained by bonding two or more of the foregoing groups to one another; a cyano group in the cyano-group-containing group in R8 is bonded to an oxygen atom at a terminal of a —C(=O)—O— bond with one or more carbon atoms in between,

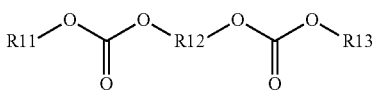 (3)

where R11 and R13 are each one of a monovalent hydrocarbon group, a monovalent oxygen-containing hydrocarbon group, halogenated groups of the foregoing groups, and groups each obtained by bonding two or more of the foregoing groups to one another; and R12 is one of a divalent hydrocarbon group and halogenated groups thereof,

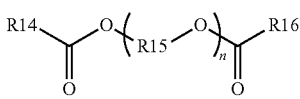 (4)

where R14 and R16 are each one of a monovalent hydrocarbon group, a monovalent oxygen-containing hydrocarbon group, halogenated groups of the foregoing groups, and groups each obtained by bonding two or more of the foregoing groups to one another; R15 is one of a divalent hydrocarbon group and halogenated groups thereof; and n is an integer that is 1 or larger,

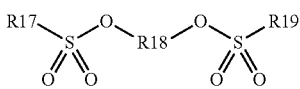 (5)

where R17 and R19 are each one of a monovalent hydrocarbon group, a monovalent oxygen-containing hydrocarbon group, halogenated groups of the foregoing groups, and groups each obtained by bonding two or more of the foregoing groups to one another; and R18 is one of a divalent hydrocarbon group and halogenated groups thereof.

LiPF$_2$O$_2$ (6)

Li$_2$PFO$_3$ (7)

(2) The secondary battery according to (1), wherein the cyano-group-containing group is a group obtained by substituting each of part or all of hydrogen groups in a hydrocarbon group by a cyano group.

(3) The secondary battery according to (2), wherein the hydrocarbon group is one of an alkyl group with carbon number from 1 to 12 both inclusive and an aryl group with carbon number from 6 to 18 both inclusive.

(4) The secondary battery according to any one of (1) to (3), wherein
in the Formula (19) and the Formula (20),
the hydrocarbon group is one of an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and a cycloalkyl group with carbon number from 3 to 18 both inclusive,
the oxygen-containing hydrocarbon group is an alkoxy group with carbon number from 1 to 12 both inclusive, and
the halogenated groups each include, as a halogen group, one or more of a fluorine group, a chlorine group, a bromine group, and an iodine group.

(5) The secondary battery according to any one of (1) to (4), wherein
in the Formula (3) to the Formula (5),
the monovalent hydrocarbon group is one of an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and a cycloalkyl group with carbon number from 3 to 18 both inclusive,
the monovalent oxygen-containing hydrocarbon group is an alkoxy group with carbon number from 1 to 12 both inclusive,
the divalent hydrocarbon group is one of an alkylene group with carbon number from 1 to 12 both inclusive, an alkenylene group with carbon number from 2 to 12 both inclusive, an alkynylene group with carbon number from 2 to 12 both inclusive, an arylene group with carbon number from 6 to 18 both inclusive, and a cycloalkylene group with carbon number from 3 to 18 both inclusive, and
the divalent oxygen-containing hydrocarbon group is a group that includes one or more ether bonds (—O—) and includes one or more of an alkylene group with carbon number from 1 to 12 both inclusive, an alkenylene group with carbon number from 2 to 12 both inclusive, an alkynylene with carbon number from 2 to 12 both inclusive, an arylene group with carbon number from 6 to 18 both inclusive, and a cycloclkylene group with carbon number from 3 to 18 both inclusive.

(6) The secondary battery according to any one of (1) to (5), wherein
the compound represented by the Formula (19) is one or more of compounds represented by following Formula (19-1) to Formula (19-31), and
the compound represented by the Formula (20) is one or more of compounds represented by following Formula (20-1) to Formula (20-28).

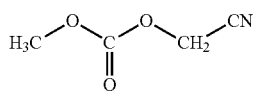 (19-1)

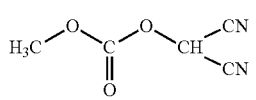 (19-2)

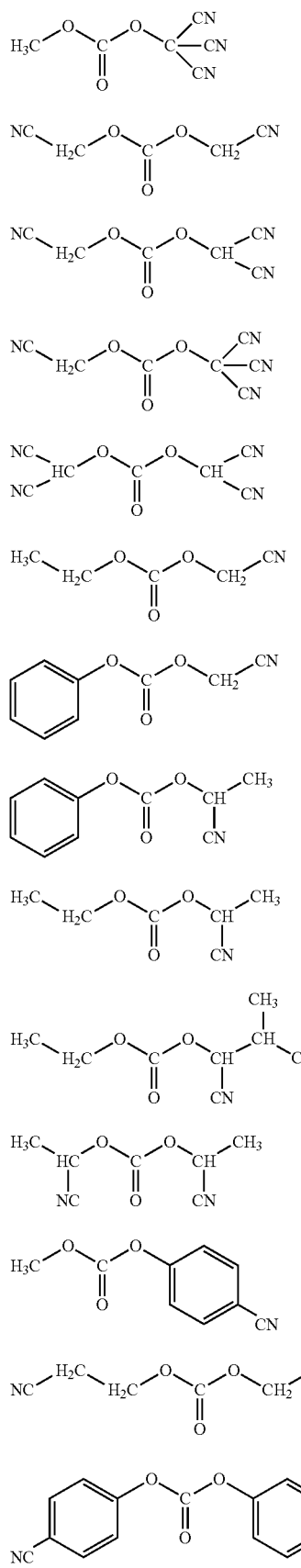
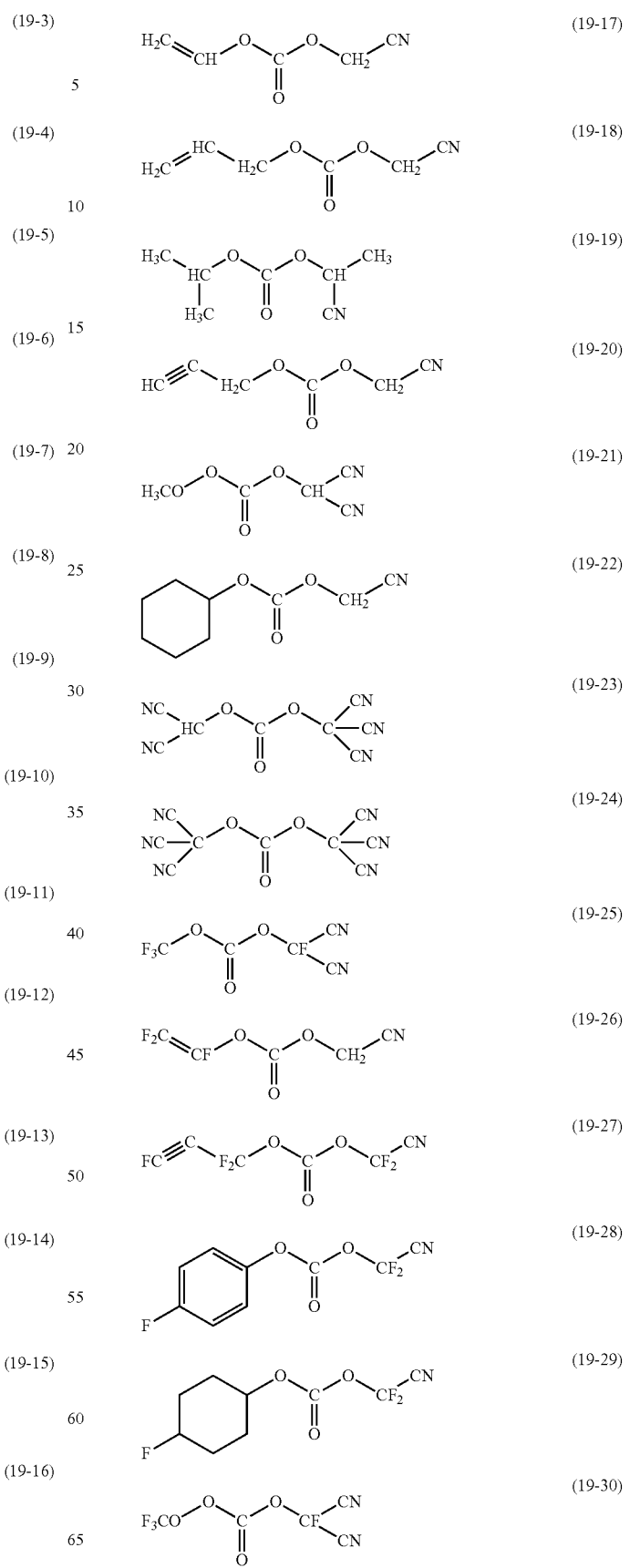

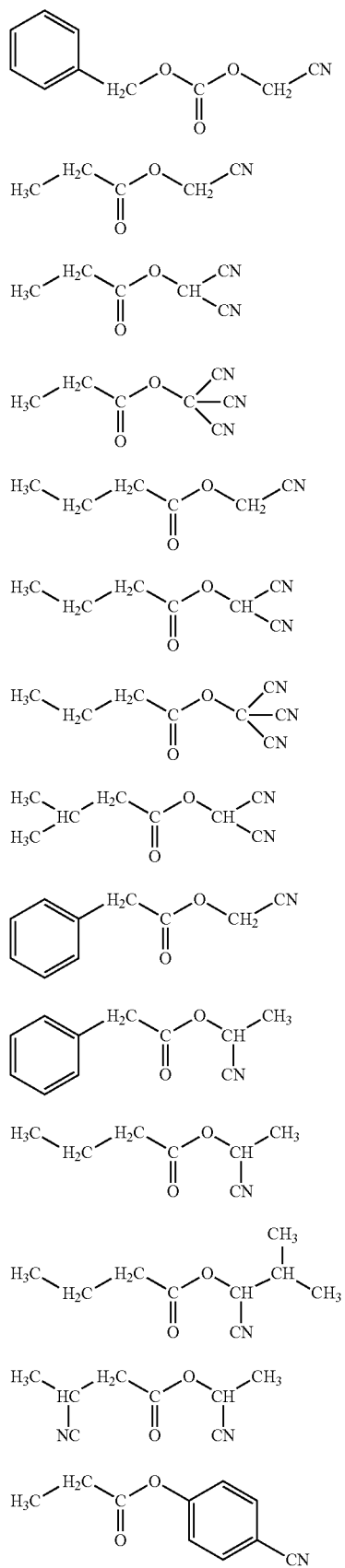
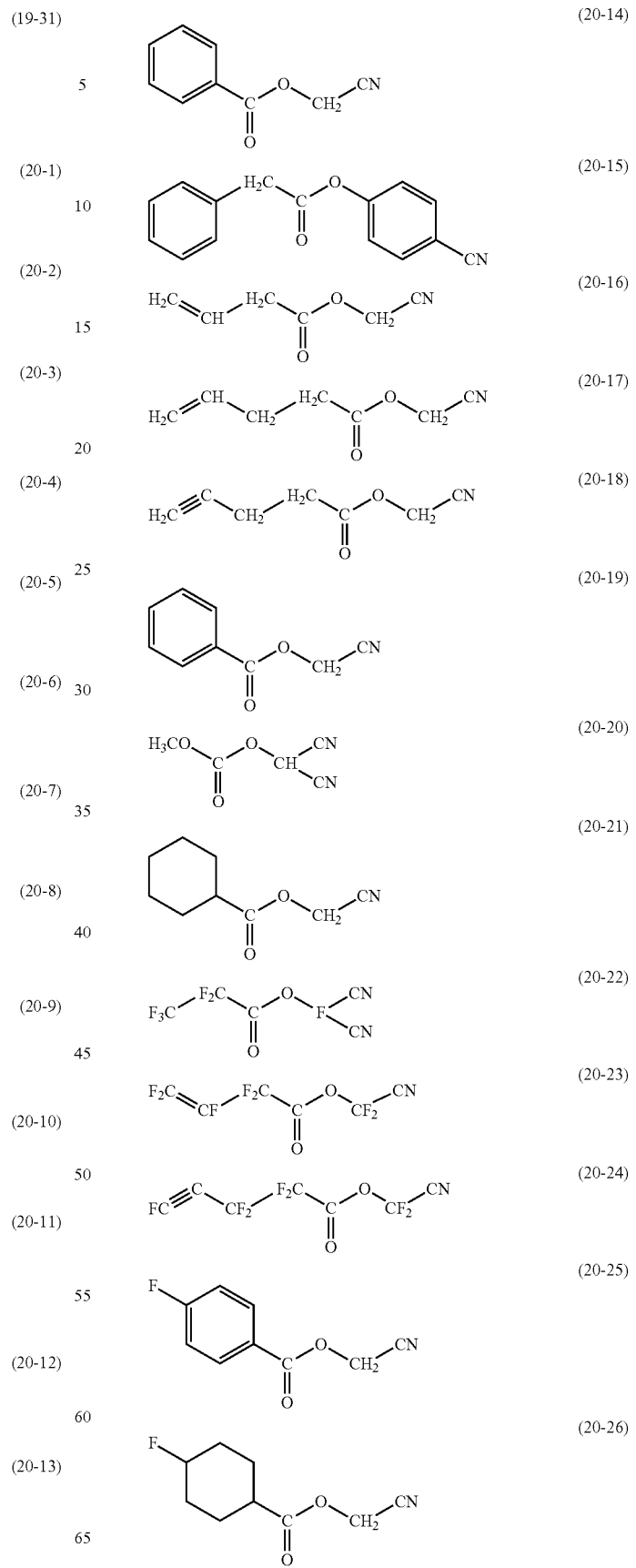

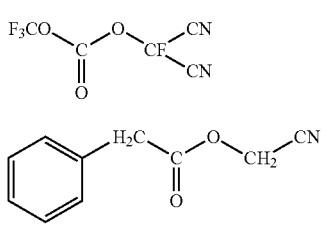
(20-27)

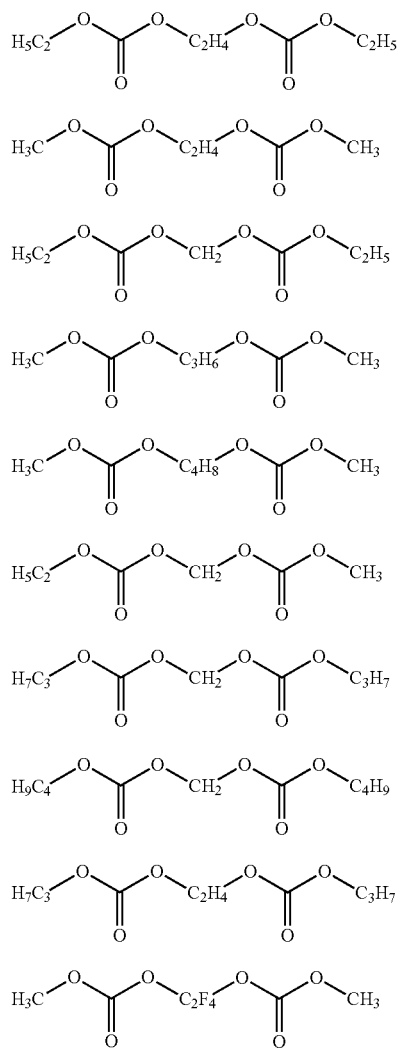

(7) The secondary battery according to any one of (1) to (6), wherein the compound represented by the Formula (3) is one or more of compounds represented by following Formula (3-1) to Formula (3-12), the compound represented by the Formula (4) is one or more of compounds represented by following Formula (4-1) to Formula (4-17), and the compound represented by the Formula (5) is one or more of compounds represented by following Formula (5-1) to Formula (5-9).

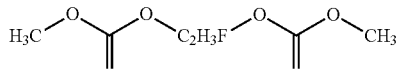 (3-11)

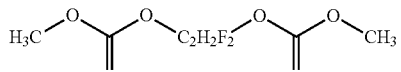 (3-12)

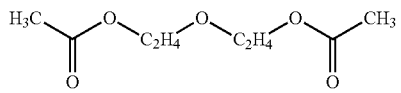 (4-1)

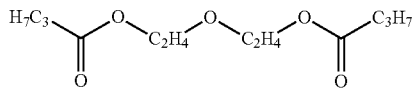 (4-2)

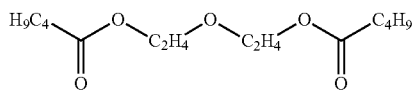 (4-3)

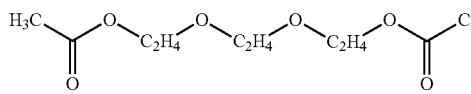 (4-4)

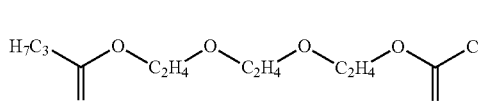 (4-5)

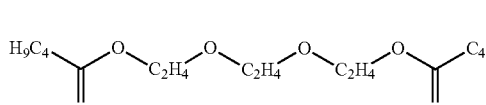 (4-6)

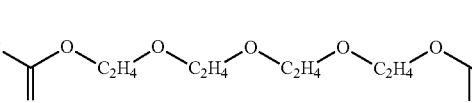 (4-7)

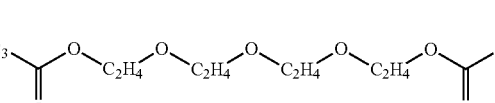 (4-8)

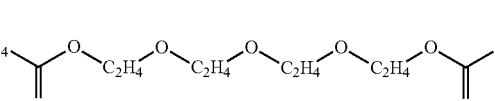 (4-9)

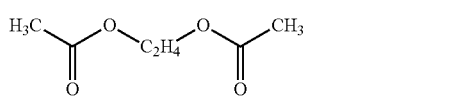 (4-10)

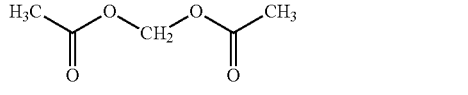 (4-11)

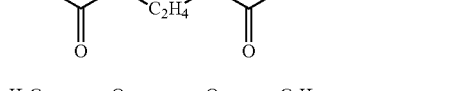 (4-12)

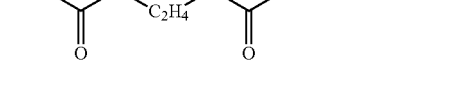 (4-13)

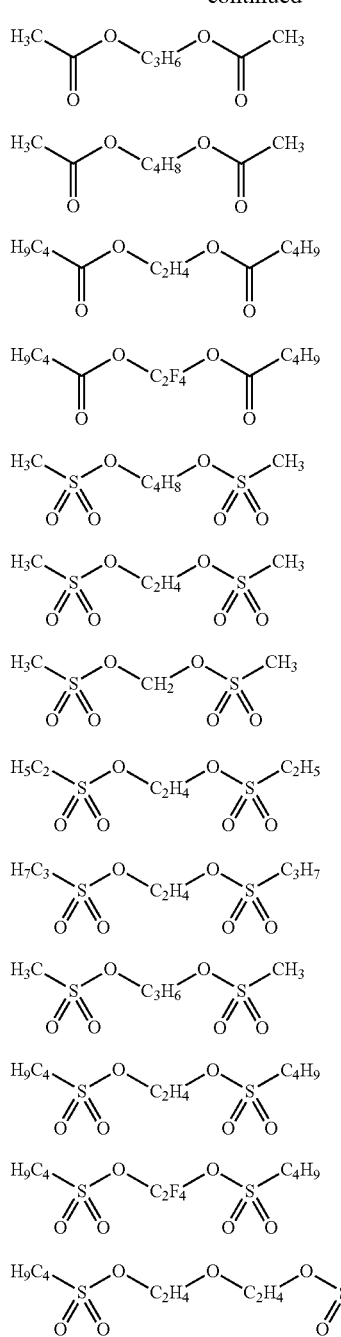

(4-14)
(4-15)
(4-16)
(4-17)
(5-1)
(5-2)
(5-3)
(5-4)
(5-5)
(5-6)
(5-7)
(5-8)
(5-9)

(8) The secondary battery according to any one of (1) to (7), wherein a content of the cyano compound in the electrolytic solution is from about 0.01 weight percent to about 20 weight percent both inclusive.

(9) The secondary battery according to any one of (1) to (8), wherein a content of the non-cyano compound in the electrolytic solution is from about 0.001 weight percent to about 2 weight percent both inclusive.

(10) The secondary battery according to any one of (1) to (9), wherein the secondary battery is a lithium secondary battery.

(11) An electrolytic solution including
a cyano compound including a compound represented by a following Formula (19), a compound represented by a following Formula (20), or both, and
a non-cyano compound including one of a compound represented by a following Formula (3), a compound represented by a following Formula (4), a compound represented by a following Formula (5), a compound represented by a following Formula (6), and a compound represented by a following Formula (7)

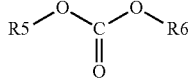

(19)

where R5 and R6 are each one of a hydrocarbon group, an oxygen-containing hydrocarbon group, a cyano-group-containing group, halogenated groups of the foregoing groups, and groups each obtained by bonding two or more of the foregoing groups to one another, and the R5, the R6, or both include the cyano-group-containing group; a cyano group in the cyano-group-containing group in the R5, the R6, or both is bonded to an oxygen atom (O) at a terminal of a —O—C(=O)—O— bond with one or more carbon atoms (C) in between,

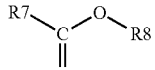

(20)

where R7 is one of a hydrocarbon group, an oxygen-containing hydrocarbon group, a cyano-group-containing group, halogenated groups of the foregoing groups, and groups each obtained by bonding two or more of the foregoing groups to one another; R8 is one of a cyano-group-containing group, halogenated groups thereof, and groups each obtained by bonding two or more of the foregoing groups to one another; a cyano group in the cyano-group-containing group in R8 is bonded to an oxygen atom at a terminal of a —C(=O)—O— bond with one or more carbon atoms in between,

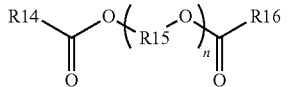

(3)

where R11 and R13 are each one of a monovalent hydrocarbon group, a monovalent oxygen-containing hydrocarbon group, halogenated groups of the foregoing groups, and groups each obtained by bonding two or more of the foregoing groups to one another; and R12 is one of a divalent hydrocarbon group and halogenated groups thereof, (4)

where R14 and R16 are each one of a monovalent hydrocarbon group, a monovalent oxygen-containing hydrocarbon group, halogenated groups of the foregoing groups, and groups each obtained by bonding two or more of the foregoing groups to one another; R15 is one of a divalent hydrocarbon group and halogenated groups thereof; and n is an integer that is 1 or larger,

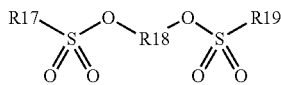
(5)

where R17 and R19 are each one of a monovalent hydrocarbon group, a monovalent oxygen-containing hydrocarbon group, halogenated groups of the foregoing groups, and groups each obtained by bonding two or more of the foregoing groups to one another; and R18 is one of a divalent hydrocarbon group and halogenated groups thereof.

 (6)

 (7)

(12) A battery pack including:
the secondary battery according to any one of (1) to (10);
a control section controlling a used state of the secondary battery; and
a switch section switching the used state of the secondary battery according to an instruction of the control section.

(13) An electric vehicle including:
the secondary battery according to any one of (1) to (10);
a conversion section converting electric power supplied from the secondary battery into drive power;
a drive section operating according to the drive power; and
a control section controlling a used state of the secondary battery.

(14) An electric power storage system including:
the secondary battery according to any one of (1) to (10);
one or more electric devices supplied with electric power from the secondary battery; and
a control section controlling the supplying of the electric power from the secondary battery to the one or more electric devices.

(15) An electric power tool including:
the secondary battery according to any one of (1) to (10); and
a movable section supplied with electric power from the secondary battery.

(16) An electronic apparatus including
the secondary battery according to any one of (1) to (10) as an electric power supply source.

It should be understood by those skilled in the art that various modifications, combinations, sub-combinations, and alterations may occur depending on design requirements and other factors insofar as they are within the scope of the appended claims or the equivalents thereof.

What is claimed is:
1. A secondary battery, comprising:
a cathode;
an anode; and
an electrolytic solution including a cyano compound,
wherein the cyano compound includes a compound represented by a following Formula (1),

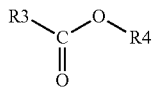
(1)

where R3 is one of a saturated hydrocarbon group, an unsaturated hydrocarbon group, an oxygen-containing saturated hydrocarbon group, first halogenated groups of the foregoing groups, and groups each obtained by bonding two or more of the foregoing groups to one another, R4 is one of a cyano-group-containing group, second halogenated groups thereof, and groups each obtained by bonding two or more of the foregoing groups to one another, a cyano group in the cyano-group-containing group is bonded to an oxygen atom at a terminal of a —C(=O)—O— bond with one or more carbon atoms in between, when the R3 includes an unsaturated carbon bond, number of the cyano group in the R4 is one or larger than one, when the R3 does not include the unsaturated carbon bond and the R4 includes the unsaturated carbon bond, the number of the cyano group in the R4 is one or larger than one, when the R3 does not include the unsaturated carbon bond and the R4 does not include the unsaturated carbon bond, the number of the cyano group in the R4 is two or larger than two, and the compound represented by the Formula (1) is one or more of compounds represented by following Formula (1-1) to Formula (1-17)

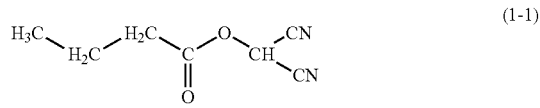 (1-1)

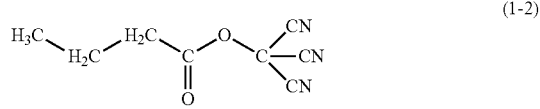 (1-2)

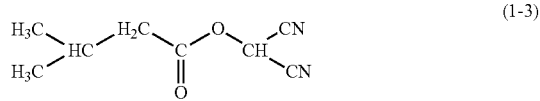 (1-3)

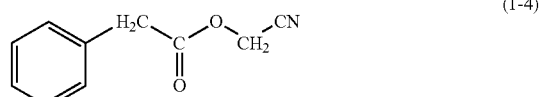 (1-4)

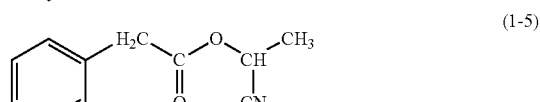 (1-5)

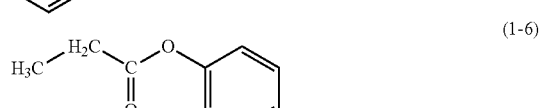 (1-6)

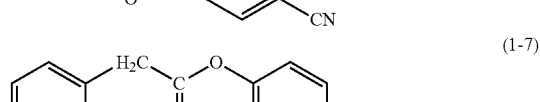 (1-7)

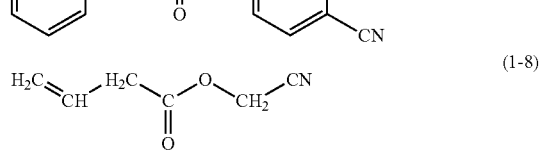 (1-8)

-continued

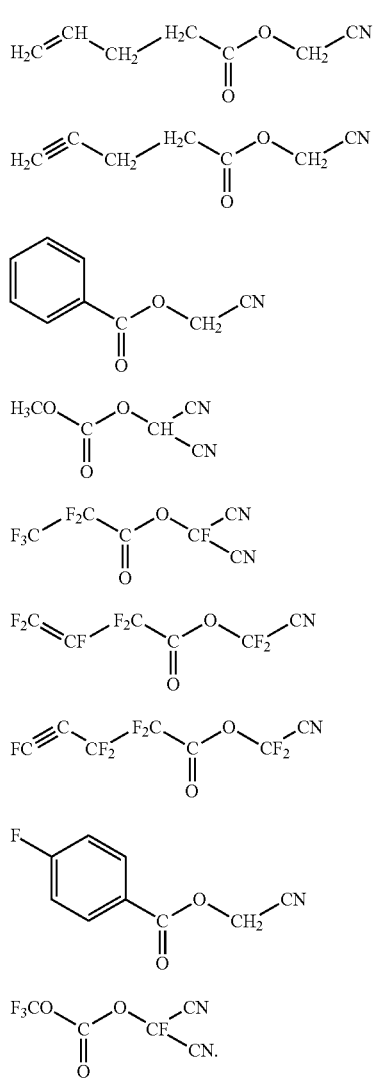

2. The secondary battery according to claim 1, wherein the cyano-group-containing group is one of a group obtained by substituting each of a part or all of hydrogen groups in a saturated hydrocarbon group by a cyano group and a group obtained by substituting each of a part or all of hydrogen groups in an unsaturated hydrocarbon group by a cyano group.

3. The secondary battery according to claim 2, wherein
the saturated hydrocarbon group is an alkyl group with carbon number from 1 to 12 both inclusive, and
the unsaturated hydrocarbon group is an aryl group with carbon number from 6 to 18 both inclusive.

4. The secondary battery according to claim 1, wherein
the saturated hydrocarbon group is one of an alkyl group with carbon number from 1 to 12 both inclusive and a cycloalkyl group with carbon number from 3 to 18 both inclusive,
the unsaturated hydrocarbon group is one of an alkenyl group with carbon number from 2 to 12 both inclusive, an alkynyl group with carbon number from 2 to 12 both inclusive, and an aryl group with carbon number from 6 to 18 both inclusive,
the oxygen-containing saturated hydrocarbon group is an alkoxy group with carbon number from 1 to 12 both inclusive, and the first halogenated groups each include, as a halogen group, one or more of a fluorine group, a chlorine group, a bromine group, and an iodine group.

5. The secondary battery according to claim 1, wherein a content of the cyano compound in the electrolytic solution is from about 0.01 weight percent to about 20 weight percent both inclusive.

6. The secondary battery according to claim 1, wherein
the electrolytic solution includes a non-cyano compound, and
the non-cyano compound includes one or more of a compound represented by a following Formula (2), a compound represented by a following Formula (3), a compound represented by a following Formula (4), a compound represented by a following Formula (5), and a compound represented by a following Formula (6),

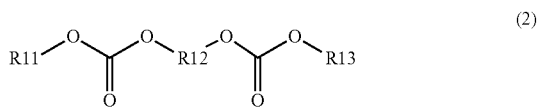

(2)

where each of R11 and R13 is one of a monovalent hydrocarbon group, a monovalent oxygen-containing hydrocarbon group, third halogenated groups of the foregoing groups, and groups each obtained by bonding two or more of the foregoing groups to one another, and R12 is one of a divalent hydrocarbon group and fourth halogenated groups thereof,

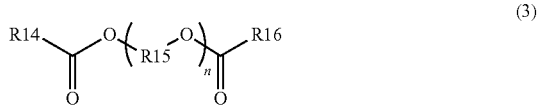

(3)

where each of R14 and R16 is one of a monovalent hydrocarbon group, a monovalent oxygen-containing hydrocarbon group, fifth halogenated groups of the foregoing groups, and groups each obtained by bonding two or more of the foregoing groups to one another, R15 is one of a divalent hydrocarbon group and sixth halogenated groups thereof, and n is an integer that is 1 or larger than 1, and

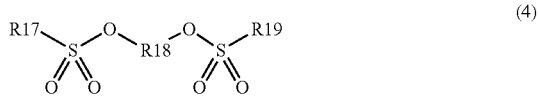

(4)

where each of R17 and R19 is one of a monovalent hydrocarbon group, a monovalent oxygen-containing hydrocarbon group, seventh halogenated groups of the foregoing groups, and groups each obtained by bonding two or more of the foregoing groups to one another, and R18 is one of a divalent hydrocarbon group and eighth halogenated groups thereof.

$LiPF_2O_2$                          (5)

$Li_2PFO_3$                          (6)

7. The secondary battery according to claim 6, wherein
the monovalent hydrocarbon group and the monovalent oxygen-containing hydrocarbon group encompass an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, a cycloalkyl group with carbon number from 3 to 18 both inclusive, and an alkoxy group with carbon number from 1 to 12 both inclusive, the divalent hydrocarbon group is one of an alkylene group with carbon number from 1 to 12 both inclusive, an alkenylene group with carbon number from 2 to 12 both inclusive, an alkynylene group with carbon number from 2 to 12 both inclusive, an arylene group with carbon number from 6 to 18 both inclusive, a cycloalkylene group with carbon number from 3 to 18 both inclusive, groups each obtained by bonding two or more of the foregoing groups to one another, and groups each including one or more of the foregoing groups and an ether bond (—O—), and the third halogenated groups includes, as a halogen group, one or more of a fluorine group, a chlorine group, a bromine group, and an iodine group.

8. The secondary battery according to claim 6, wherein
the compound represented by the Formula (2) is one or more of compounds represented by following Formula (2-1) to Formula (2-12),
the compound represented by the Formula (3) is one or more of compounds represented by following Formula (3-1) to Formula (3-17), and
the compound represented by the Formula (4) is one or more of compounds represented by following Formula (4-1) to Formula (4-9).

-continued

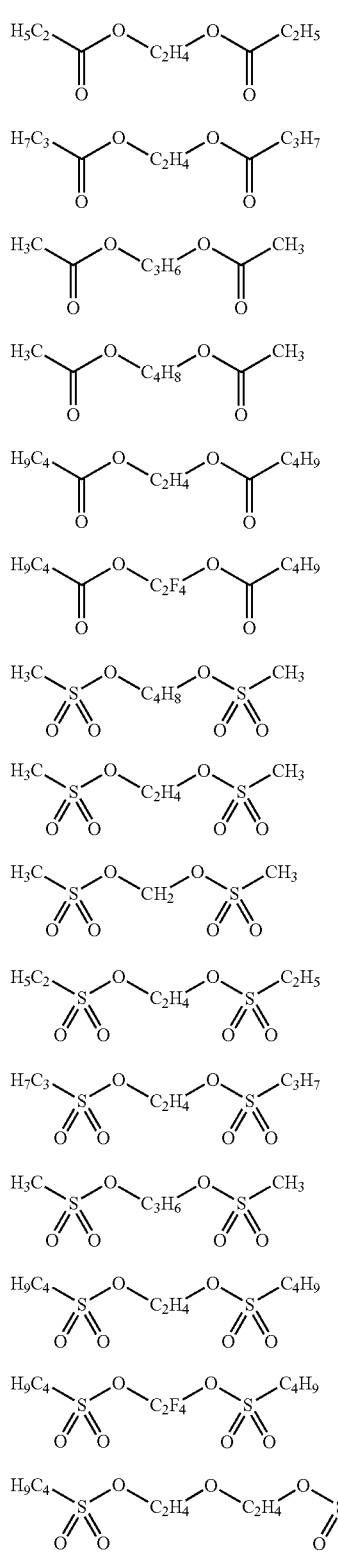

(3-12)
(3-13)
(3-14)
(3-15)
(3-16)
(3-17)
(4-1)
(4-2)
(4-3)
(4-4)
(4-5)
(4-6)
(4-7)
(4-8)
(4-9)

9. The secondary battery according to claim 6, wherein a content of the non-cyano compound in the electrolytic solution is from about 0.001 weight percent to about 2 weight percent both inclusive.

10. The secondary battery according to claim 1, wherein the secondary battery is a lithium secondary battery.

11. An electrolytic solution, comprising:
a cyano compound including a compound represented by a following Formula (1),

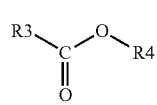

(1)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another, R4 is one of a cyano-group-containing group, halogenated groups thereof, and groups each obtained by bonding two or more of the foregoing groups to one another, a cyano group in the cyano-group-containing group is bonded to an oxygen atom at a terminal of a —C(=O)—O— bond with one or more carbon atoms in between, when the R3 includes an unsaturated carbon bond, number of the cyano group in the R4 is one or larger than one, when the R3 does not include the unsaturated carbon bond and the R4 includes the unsaturated carbon bond, the number of the cyano group in the R4 is one or larger than one, when the R3 does not include the unsaturated carbon bond and the R4 does not include the unsaturated carbon bond, the number of the cyano group in the R4 is two or larger than two, and the compound represented by the Formula (1) is one or more of compounds represented by following Formula (1-1) to Formula (1-17)

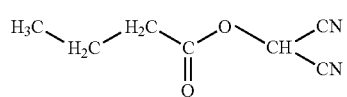

(1-1)

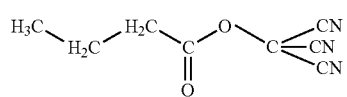

(1-2)

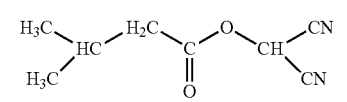

(1-3)

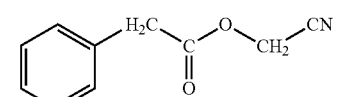

(1-4)

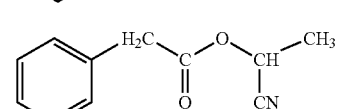

(1-5)

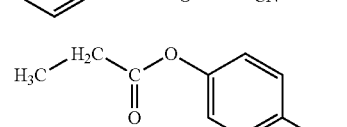

(1-6)

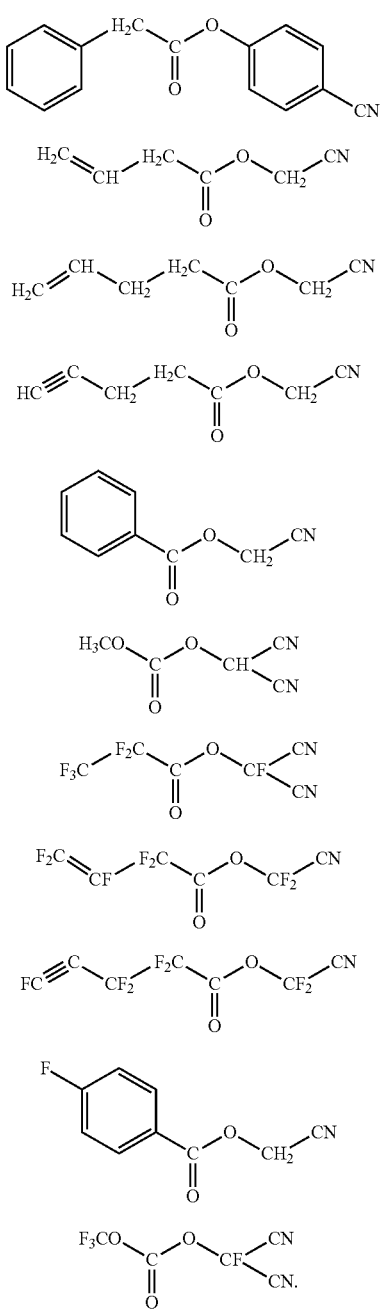

12. A battery pack, comprising:

a secondary battery;

a control section controlling a used state of the secondary battery; and a switch section switching the used state of the secondary battery according to an instruction of the control section, wherein the secondary battery includes
  a cathode,
  an anode, and
  an electrolytic solution including a cyano compound,
    wherein the cyano compound includes a compound represented by a following Formula (1),

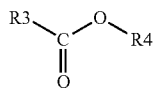 (1)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another, R4 is one of a cyano-group-containing group, halogenated groups thereof, and groups each obtained by bonding two or more of the foregoing groups to one another, a cyano group in the cyano-group-containing group is bonded to an oxygen atom at a terminal of a —C(=O)—O— bond with one or more carbon atoms in between, when the R3 includes an unsaturated carbon bond, number of the cyano group in the R4 is one or larger than one, when the R3 does not include the unsaturated carbon bond and the R4 includes the unsaturated carbon bond, the number of the cyano group in the R4 is one or larger than one, when the R3 does not include the unsaturated carbon bond and the R4 does not include the unsaturated carbon bond, the number of the cyano group in the R4 is two or larger than two, and the compound represented by the Formula (1) is one or more of compounds represented by following Formula (1-1) to Formula (1-17)

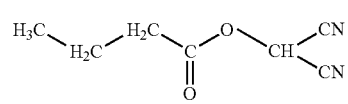 (1-1)

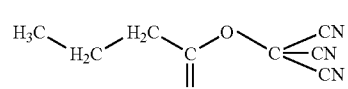 (1-2)

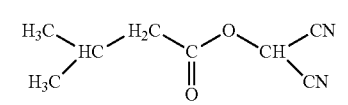 (1-3)

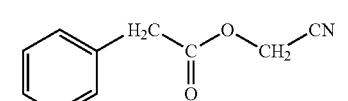 (1-4)

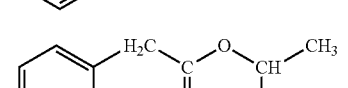 (1-5)

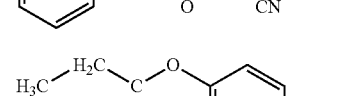 (1-6)

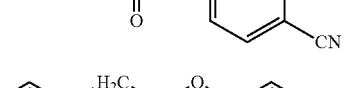 (1-7)

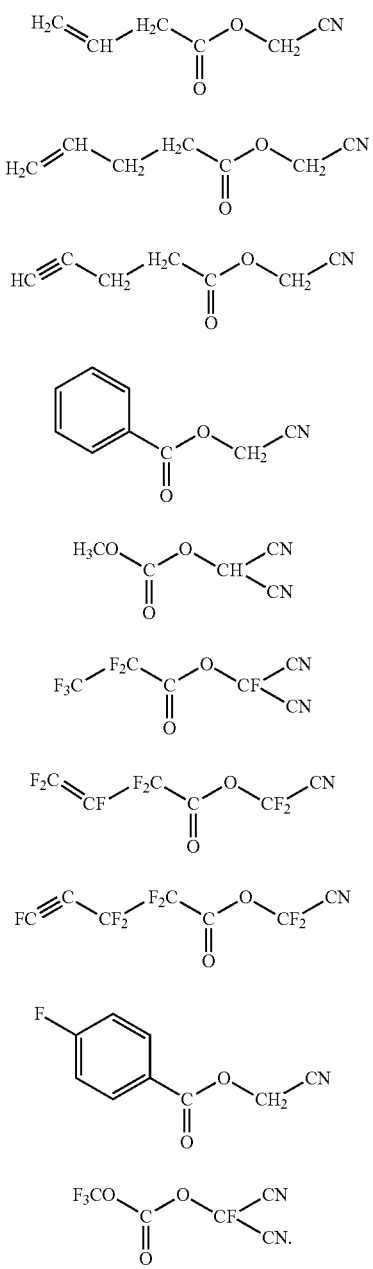

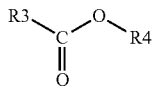

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another, R4 is one of a cyano-group-containing group, halogenated groups thereof, and groups each obtained by bonding two or more of the foregoing groups to one another, a cyano group in the cyano-group-containing group is bonded to an oxygen atom at a terminal of a —C(=O)—O— bond with one or more carbon atoms in between, when the R3 includes an unsaturated carbon bond, number of the cyano group in the R4 is one or larger than one, when the R3 does not include the unsaturated carbon bond and the R4 includes the unsaturated carbon bond, the number of the cyano group in the R4 is one or larger than one, when the R3 does not include the unsaturated carbon bond and the R4 does not include the unsaturated carbon bond, the number of the cyano group in the R4 is two or larger than two, and the compound represented by the Formula (1) is one or more of compounds represented by following Formula (1-1) to Formula (1-17)

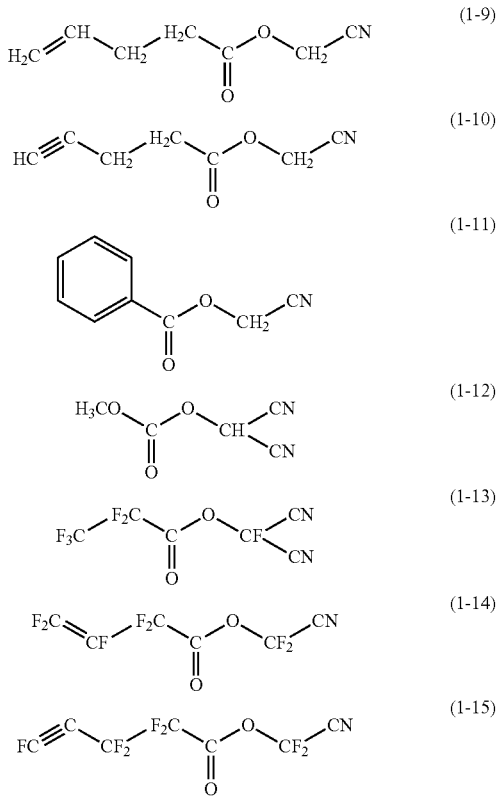

13. An electric vehicle, comprising:

a secondary battery;

a conversion section converting electric power supplied from the secondary battery into drive power;

a drive section operating according to the drive power; and a control section controlling a used state of the secondary battery, wherein the secondary battery includes a cathode, an anode, and an electrolytic solution including a cyano compound, wherein the cyano compound includes a compound represented by a following Formula (1), -continued (1-16)
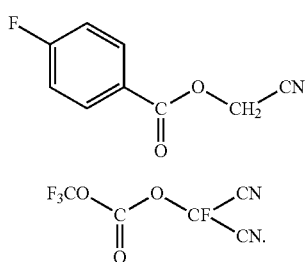

(1-17)
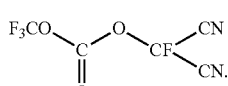

14. An electric power storage system, comprising:
a secondary battery;
one or more electric devices supplied with electric power from the secondary battery; and
a control section controlling the supplying of the electric power from the secondary battery to the one or more electric devices, wherein
the secondary battery includes
a cathode,
an anode, and
an electrolytic solution including a cyano compound, wherein the cyano compound includes a compound represented by a following Formula (1),

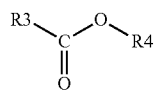
(1)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another,
R4 is one of a cyano-group-containing group, halogenated groups thereof, and groups each obtained by bonding two or more of the foregoing groups to one another,
a cyano group in the cyano-group-containing group is bonded to an oxygen atom at a terminal of a —C(═O)—O— bond with one or more carbon atoms in between,
when the R3 includes an unsaturated carbon bond, number of the cyano group in the R4 is one or larger than one,
when the R3 does not include the unsaturated carbon bond and the R4 includes the unsaturated carbon bond, the number of the cyano group in the R4 is one or larger than one,
when the R3 does not include the unsaturated carbon bond and the R4 does not include the unsaturated carbon bond, the number of the cyano group in the R4 is two or larger than two, and
the compound represented by the Formula (1) is one or more of compounds represented by following Formula (1-1) to Formula (1-17)

(1-1)
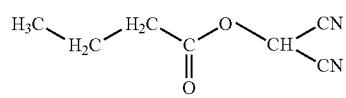

(1-2)
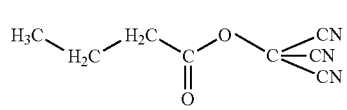

(1-3)
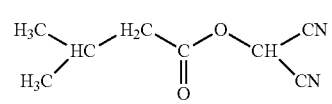

(1-4)
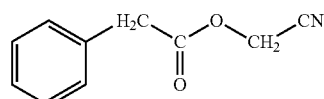

(1-5)
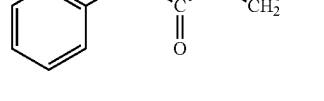

(1-6)
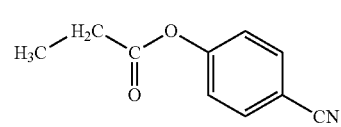

(1-7)
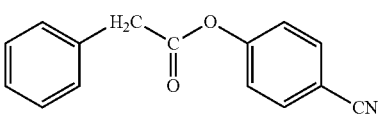

(1-8)
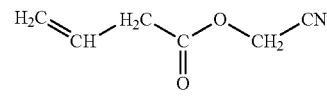

(1-9)
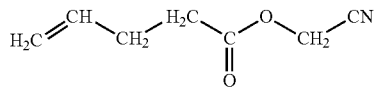

(1-10)
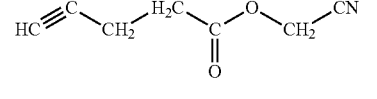

(1-11)
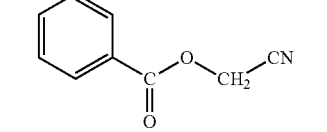

(1-12)
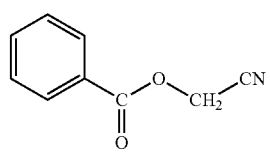

(1-13)
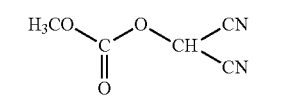

(1-14)
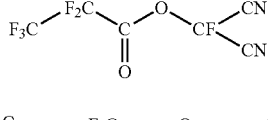

(1-15)
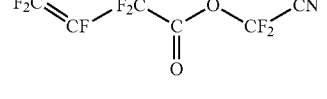

-continued

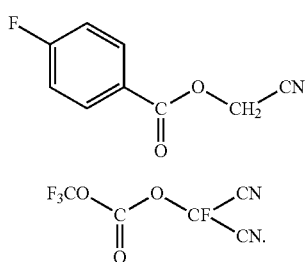
(1-16)

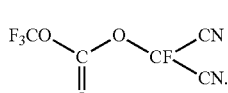
(1-17)

15. An electric power tool, comprising:
a secondary battery; and
a movable section supplied with electric power from the secondary battery, wherein
the secondary battery includes
a cathode,
an anode, and
an electrolytic solution including a cyano compound, wherein the cyano compound includes a compound represented by a following Formula (1), $$\underset{\underset{O}{\|}}{R3-C-O-R4} \quad (1)$$

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another,
R4 is one of a cyano-group-containing group, halogenated groups thereof, and groups each obtained by bonding two or more of the foregoing groups to one another,
a cyano group in the cyano-group-containing group is bonded to an oxygen atom at a terminal of a —C(=O)—O— bond with one or more carbon atoms in between,
when the R3 includes an unsaturated carbon bond, number of the cyano group in the R4 is one or larger than one,
when the R3 does not include the unsaturated carbon bond and the R4 includes the unsaturated carbon bond, the number of the cyano group in the R4 is one or larger than one,
when the R3 does not include the unsaturated carbon bond and the R4 does not include the unsaturated carbon bond, the number of the cyano group in the R4 is two or larger than two, and
the compound represented by the Formula (1) is one or more of compounds represented by following Formula (1-1) to Formula (1-17)

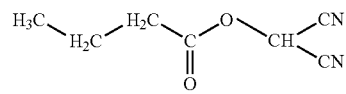
(1-1)

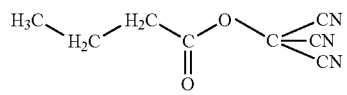
(1-2)

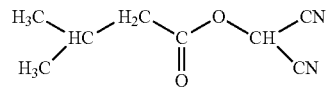
(1-3)

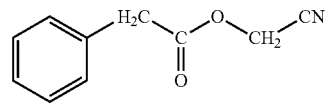
(1-4)

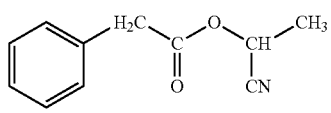
(1-5)

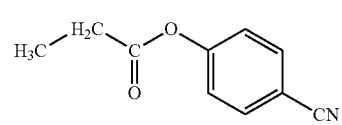
(1-6)

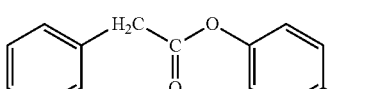
(1-7)

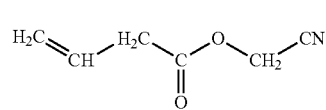
(1-8)

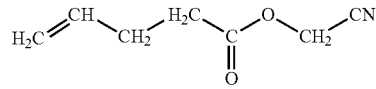
(1-9)

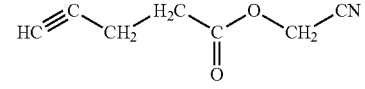
(1-10)

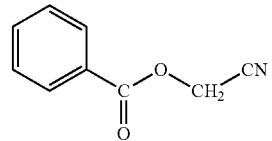
(1-11)

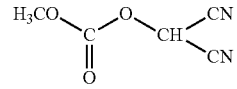
(1-12)

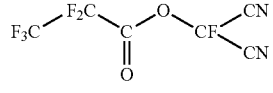
(1-13)

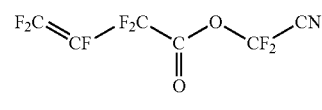
(1-14)

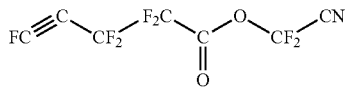
(1-15)

-continued (1-16)
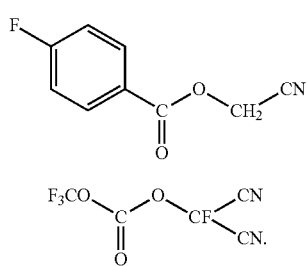

(1-17)
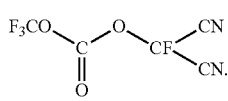

16. An electronic apparatus, comprising:
a secondary battery as an electric power supply source, wherein the secondary battery includes
a cathode,
an anode, and
an electrolytic solution including a cyano compound, wherein the cyano compound includes a compound represented by a following Formula (1),

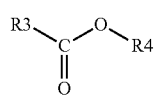
(1)

where R3 is one of a saturated hydrocarbon group, an unsaturated hydrocarbon group, an oxygen-containing saturated hydrocarbon group, halogenated groups of the foregoing groups, and groups each obtained by bonding two or more of the foregoing groups to one another,
R4 is one of a cyano-group-containing group, halogenated groups thereof, and groups each obtained by bonding two or more of the foregoing groups to one another,
a cyano group in the cyano-group-containing group is bonded to an oxygen atom at a terminal of a —C(=O)—O— bond with one or more carbon atoms in between,
when the R3 includes an unsaturated carbon bond, number of the cyano group in the R4 is one or larger than one,
when the R3 does not include the unsaturated carbon bond and the R4 includes the unsaturated carbon bond, the number of the cyano group in the R4 is one or larger than one,
when the R3 does not include the unsaturated carbon bond and the R4 does not include the unsaturated carbon bond, the number of the cyano group in the R4 is two or larger than two, and
the compound represented by the Formula (1) is one or more of compounds represented by following Formula (1-1) to Formula (1-17)

(1-1)
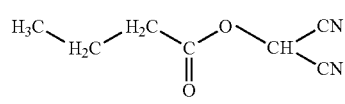

(1-2)
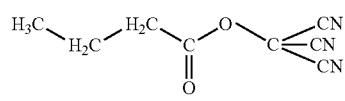

(1-3)
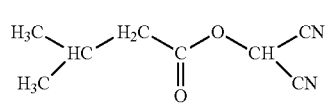

(1-4)
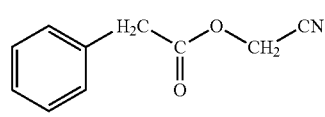

(1-5)
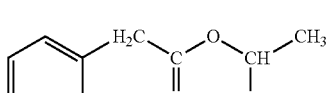

(1-6)
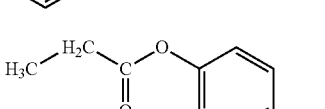

(1-7)
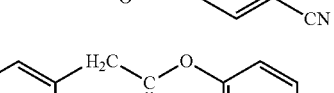

(1-8)
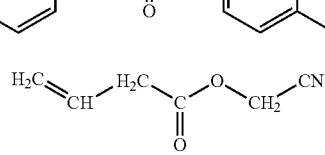

(1-9)
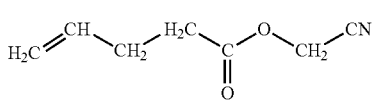

(1-10)
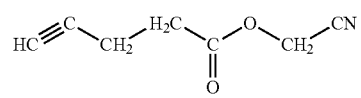

(1-11)
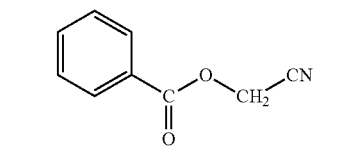

(1-12)
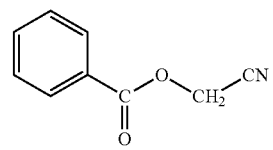

(1-13)
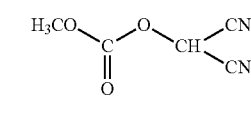

(1-14)
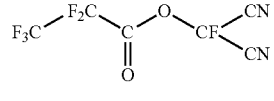

(1-15)
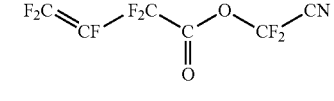

(1-16)
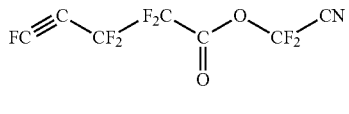

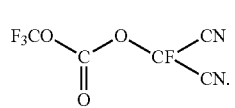
(1-17)
\* \* \* \* \*